(12) United States Patent
Biagi et al.

(10) Patent No.: US 11,752,914 B1
(45) Date of Patent: Sep. 12, 2023

(54) TRAILER SYSTEM FOR TRANSPORT OF UNIT LOAD DEVICES

(71) Applicant: Cottrell, Inc., Gainesville, GA (US)

(72) Inventors: Gerard Biagi, Gainesville, GA (US); Steven Sexton, Gainesville, GA (US); David Trenbeath, Gainesville, GA (US); Conner Lill, Gainesville, GA (US)

(73) Assignee: Cottrell Incorporated, Gainesville, GA (US)

( * ) Notice: Subject to any disclaimer, the term of this patent is extended or adjusted under 35 U.S.C. 154(b) by 440 days.

(21) Appl. No.: 16/945,603

(22) Filed: Jul. 31, 2020

Related U.S. Application Data

(60) Provisional application No. 62/880,882, filed on Jul. 31, 2019.

(51) Int. Cl.
| | |
|---|---|
| *B60P 1/02* | (2006.01) |
| *B65D 88/12* | (2006.01) |
| *B60P 3/08* | (2006.01) |
| *B60P 1/64* | (2006.01) |
| *B65G 67/04* | (2006.01) |
| *B60P 1/44* | (2006.01) |

(52) U.S. Cl.
CPC ............... *B60P 1/02* (2013.01); *B60P 1/44* (2013.01); *B60P 1/6418* (2013.01); *B60P 3/08* (2013.01); *B65D 88/12* (2013.01); *B65G 67/04* (2013.01)

(58) Field of Classification Search
CPC ............... B60P 1/02; B60P 1/44; B60P 1/4471
See application file for complete search history.

(56) References Cited

U.S. PATENT DOCUMENTS

| | | | | | |
|---|---|---|---|---|---|
| 4,701,086 | A | * | 10/1987 | Thorndyke | B60P 1/02 296/24.45 |
| 5,478,190 | A | * | 12/1995 | Helton | B60P 1/52 193/35 A |
| 5,915,913 | A | * | 6/1999 | Greenlaw | B61D 47/00 414/679 |
| 9,198,509 | B2 | * | 12/2015 | Johnson | A47B 43/006 |
| 10,207,753 | B2 | * | 2/2019 | O'Marra | B60P 1/02 |
| 10,377,392 | B2 | * | 8/2019 | Bis | B60P 3/08 |
| 11,117,741 | B2 | * | 9/2021 | Curley | B60P 1/649 |
| 11,186,214 | B2 | * | 11/2021 | Das | B62D 33/042 |
| 2007/0226901 | A1 | * | 10/2007 | Pervorse | B60P 1/02 5/118 |

* cited by examiner

*Primary Examiner* — Jonathan Snelting
(74) *Attorney, Agent, or Firm* — SMITH TEMPEL; Steven P. Wigmore; Matthew T. Hoots

(57) ABSTRACT

A trailer system may have a first cargo area having a movable deck. The movable deck may be moved by an actuator. The movable deck may include a plurality of first rollers for engaging and translating cargo. And a movable tailgate may close the first cargo area when it is in a first position. The movable tailgate may have a plurality of second rollers for engaging and translating cargo when the movable tailgate is in a second position. The trailer system may have a plurality of movable decks, where each movable deck is coupled and moved by an actuator. Each actuator may comprise at least one of a hydraulic, pneumatic, and/or electromechanical system. The trailer system may further have a set of lower movable decks and a set of upper movable decks. The set of upper movable decks may be coupled to the lower movable decks by actuators.

20 Claims, 62 Drawing Sheets

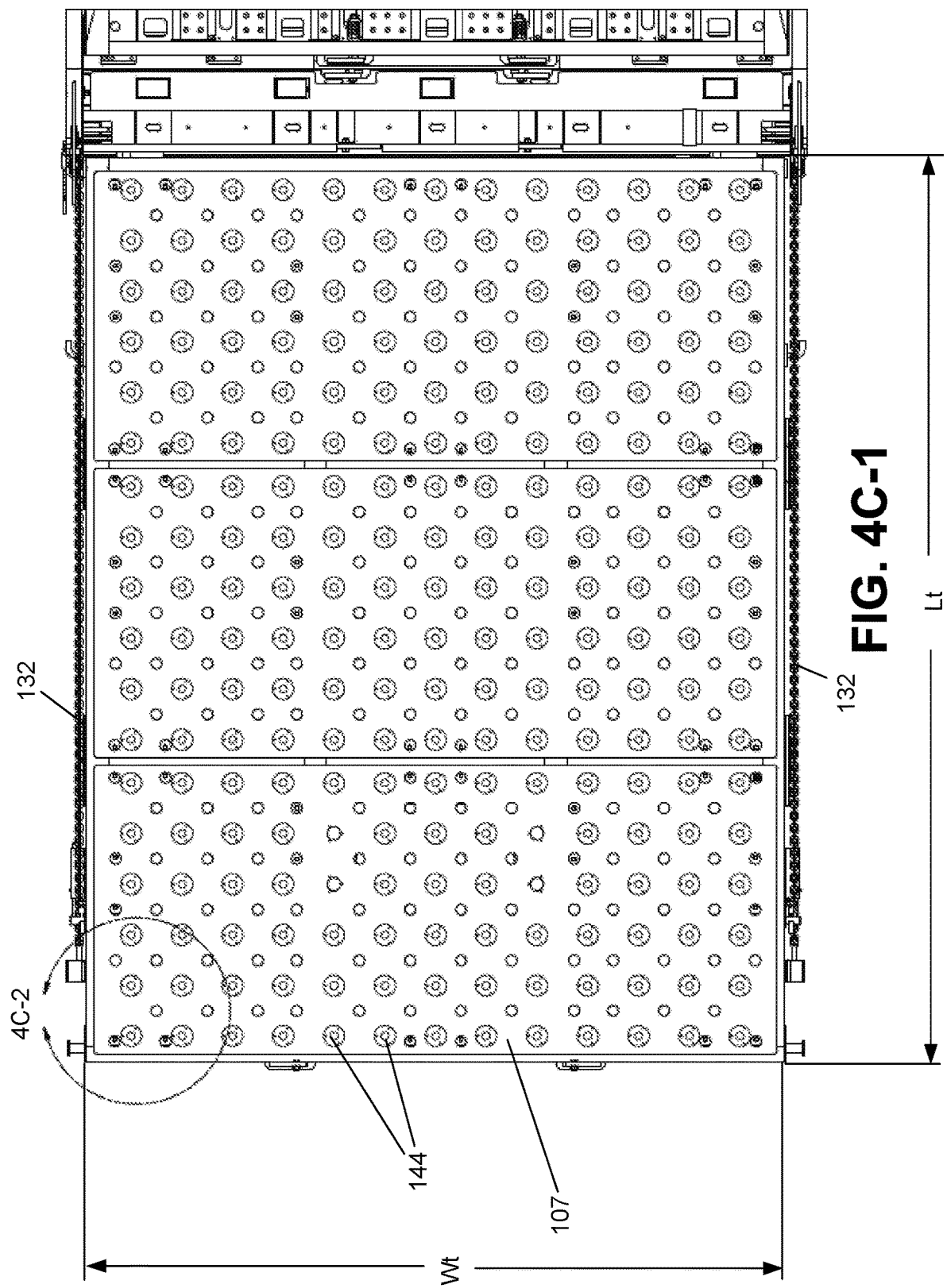

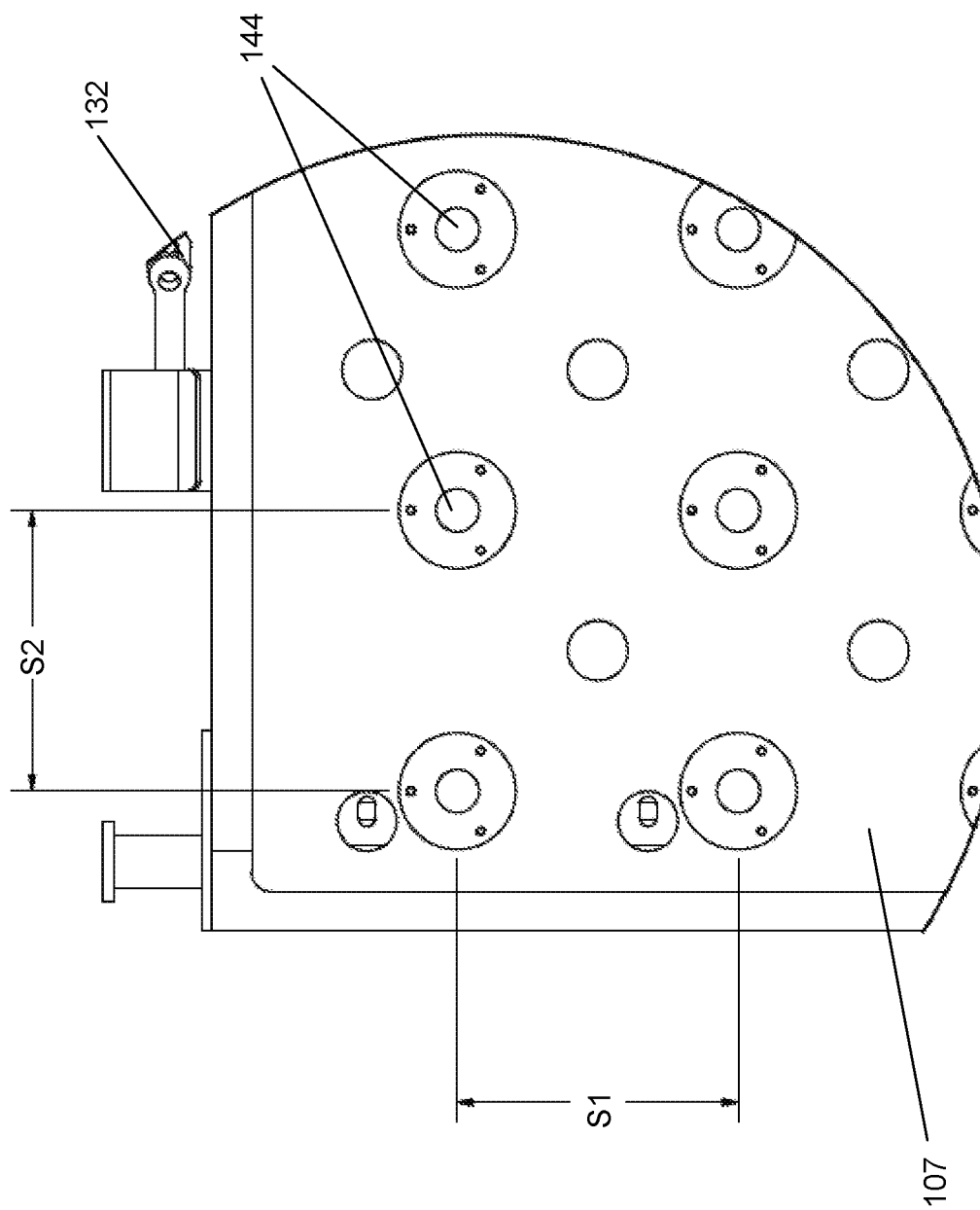

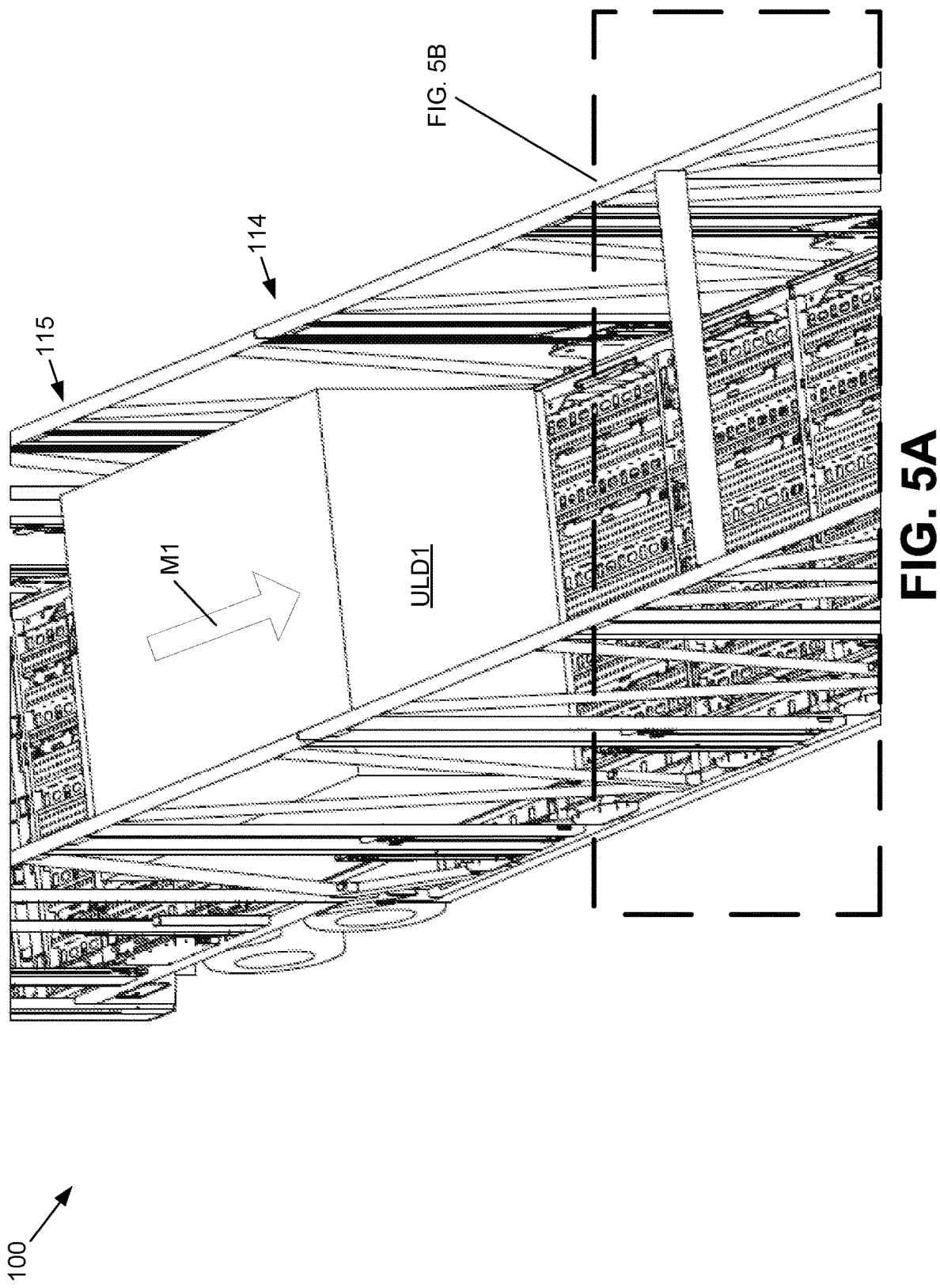

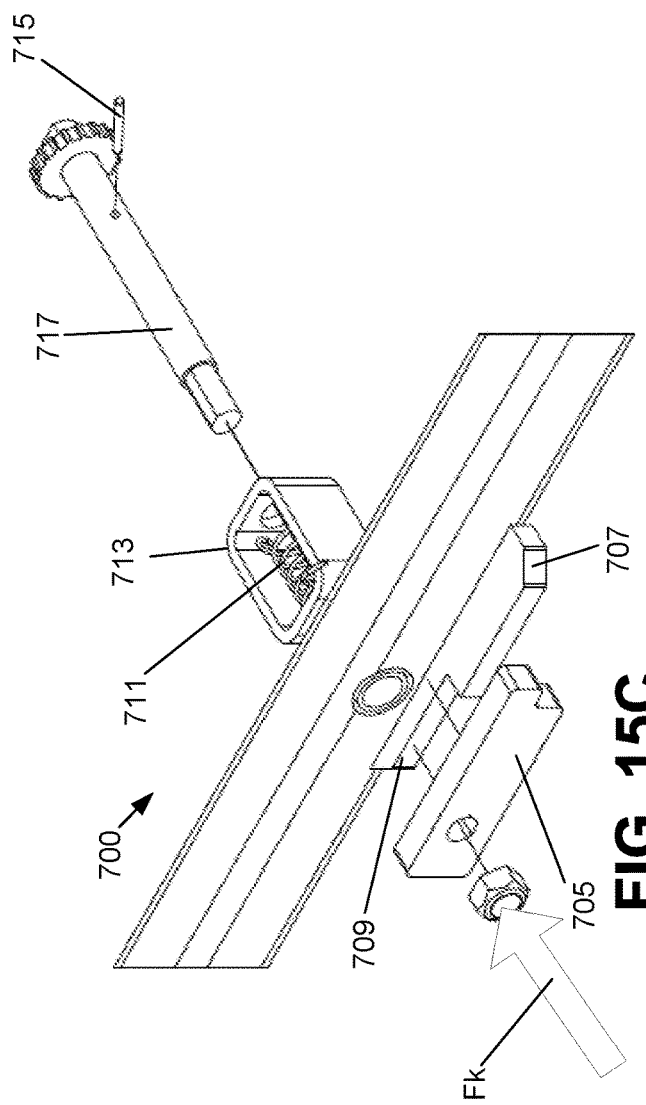
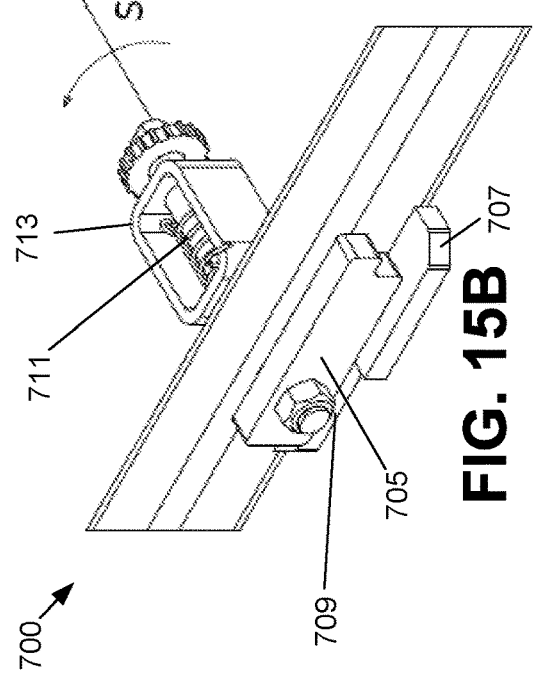
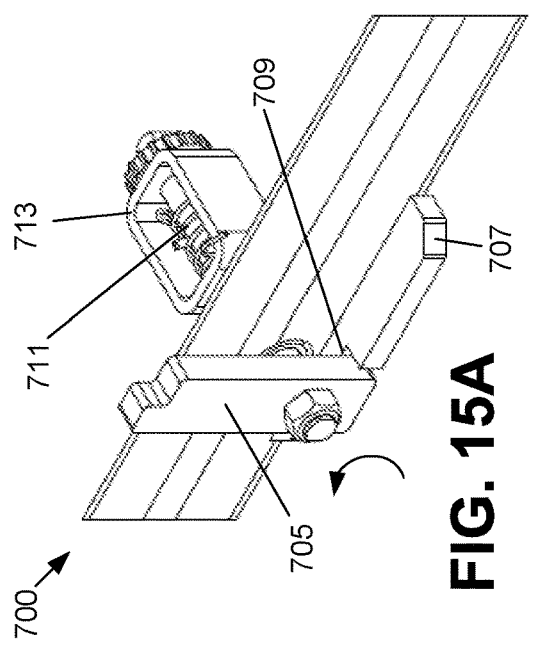

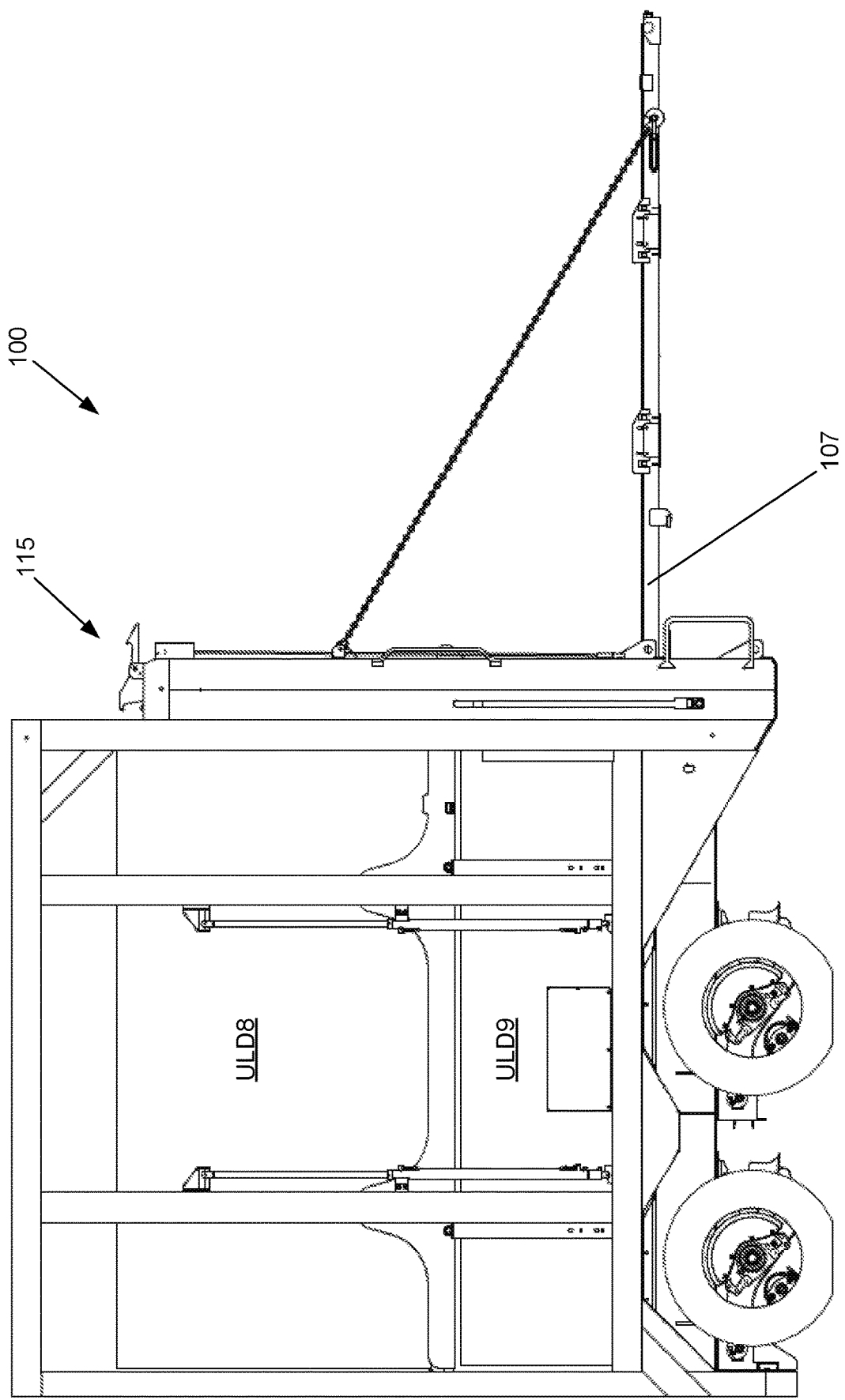

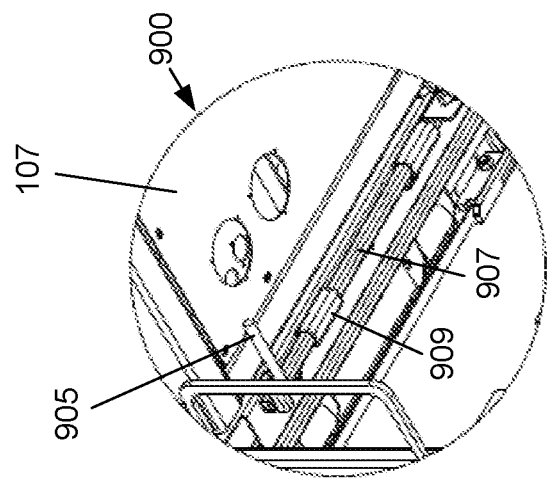
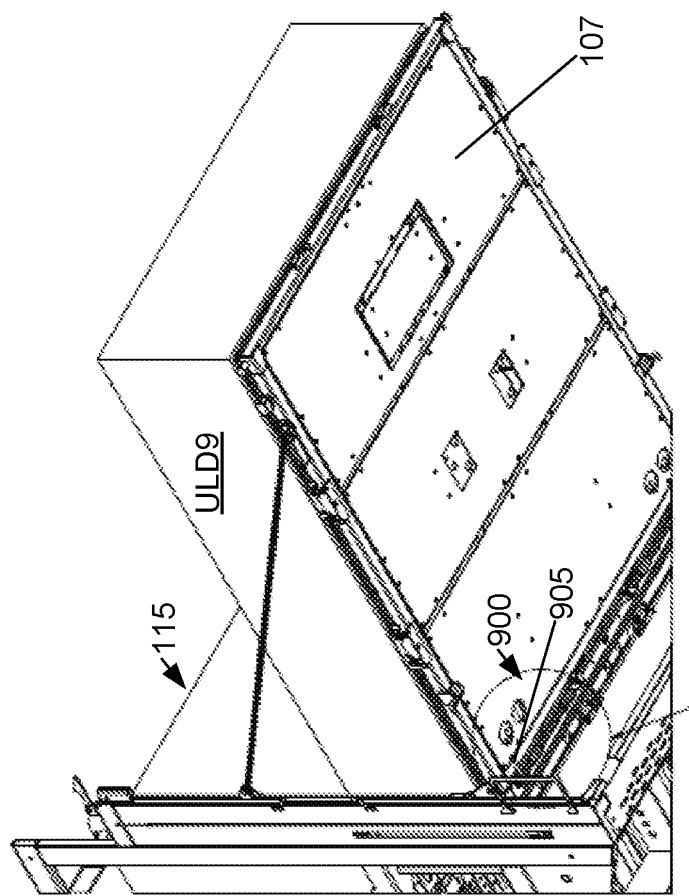
FIG. 38B
FIG. 38A

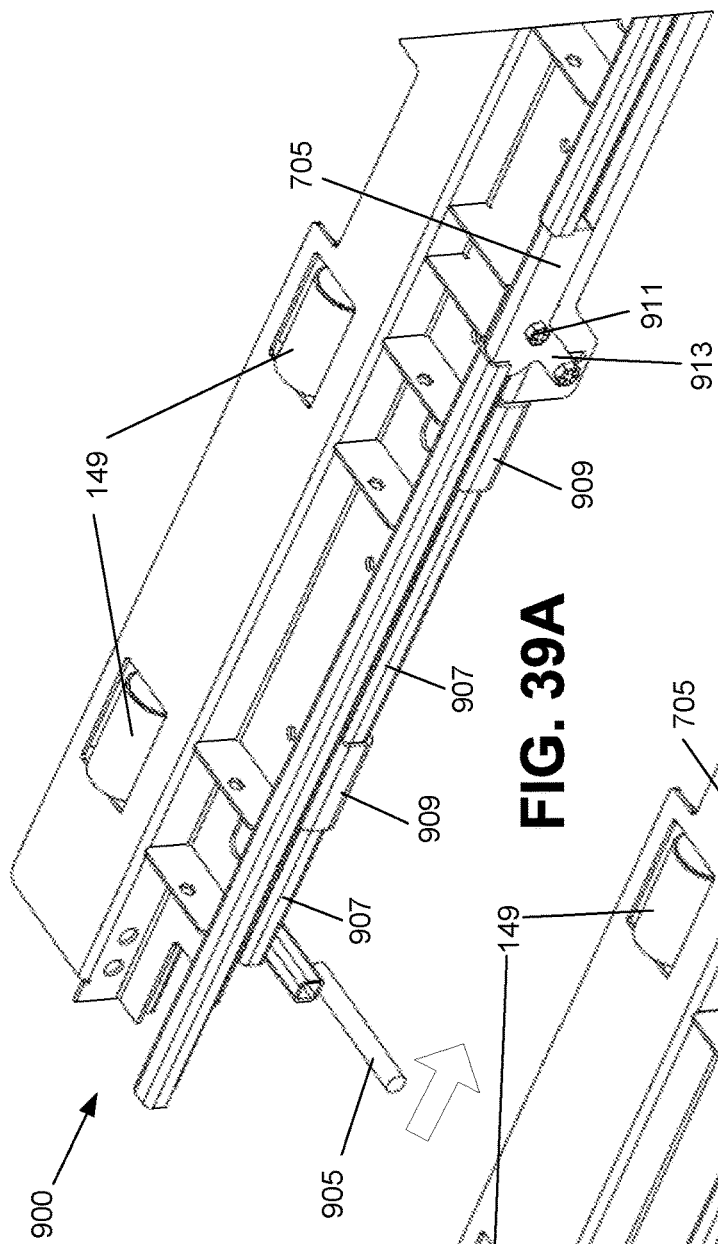
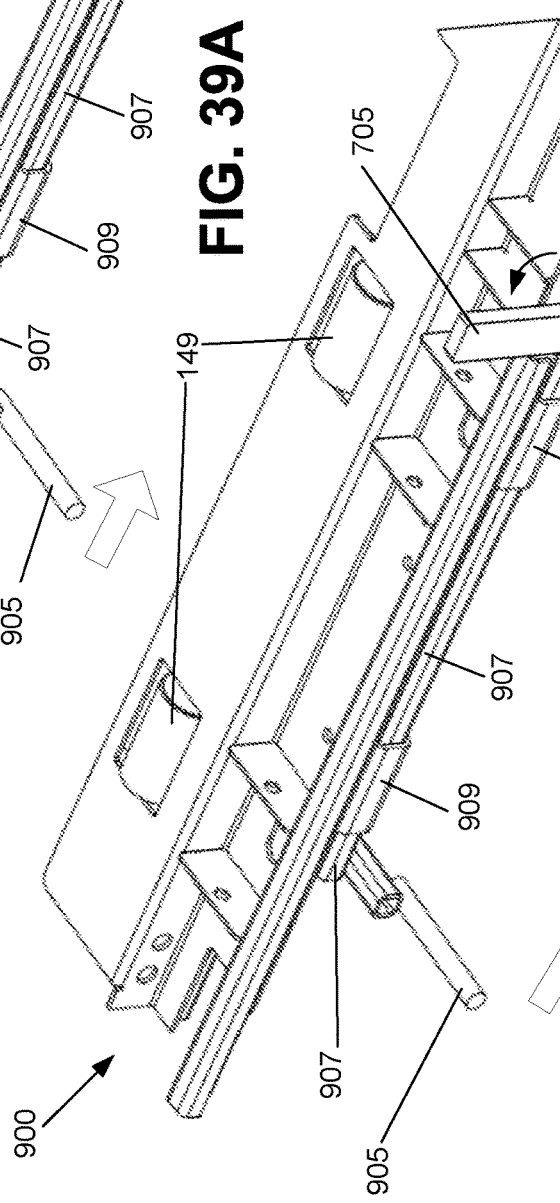

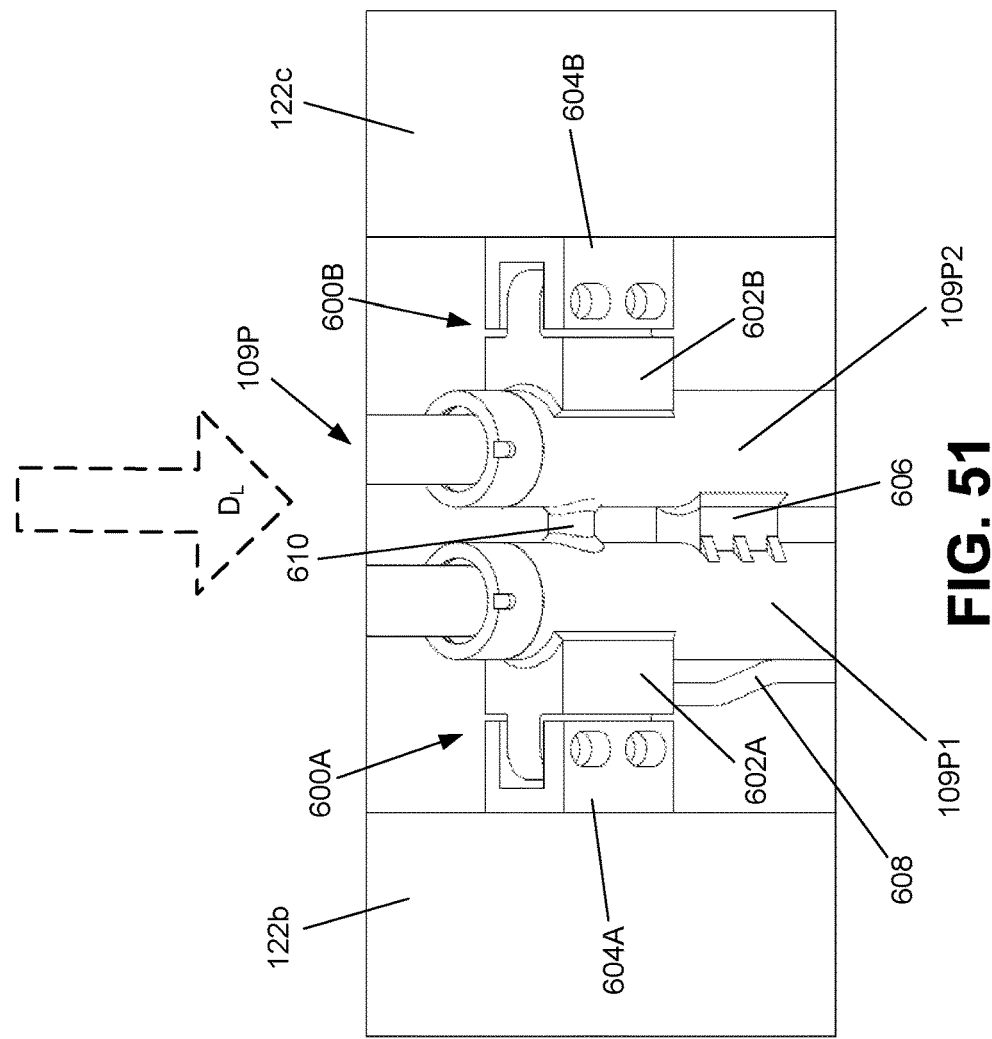
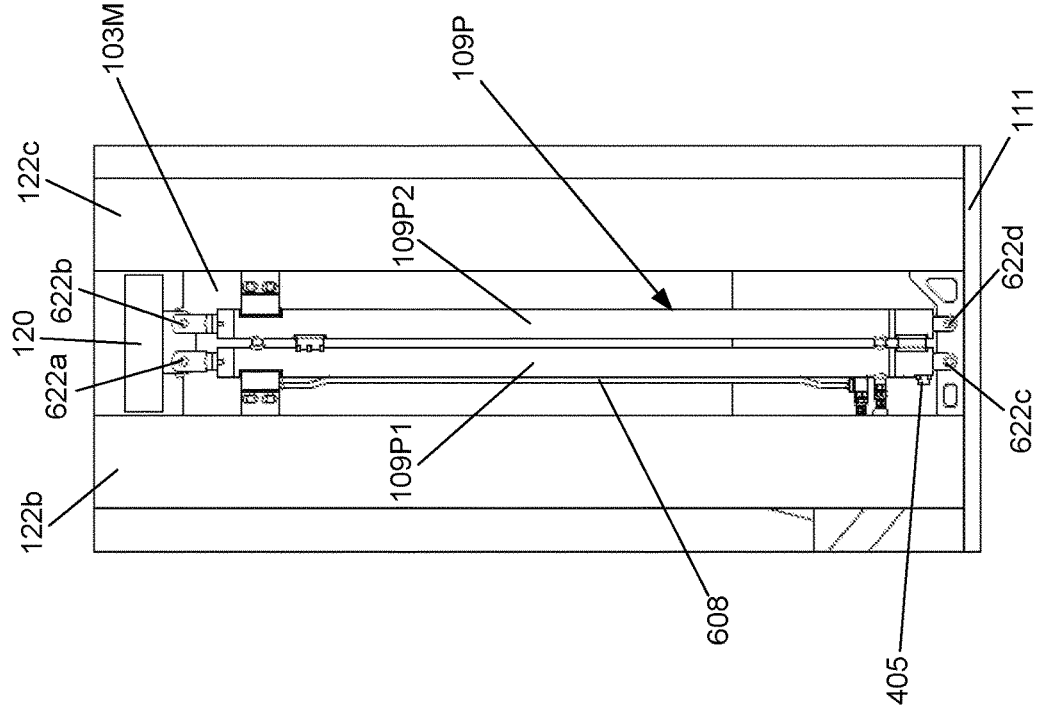

TRAILER SYSTEM FOR TRANSPORT OF UNIT LOAD DEVICES

BACKGROUND

The present solutions relate to a trailer system configured to accommodate cargo comprised of loaded and/or empty Unit Load Devices ("ULDs") or similar pallets and/or containers. As one of ordinary skill in the art would recognize, ULDs are containers specifically designed for transport by airplane. Consequently, ULDs are often shaped to mirror the interior cargo space of an airplane and are generally constructed of thin sheet metal and/or clear polymer sheeting in order to keep weight to a minimum. Airlines commonly fill ULDs with passenger luggage, mail or other cargo before loading the ULDs into an airplane.

Airports are designed and configured to efficiently manage ULDs and their use. However, when logistical demands require ULDs to be transported beyond the bounds of the airport, such as by truck over the highway system, certain problems and inefficiencies arise due to the unique shape, size variations, and less-than-robust construction of ULDs.

For instance, because ULDs have relatively thin, tray-like bottoms, they can be easily damaged when moved improperly, especially when the ULD is loaded with heavy cargo. The thin, tray-like bottom of a ULD is not designed to carry significant weight without proper support. Consequently, loading a ULD onto a typical truck trailer or bed via a forklift, as is common in the prior art, can be problematic. In fact, the industry has developed standards and recommended best practices for handling ULDs that discourages use of forklifts or the like to move ULDs. Moreover, sliding or shifting a ULD once on a prior art trailer or truck bed can easily damage the thin, tray-like bottom of a ULD if scraped on the structure of the trailer or truck bed.

As another example, because ULDs are specifically sized and shaped to juxtapose tightly and fit snugly into an airplane, damage from shifting during flight is unlikely. However, once placed on a truck bed or in a typical trailer known in the art, shifting of ULDs during transport is a problem that can easily damage the ULD. Moreover, because the ULDs are not constructed robustly, typical solutions for securing cargo on a truck bed or in a trailer, such as a tie-down strap, are not optimal due to the potential to over-tighten and damage the ULD.

As another example, because the shape of ULDs is so unique, and the sizes of ULDs so varied, typical over-the-road transport solutions such as a standard van-type semi-trailer or flatbed truck do not provide efficient, versatile space for receipt of multiple ULDs.

Further, because ULDs are not designed to be transferred without proper support (thereby making the use of forklifts and pallet lifts impractical, if not altogether ill-advised), typical truck and trailers known in the art present difficulties when loading and unloading ULDs. As would be understood by one of ordinary skill in the art, sliding a ULD into position may not only damage the ULD but also falls short of the best practices for handling ULDs mentioned above. Moreover, the inability of prior art trailer transport solutions to adjust to exact dock or unloading conveyor heights further complicates loading and unloading of ULDs.

Therefore, there is a need in the art for a system and method for transporting ULDs over surface streets and highways that addresses the above problems, as well as other problems, experienced by users of known trailers and trucks when transporting ULDs.

SUMMARY

Exemplary embodiments and aspects of an improved trailer system specifically configured for the transport and management of Unit Load Devices ("ULDs") is disclosed. An exemplary embodiment of the solution includes a series of upper and lower decks that are precisely positionable relative to one another for the easy movement of ULDs between decks. The improved trailer further comprises advanced control systems for ensuring leveling of the various decks, stop and guide mechanisms for control of ULD positioning and shifting, as well as other improvements to address unique challenges associated with transport of ULDs over the road.

A trailer system may comprise a first cargo area having a movable deck. The movable deck may be moved by an actuator. The movable deck may comprise a plurality of first rollers for engaging and translating cargo. And a movable tailgate may close the first cargo area when it is in a first position. The movable tailgate may further comprise a plurality of second rollers for engaging and translating cargo when the movable tailgate is in a second position.

The trailer system may further comprise a plurality of movable decks, where each movable deck is coupled and moved by an actuator. Each actuator may comprise at least one of a hydraulic system, a pneumatic system, and/or an electric system.

The trailer system may further comprise a set of lower movable decks and a set of upper movable decks. The set of upper movable decks may be coupled to the lower movable decks by actuators.

The trailer system may further comprise a pin actuator system for locking each movable deck into a position for transport of cargo. The trailer system may also include a stop device positioned between two decks. The stop device may have a first position which allows cargo to move over the stop device. The stop device may have a second position which prevents cargo from moving between the two decks.

The trailer system may further comprise a guide and constraint system for engaging cargo. The guide and constraint system may have at least one flange that is hinged for rotating from a stowed position to an upright position.

The trailer system may have the tailgate supported by chains when it is in the second position. And the plurality of first rollers of the movable deck are positioned in at least one row along a bottom portion of the movable deck.

This summary is provided to introduce a selection of concepts that are further described below in the detailed description. This summary is not intended to identify key or essential features of the claimed subject matter, nor is it intended to be used as an aid in limiting the scope of the claimed subject matter

BRIEF DESCRIPTION OF THE DRAWINGS

FIG. 4C-1 illustrates further details and a perspective view of the ball rollers positioned in the tailgate as shown in FIGS. 4A-4B used in the exemplary improved trailer system;

FIG. 4C-2 illustrates further details of the ball rollers illustrated in FIG. 4C-1 present in the tailgate;

FIG. 5A illustrates a perspective view of the trailer system after a ULD has traversed across the tailgate and into the rear cargo bay and moving towards the middle cargo bay;

FIGS. 15A-15C illustrate an exemplary ULD kick-stop device used in certain embodiments of the improved trailer system according to the solution to prevent forward and/or backward movement of a ULD1;

FIG. 37 is a side view of the trailer system of FIG. 36 but with the ninth ULD being completely positioned within the rear cargo bay area;

FIG. 38A illustrates a perspective view of the tailgate loaded with a ninth ULD;

FIG. 38B illustrates further details of the retractable tailgate stop device shown in FIG. 38A;

FIG. 39A, this figure is a perspective view of the tailgate stop device in the retracted position;

FIG. 39B, this figure is a perspective view of the tailgate stop device in an expanded/upright position;

FIG. 50 illustrates a side and close up view of a primary actuator according to one exemplary embodiment;

FIG. 51 illustrates a close up, side view of the primary actuator set of FIG. 50;

DETAILED DESCRIPTION

Figure 1A:
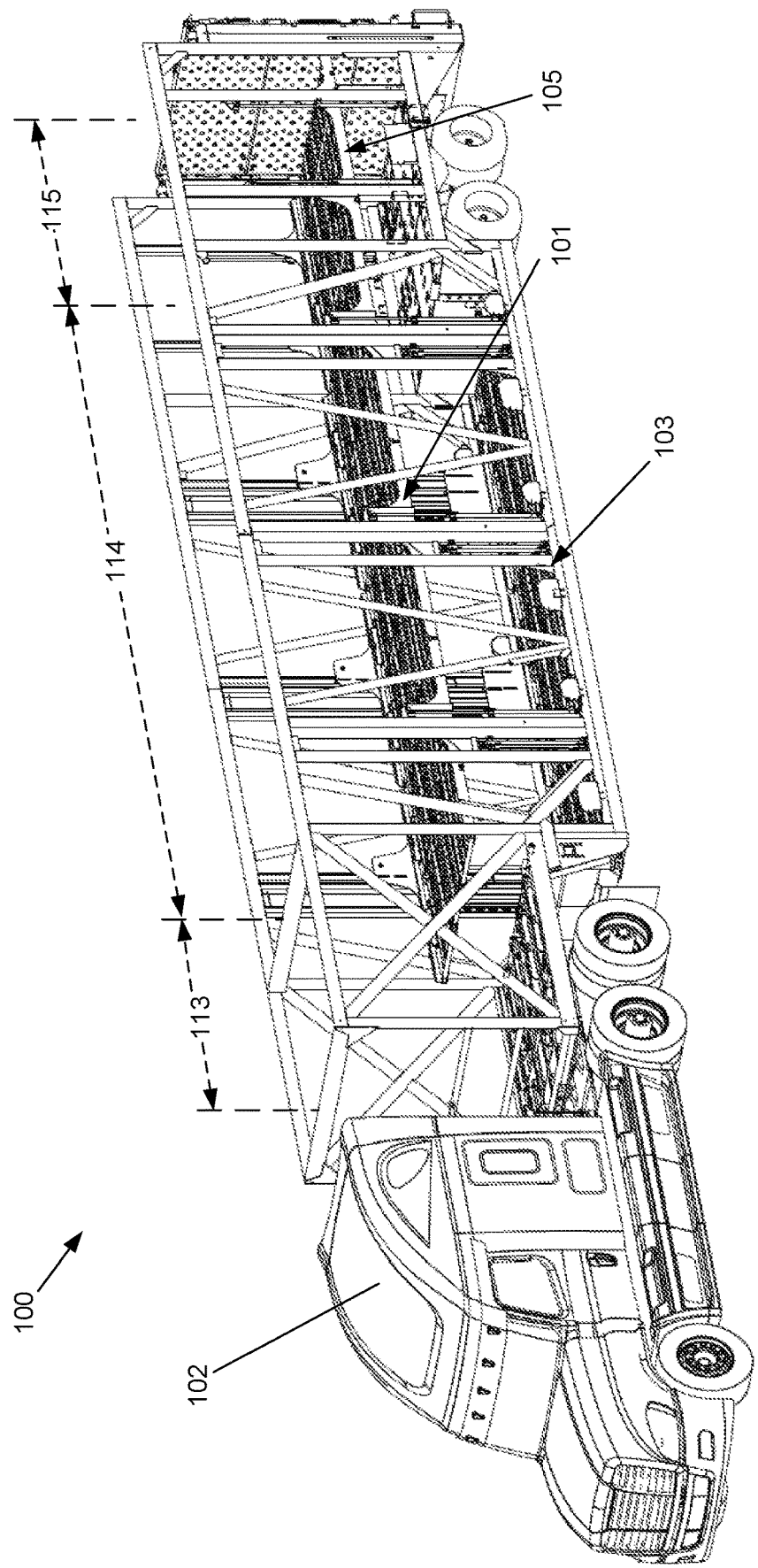
FIG. 1A illustrates a perspective view of an exemplary embodiment of an improved trailer system for transport of Unit Load Devices ("ULDs") according to the solution.

Referring to FIG. 1A, illustrated is a perspective view of an exemplary embodiment of an improved trailer system 100 for transport of Unit Load Devices ("ULDs")(not visible in FIG. 1A, but see FIG. 4) according to the solution. Notably, although the exemplary embodiment of the solution shown in this application is described within the context of an application for transport of ULDs, it is envisioned that embodiments of the solution may be suitable for transport of payloads other than, or in addition to, ULDs and, as such, reference to ULDs in this description will not suggest that the scope of the solution is specifically limited to ULDs as a payload.

The trailer system 100 may be hitched to a motor vehicle 102, that may comprise a tractor truck. The motor vehicle 102 may comprise other vehicles besides a tractor truck, such as, but not limited to, airport ground support vehicles, automobiles, heavy moving equipment (i.e. bulldozers, etc.), passenger trucks, military vehicles, etc.

The trailer system 100 may comprise a front cargo bay 113, a middle cargo bay 114, and a rear cargo bay 115. These bays 113, 114, 115 may contain/house ULDs as shown in FIGS. 41-44, described in more detail below. The middle bay 114 may comprise at least two movable decks: an upper movable deck 101, and a lower movable deck 103. Meanwhile, the rear bay 115 may comprise a single movable deck 105. With the movable decks 101, 103, and 105, the system 100 may accommodate ULDs which may have different sizes. As understood by one of ordinary skill in the art, ULDs as of this writing may have various widths and/or lengths. For example, ULDs may have widths of 61.5 inches, 88.0 inches, and 96.0 inches.

However, the inventive system 100 is not limited to these widths of ULDs and it can be sized to include widths and/or lengths of ULDs greater or smaller than these exemplary dimensions. As noted previously, the inventive system 100 is not limited to the transport of ULDs and it may accommodate other types of cargo and/or freight, beyond ULDs, as understood by one of ordinary skill in the art.

Figure 1B:
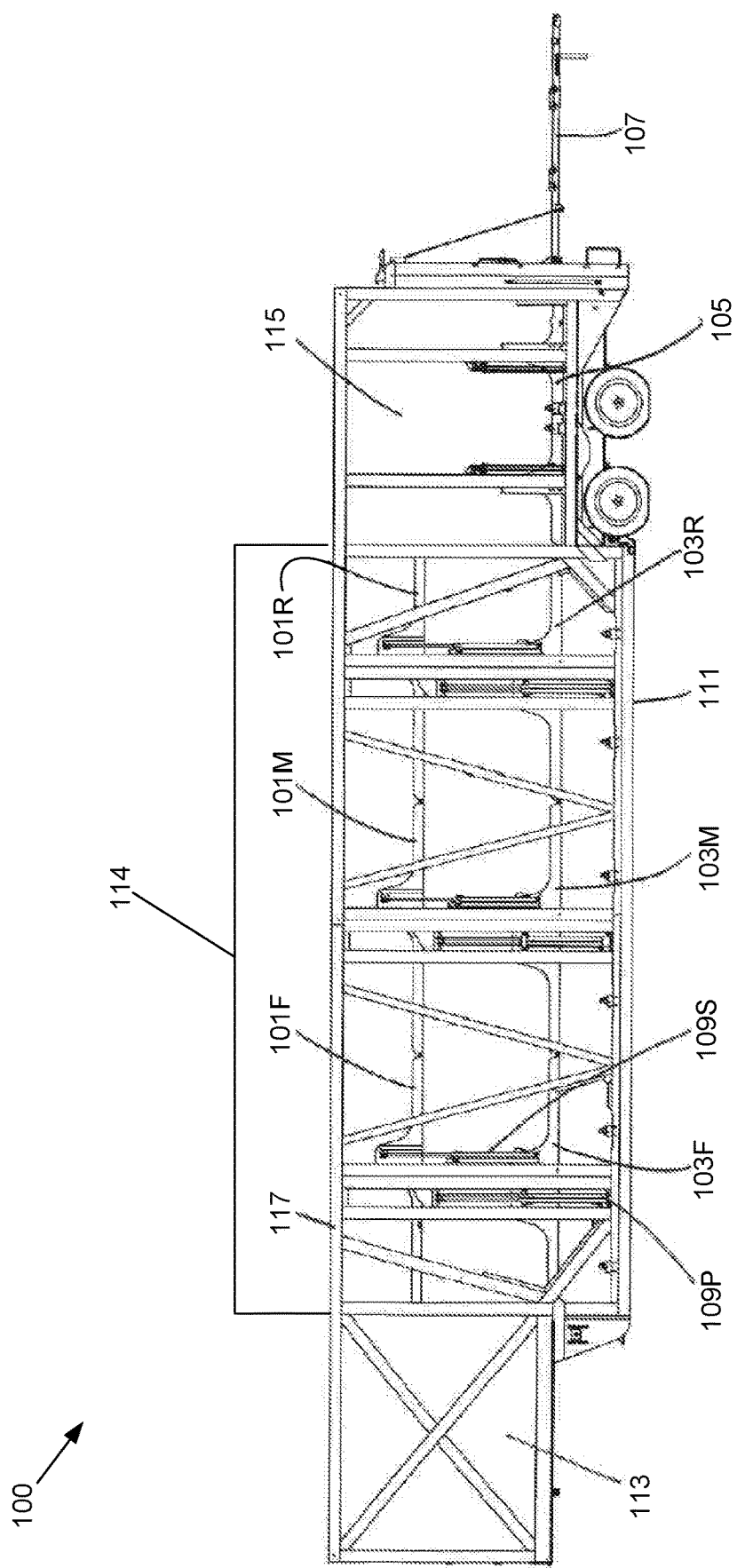
FIG. 1B illustrates a side view of the exemplary embodiment of the improved trailer system shown in FIG. 1A.

Referring now to FIG. 1B, illustrated is a side view of the exemplary embodiment of the improved trailer system 100 of FIG. 1A. The trailer system 100 may be configured for hitching to a tractor truck 102 (see FIG. 1A) as noted above.

The trailer system 100 may have a bottom structure 111, a front bay 113, a middle bay 114, a rear bay 115, a top structure 117, and an optional tailgate 107. The tailgate 107 may be raised vertically when the trailer system 100 is being hauled and lowered to a substantially horizontal position when the trailer system 100 is being loaded and/or unloaded.

The middle bay 114 may comprise: a plurality of upper deck segments (101F, 101M, 101R—forward, middle, rear) that collectively form the upper deck 101, a plurality of lower deck segments (103F, 103M, 103R—forward, middle, rear) that collectively form the lower deck 103. The upper deck 101 is operable to be raised and/or lowered relative to, and/or in tandem with, lower deck 103. To this end, reference to individual deck segments in this description when describing the functionality of the exemplary embodiment shown in the figures is for convenience of the reader while viewing the figures and will be understood to apply to all deck segments of the relevant deck 101, 103 unless stated otherwise.

Notably, although the exemplary embodiment shown and described herein includes an upper deck 101 that is operable to be raised and/or lowered relative to, and/or in tandem with, lower deck 103, it is envisioned that in other embodiments of the solution a given upper deck segment of the series of upper decks may be operable to be raised and/or lowered relative to, and/or in tandem with, a given lower deck segment of the series of lower decks. For example, a forward upper deck 101F may be operable to be raised and/or lowered relative to, and/or in tandem with, a forward lower deck 103F. Similarly, a middle upper deck 101M may be operable to be raised and/or lowered relative to, and/or in tandem with, a middle lower deck 103M. And, a rear upper deck 101R may be operable to be raised and/or lowered relative to, and/or in tandem with, a rear lower deck 103R.

The tailgate 107 may be operable to be raised and/or lowered independently from a back deck 105 that resides within rear bay 115. Notably, when back deck 105 is in a raised position within rear bay 115, an upper rear bay space is defined above back deck 105 and a lower rear bay space is defined beneath back deck 105 (See FIG. 30 as an example of when back deck 105 is in a raised position).

As can be seen in the FIG. 1B illustration, and as will be better understood from subsequent figures and their associated descriptions, the upper deck 101 and lower deck 103 may be raised and lowered relative to one another via an actuator subsystem 109. The actuator subsystem 109 may be comprised of a plurality of primary actuator sets 109P and secondary actuator sets 109S that are associated with each of the upper and lower deck pairs (101F/103F; 101M/103M; 101R/103R). It is envisioned that an actuator 109 may comprise a hydraulic or pneumatic piston or cylinder, although embodiments of the solution are not limited to use of hydraulic or pneumatic pistons or cylinders as actuators. As a non-limiting example, certain embodiments of the solution may employ a motor-screw-type/electromechanical actuator. Other actuator types are possible as understood by one of ordinary skill in the art.

Advantageously, in order to avoid the need for large actuators with overly long stroke lengths, embodiments of the solution are configured to raise the upper deck 101 in tandem with its complementary lower deck 103 for a certain vertical distance using a primary actuator stage (e.g. 109P). In this way, the actuator sets of a primary actuator stage 109P may be sized in order to raise the multiple decks. The series of upper decks (101F, 101M, 101R) that form upper deck 101 may be raised further by a secondary actuator stage (e.g., 109S) sized appropriately to raise the single deck 101. By using primary and secondary actuator stages 109P, 109S within actuator subsystem 109, embodiments of the solution may strategically raise and lower decks 101, 103 relative to one another without having to incorporate the relatively larger actuators used by the prior art and dedicated to a given deck. Further details of the actuator subsystem 109 will be described below in connection with FIGS. 48-55.

Figure 2:
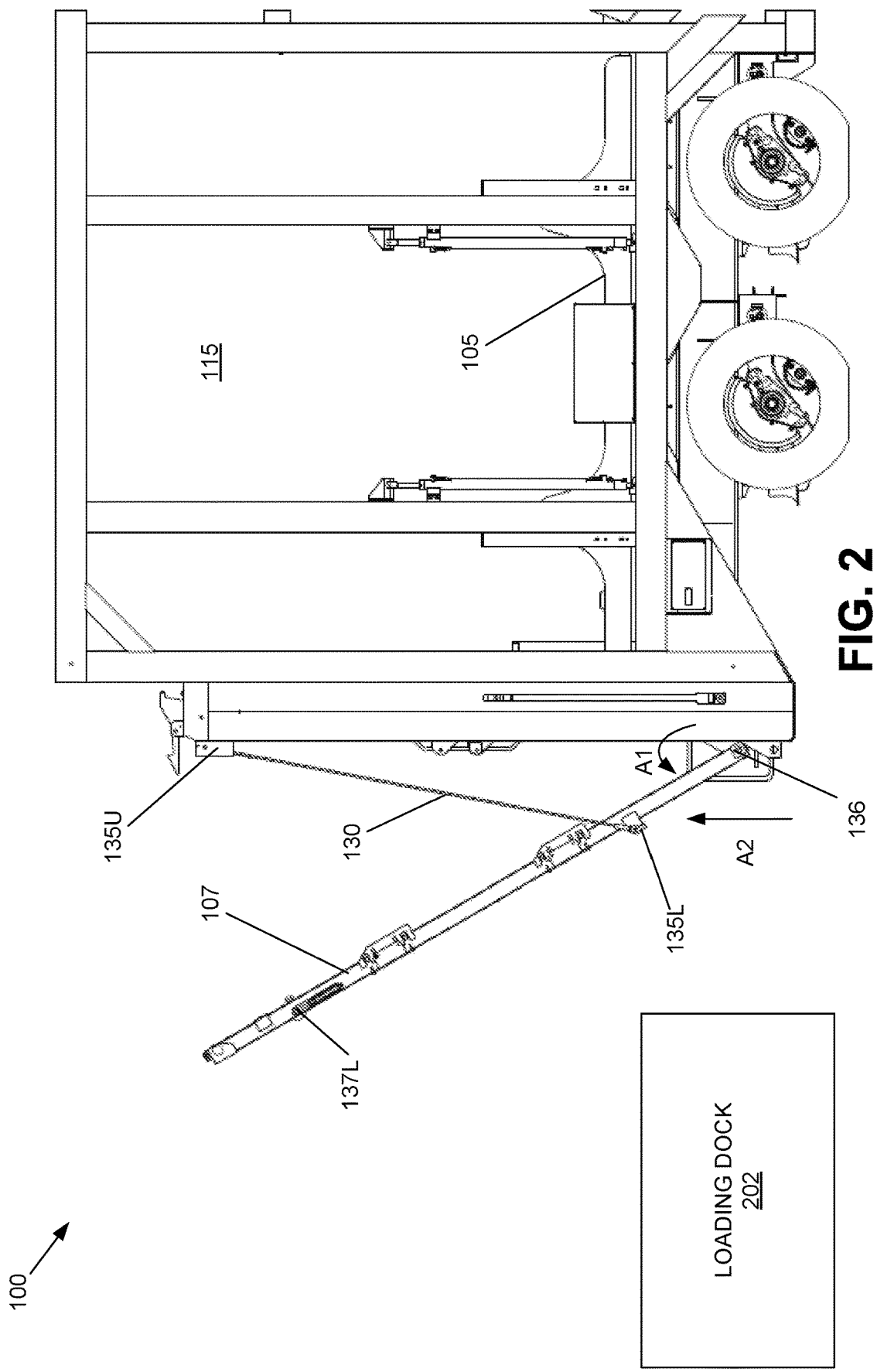
FIG. 2 illustrates a side view of the exemplary trailer system backing up to a loading dock for loading freight, such as ULDs.

Referring now to FIG. 2, this figure illustrates a side view of the exemplary trailer system 100 backing up to a loading dock for loading freight, such as ULDs. In this figure, the tailgate 107 is being lowered away from rear bay 115 towards a loading dock 202. Tailgate 107 may rotate around a pivot point 136 as shown by rotating movement arrow A1 as it is lowered subject to a raising/lowering cable 130. Notably, cable 130 may be of a fixed length and anchored to a section of the rear bay 115 at upper cable coupler 135U and to the tailgate 107 at lower cable coupler 135L. Consequently, as the tailgate 107 is raised or lowered, the pivot point 136 translates up or down along a substantially vertical plane (shown by movement arrow A2) as the cable 130 remains taut. In this way, the pivot point 136 rises as the distal end of the tailgate 107 lowers, and vice versa. While only a single cable 130 is illustrated in FIG. 2, another cable 130 may be provided on another side of the tailgate 107, such that the tailgate 107 is raised and lowered by two raising/lowering cables 130.

The pivot point 136 may comprise a long rod or pin which couples the tailgate 107 to a rear section of the rear bay 115. The pivot point 136 may be coupled to, and driven up and down by, a motor (not shown) or one or more hydraulic pistons (not shown) in some embodiments in order to effect raising and lowering of tailgate 107, although it is envisioned that in other embodiments, such as the one shown in the figures, the pivot point 136 may be free to translate up and down along a rear section of rear bay 115 in response to lifting or lowering forces applied to the tailgate 107. The motor, if present, may comprise an electric motor as understood by one of ordinary skill in the art.

Figure 3:
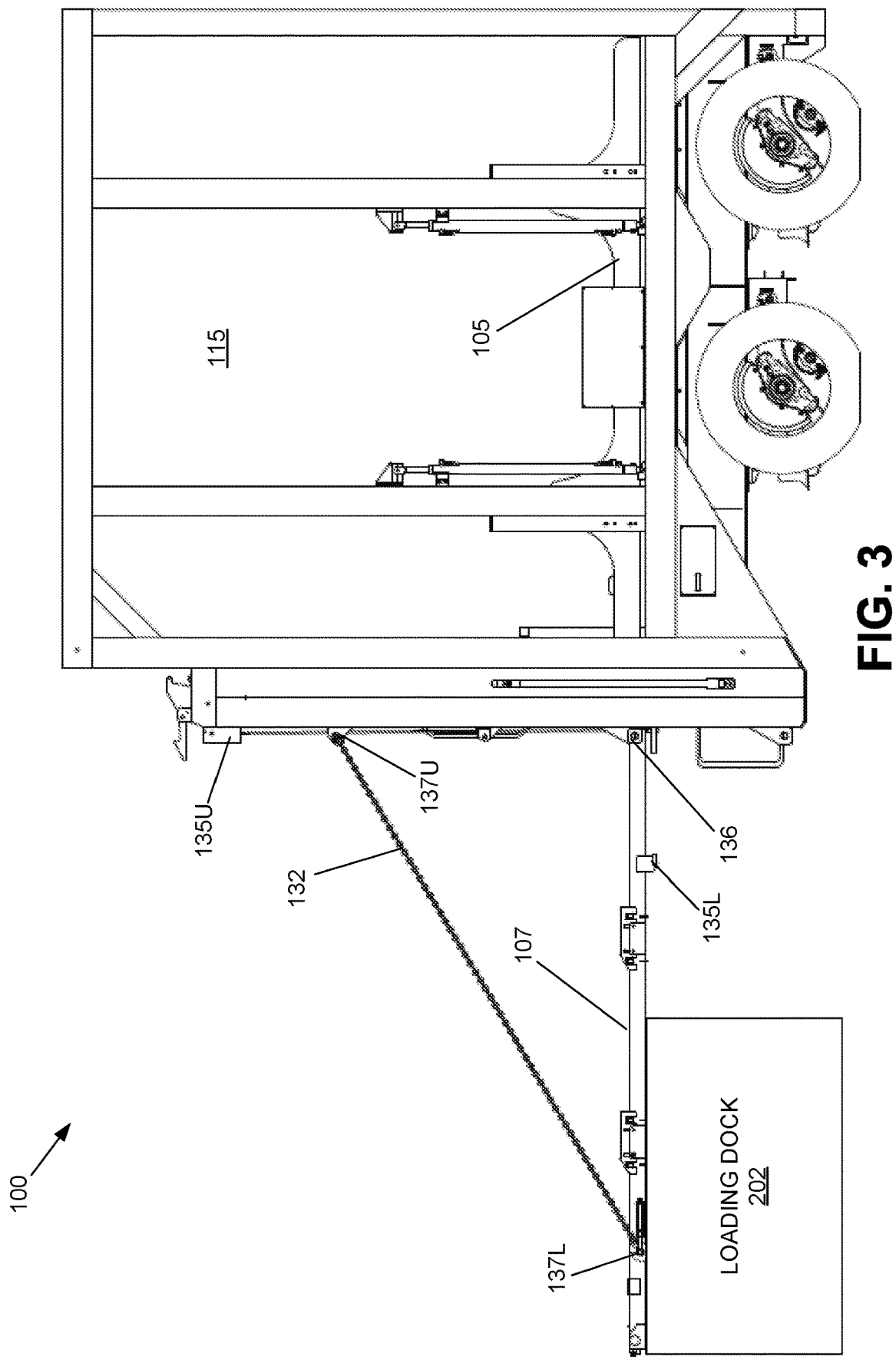
FIG. 3 illustrates the tailgate in a lowered position and resting on the loading dock of FIG. 2 after completing the movements shown in FIG. 2.

Referring now to FIG. 3, this figure illustrates the tailgate 107 in a lowered position and resting on the loading dock of FIG. 2 after completing the movements shown in FIG. 2. In this FIG. 3, the raising/lowering cable 130 (not visible) has been removed from its cable coupler 135L and stowed. Further, supporting tension chains 132 have been attached to the tailgate 107 to support the tailgate 107 while it is in its leveled position. The tension chains 132 are designed for supporting heavy cargo, such as one or more ULDs, placed on the tailgate 107. That is, the tension chains 132 may support the tailgate 107 with cargo loaded on it, even if the trailer system 100 was moved away from the loading dock 202.

The tension chains 132 are anchored at upper chain coupler 137U associated with the rear section of rear bay 115 and lower chain coupler 137L associated with a distal end of tailgate 107. Briefly referring back to the FIG. 2 illustration, the tension chains 132 are removed, however, it is envisioned that the tension chains 132 may be present and "slack" when the tailgate 107 is transitioning between an inclined position and a leveled position as in the FIG. 2 illustration.

Notably, the upper chain coupler 137U may be operable to translate up and down in concert with pivot point 136. As can be seen in the FIG. 2 and FIG. 3 illustrations, a linear distance between upper chain coupler 137U and pivot point 136 remains constant. For this reason, as pivot point 136 is raised so is upper chain coupler 137U, and vice versa. Advantageously, therefore, when the tailgate 107 is in a leveled position it may be translated up or down while remaining level. In this way, the tailgate 107 may be raised or lowered to meet the level of a loading dock (as depicted in the FIG. 2 and FIG. 3 illustrations), a raised deck 105, the space under a raised deck 105, a rack or other structure at ground level, etc. Moreover, the tailgate 107 when in a leveled position may receive a ULD and then be raised or lowered while remaining level in order to align with a different structure.

Figure 4A:
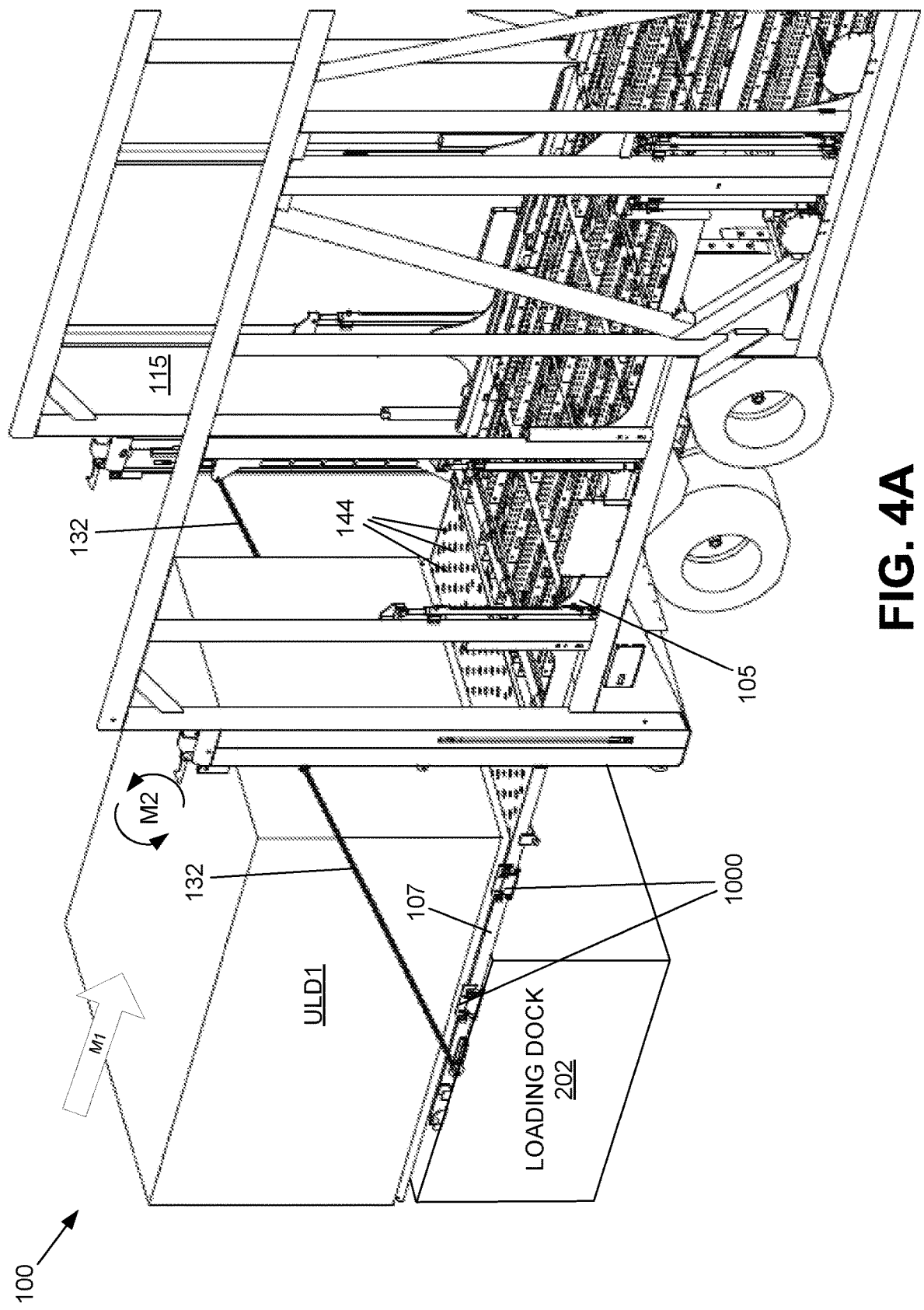
FIG. 4A illustrates a ULD being loaded on the lowered tailgate that was shown in FIG. 3.

Referring now to FIG. 4A, this figure illustrates a ULD1 being loaded on the lowered tailgate 107 that was shown in FIG. 3. In FIG. 4A, a first ULD1 is moved from the loading dock 202 over and across the tailgate 107 as shown by a first movement arrow M1. The tailgate 107 may comprise a plurality of edge-stop devices 1000 as well as a plurality of ball rollers (aka spherical roller balls or ball transfers) 144 covering a planar surface of the tailgate 107. The ball rollers 144 allow the ULD1 to move across the tailgate 107 according to the first movement arrow which comprises a generally linear direction, into the trailer system 100. The ball rollers 144 also allow the ULD1 to be rotated according to a pair of curved/circular movement arrows M2 (with chains 132 disconnected so as not to impede rotation). That is, depending on external forces applied to the ULD1, which could comprise one or more human workers, the ULD1 may be rotated around/about the tailgate 107 in accordance with the circular/curved movement arrows M2. During any circular or curved movement, the edge-stop devices 1000 may be depressed by the ULD1 as described below in connection with FIG. 4B.

Figure 4B:
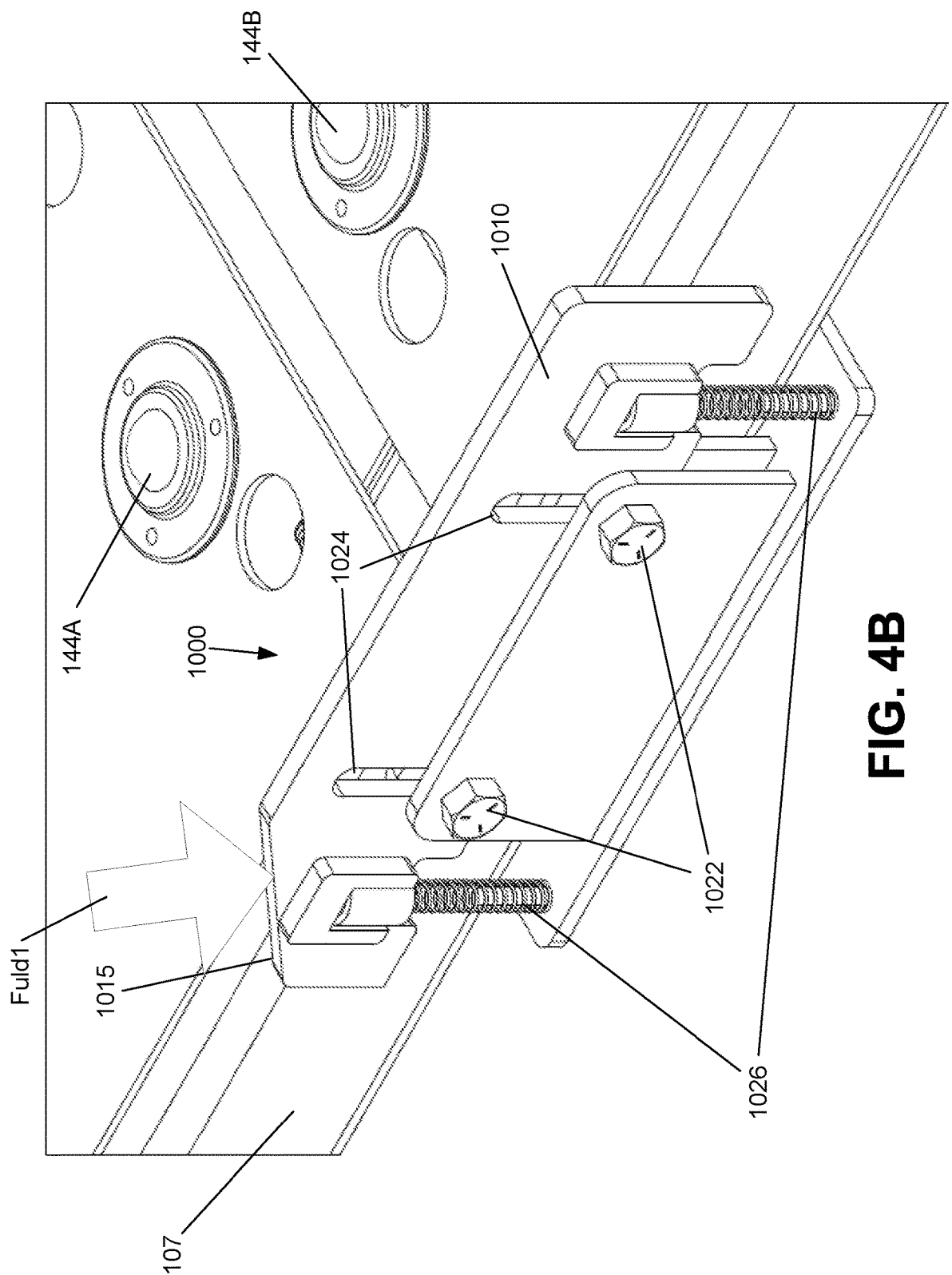
FIG. 4B shows further details of the exemplary tailgate edge-stop device shown in FIG. 4A used in the exemplary improved trailer system.

Referring now to FIG. 4B, this figure shows further details of the exemplary tailgate edge-stop device 1000 as well as the ball rollers shown in FIG. 4A used in the exemplary improved trailer system 100. As can be seen in FIG. 4A, the entire surface of the tailgate 107 may include a plurality of ball rollers 144 shown with further detail in FIG. 4B.

Meanwhile, the exemplary tailgate edge-stop device 1000 comprises a spring-mounted plate 1010 vertically guided by a pair of pins/bolts 1022 through slots 1024 in the plate 1010. The plate 1010 incorporates an angled rear edge 1015. As the ULD1 is positioned/moved onto tailgate 107, it may be rotated over the ball rollers 144A, 144B shown. The ULD1 may need to be rotated in order to position it properly for receipt into rear bay 115. And so, as the ULD1 is rotated/translated over ball rollers 144, the base of the ULD1 may contact the angled rear edge 1015 as shown by force arrow Fuld1, thereby causing the spring-mounted plate 1010 to be depressed to a lowered position (not shown). Once the ULD is removed from pressing the plate 1010, the springs 1026 cause the plate 1010 to return to the raised position, thereby preventing the ULD from translating past the side edge of tailgate 107.

Referring now to FIG. 4C-1, this figure illustrates further details and a perspective view of the ball rollers 144 positioned in the tailgate 107 as shown in FIGS. 4A-4B used in the exemplary improved trailer system 100. As shown in FIG. 4C-1, the tailgate 107 may comprise thirteen rows along its width dimension (Wt) and eighteen columns along its length dimension (Lt) of ball rollers 144 provided in tail gate 107. Ball rollers 144 are off-the-shelf, and may be purchased from Hudson Bearing of Columbus, Ohio. However, other types of ball rollers 144 are possible and may be used without departing from the scope of this disclosure.

Referring now to FIG. 4C-2, this figure illustrates further details of the ball rollers 144 illustrated in FIG. 4C-1 present in the tailgate 107. The ball rollers 144 may be spaced apart by predetermined spacing dimensions S1, S2. According to one exemplary embodiment, the two spacing dimensions S1 and S2 are preferably equal in magnitude. And according to one exemplary embodiment the spacing dimensions S1 and S2 may be equal to about 7.0 inches. However, other magnitudes larger or smaller for these spacing dimensions are possible. And in some other exemplary embodiments (not shown), the two spacing dimensions S1, S2 may be different relative to each other.

The spacing dimensions S1, S2 may also be a function of the size of cargo, i.e. the size of ULDs which may be transported by the system 100 as understood by one of ordinary skill in the art. Exemplary industry standards and recommended best practices for ULDs known as of this writing are published by one industry group known as the International Air Transport Association (IATA). However, other industry groups and their corresponding publications may be consulted if different cargo is desired to be transported by the trailer system 100.

Figure 5B:
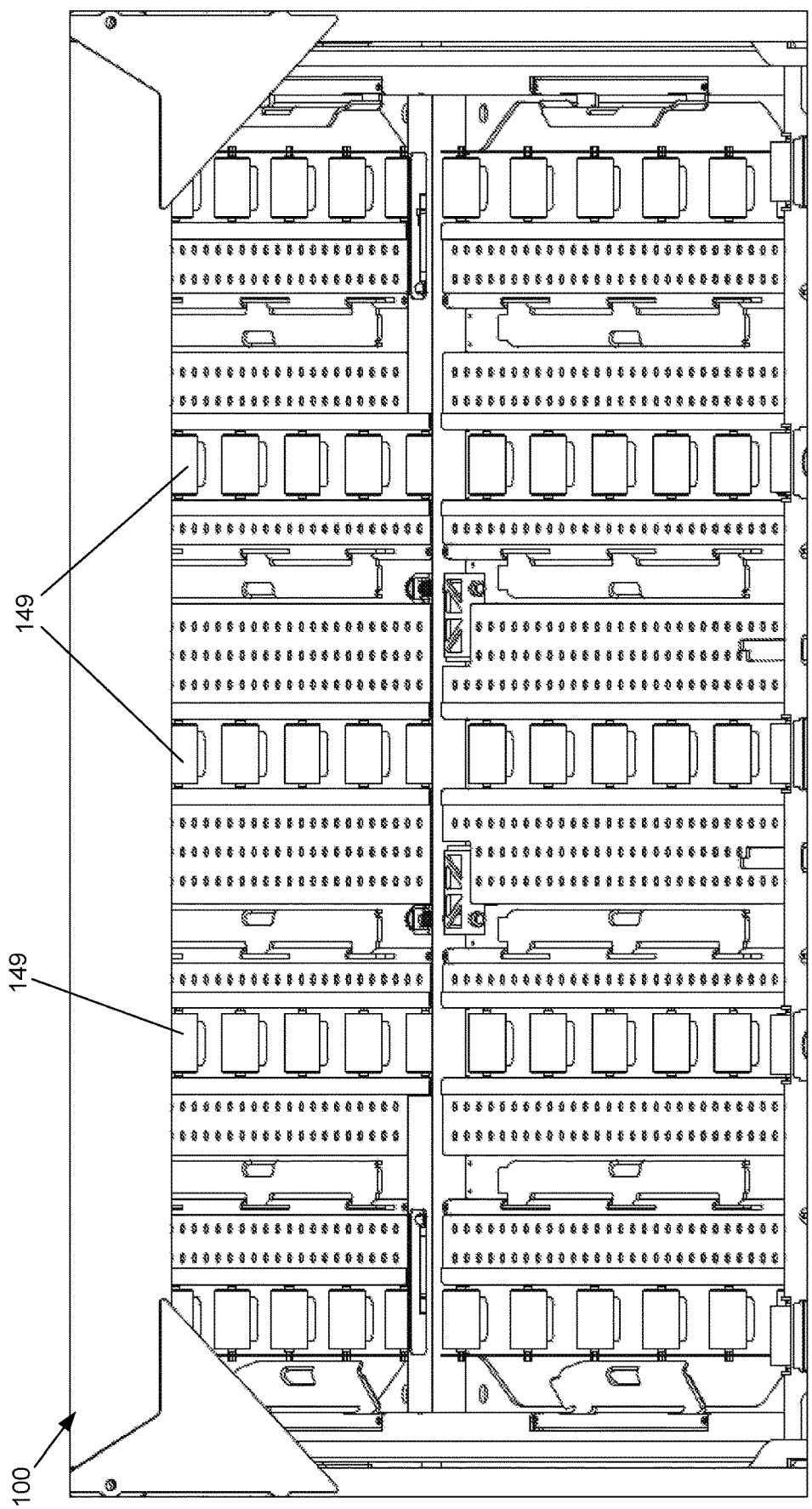
FIG. 5B illustrates an enlarged perspective view of a section of the middle cargo bay.

Referring now to FIG. 5A, this figure illustrates a perspective view of the trailer system 100 after the ULD1 has traversed across the tailgate 107 and into the rear cargo bay 115 and moving towards the middle cargo bay 114. The ULD1 moves according to direction/movement arrow M1 through the cargo bays 115, 114. Each cargo bay 115, 114, 113, and specifically, each deck 101, 103, 105 may comprise a plurality of barrel rollers 149 (not shown in FIG. 5A, but see FIG. 5B). The barrel rollers 149 may also be referred to as conveyor rollers 149 or they could be generically described as cylindrical rollers 149.

Referring now to FIG. 5B, this figure illustrates an enlarged elevation view of a section of the middle cargo bay 114. Each cargo bay 113, 114, 115 may comprise a plurality of barrel rollers 149. According to one exemplary embodiment, each cargo bay 113, 114, 115 comprises five, parallel rows of barrel rollers 149. Barrel rollers 149 are off-the-shelf, and may be purchased from OMNI Metalcraft of Alpena, Mich. However, other types of barrel rollers 149 are possible and may be used without departing from the scope of this disclosure. Also, additional or fewer rows and/or number of barrel rollers 149 may be employed without departing from the scope of this disclosure.

The barrel rollers 149 may allow one or two human workers to push and apply force to move the ULD1 across each deck 105, 101, 103. While human workers are contemplated for this system 100, it is possible that machines, such as remote-controlled and/or automated moving vehicles (not shown), could be employed to apply forces against each ULD1 to cause it to traverse across the barrel rollers 149.

Figure 6:
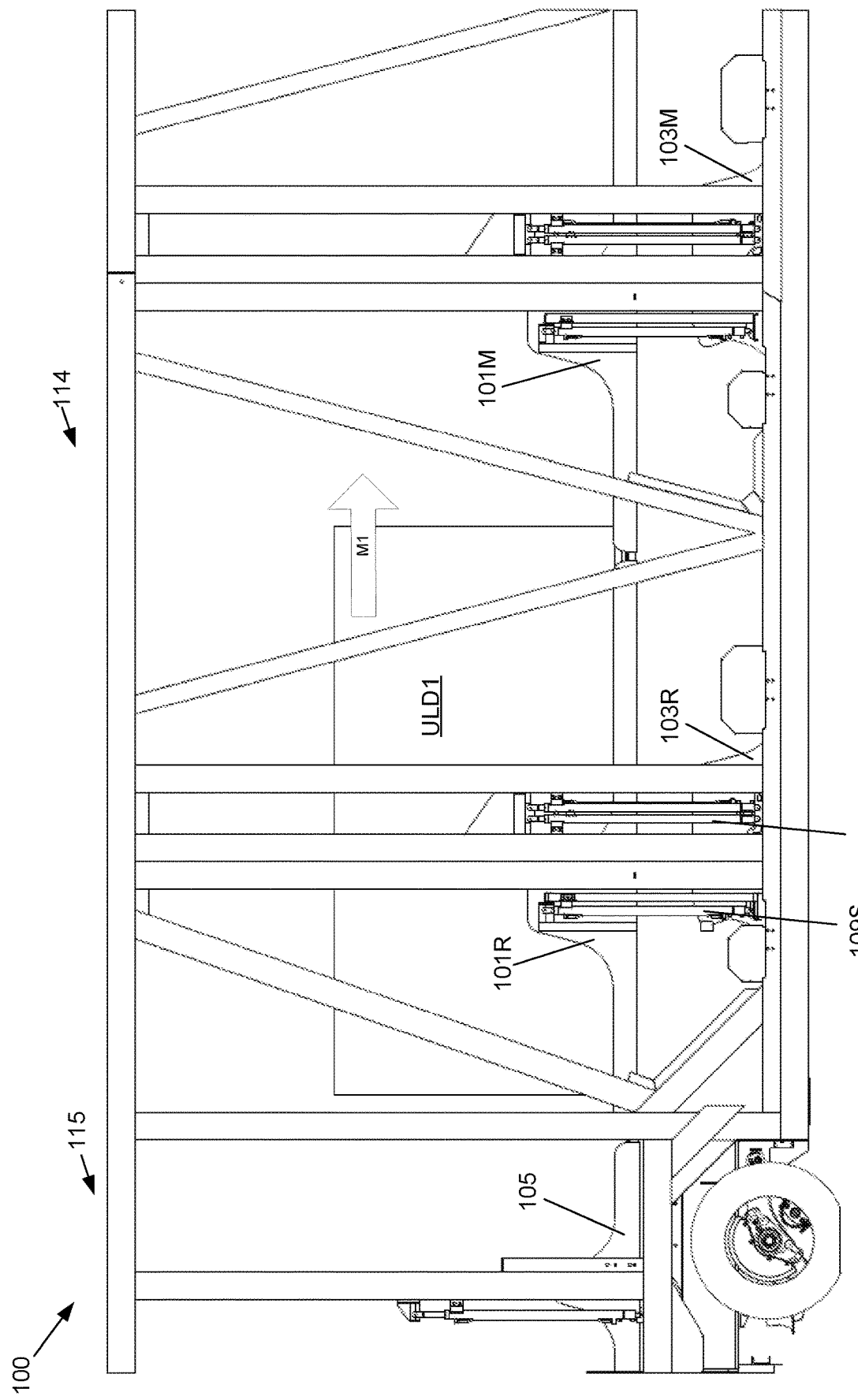
FIG. 6 illustrates a side view of the trailer system of FIGS. 5A-5B as a ULD is moved into the trailer system.

Referring now to FIG. 6, this figure illustrates a side view of the trailer system 100 of FIGS. 5A-5B. This figure shows how the ULD1 moves across each deck 105, 101 in accordance with movement arrow M1. As noted above, the barrel rollers 149 allow the ULD1 to be pushed and/or pulled across each deck 105, 101 and into a desired location along the trailer system 100. The ULD1 may be pushed and/or pulled by a human or a machine such as, but not limited to, an automated moving vehicle.

Figure 7:
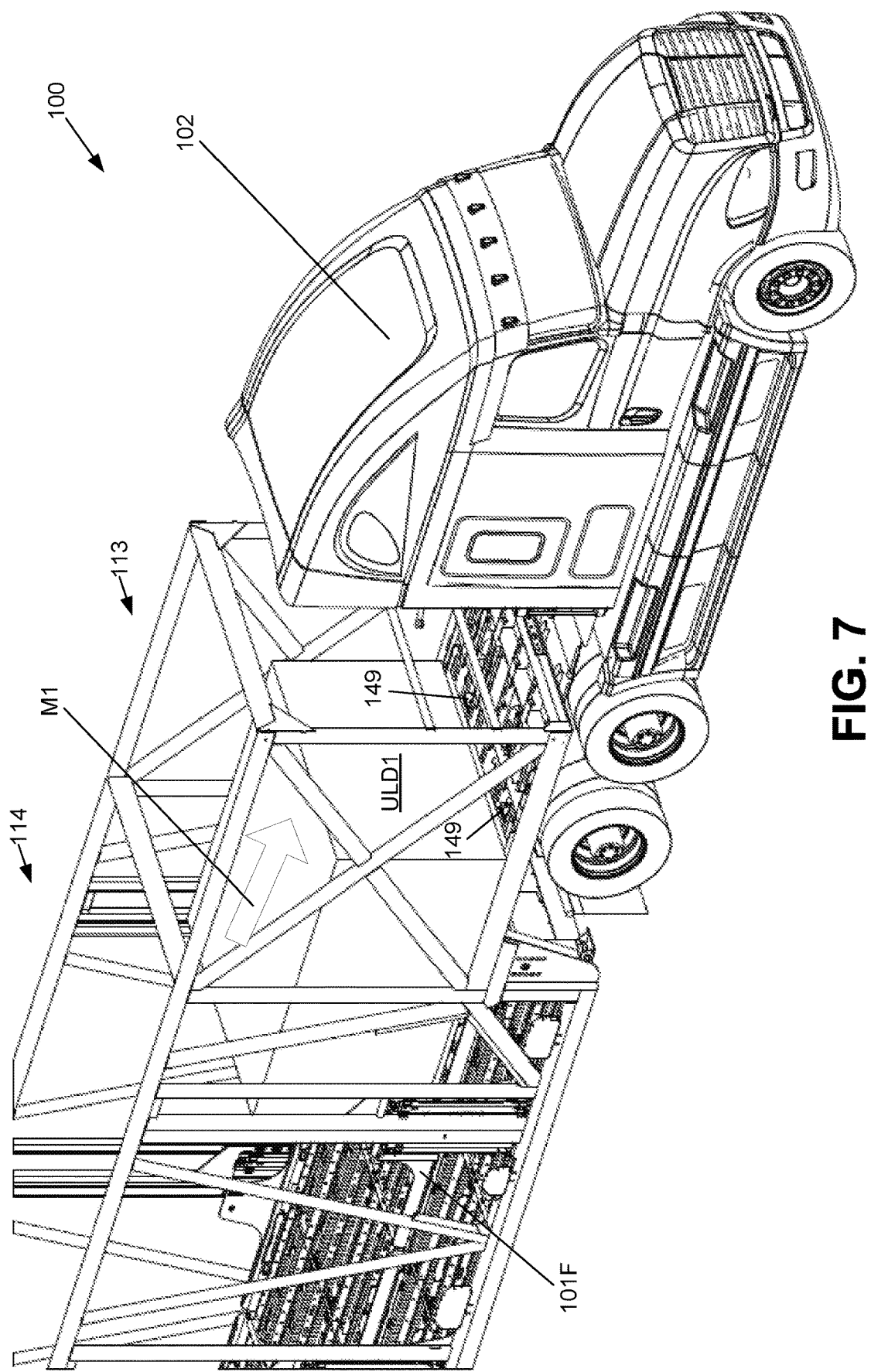
FIG. 7 illustrates a perspective view of the ULD moving from the middle cargo bay to the front cargo bay so that the ULD may be stowed/kept in the front cargo bay for transport by the trailer system as desired.

Referring now to FIG. 7, this figure illustrates a perspective view of the ULD1 moving from the middle cargo bay 114 to the front cargo bay 113 so that the ULD1 may be stowed/kept in the front cargo bay 113 for transport by the trailer system 100, as desired. As noted previously, the ULD1 may be pushed and/or pulled across each deck 101, 103, and 105 since each deck has barrel rollers 149 (not visible, but See FIG. 5B). The front cargo bay 113, on its lower surface, may also have barrel rollers 149 that are in alignment with the barrel rollers of deck 101F. The barrel rollers 149 of the front cargo bay 113 allow the ULD1 to roll across its surface, like decks 101, 103, and 105.

Figure 8:
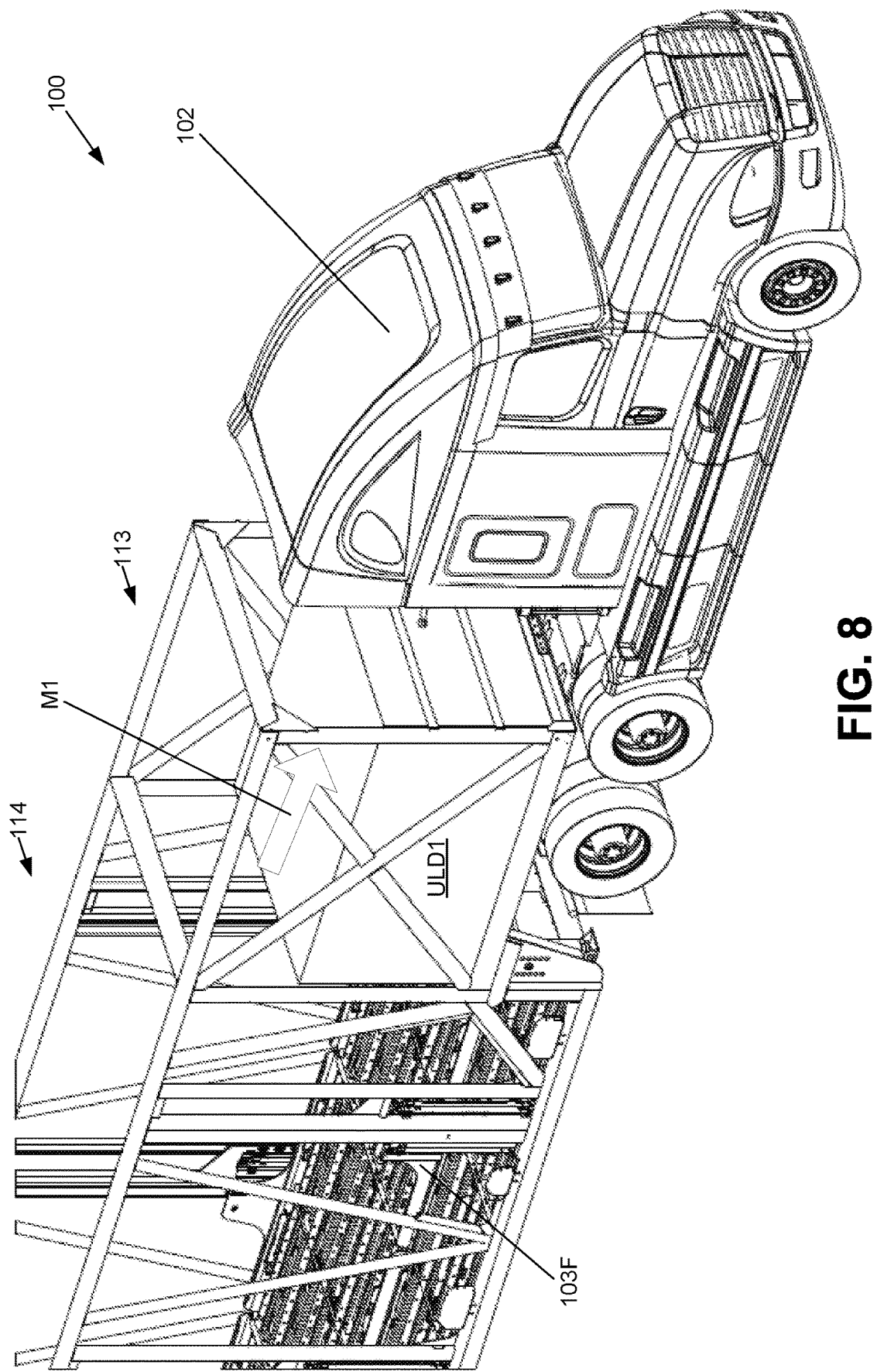
FIG. 8 illustrates a perspective view of the ULD1 being stowed/kept/secured in the front cargo bay for transport by the trailer system, as desired.

Referring now to FIG. 8, this figure illustrates a perspective view of the ULD1 being stowed/kept/secured in the front cargo bay 113 for transport by the trailer system 100, as desired. In this figure, the ULD1 is positioned such that its front wall is in contact or in very close proximity to an end wall portion of the front cargo bay. The ULD1 may be held in place by one or more stop arms 705 (not shown in this figure, but see FIG. 9) that may be positioned between each deck 101, 103, 105, and the front cargo bay 113.

Figure 9:
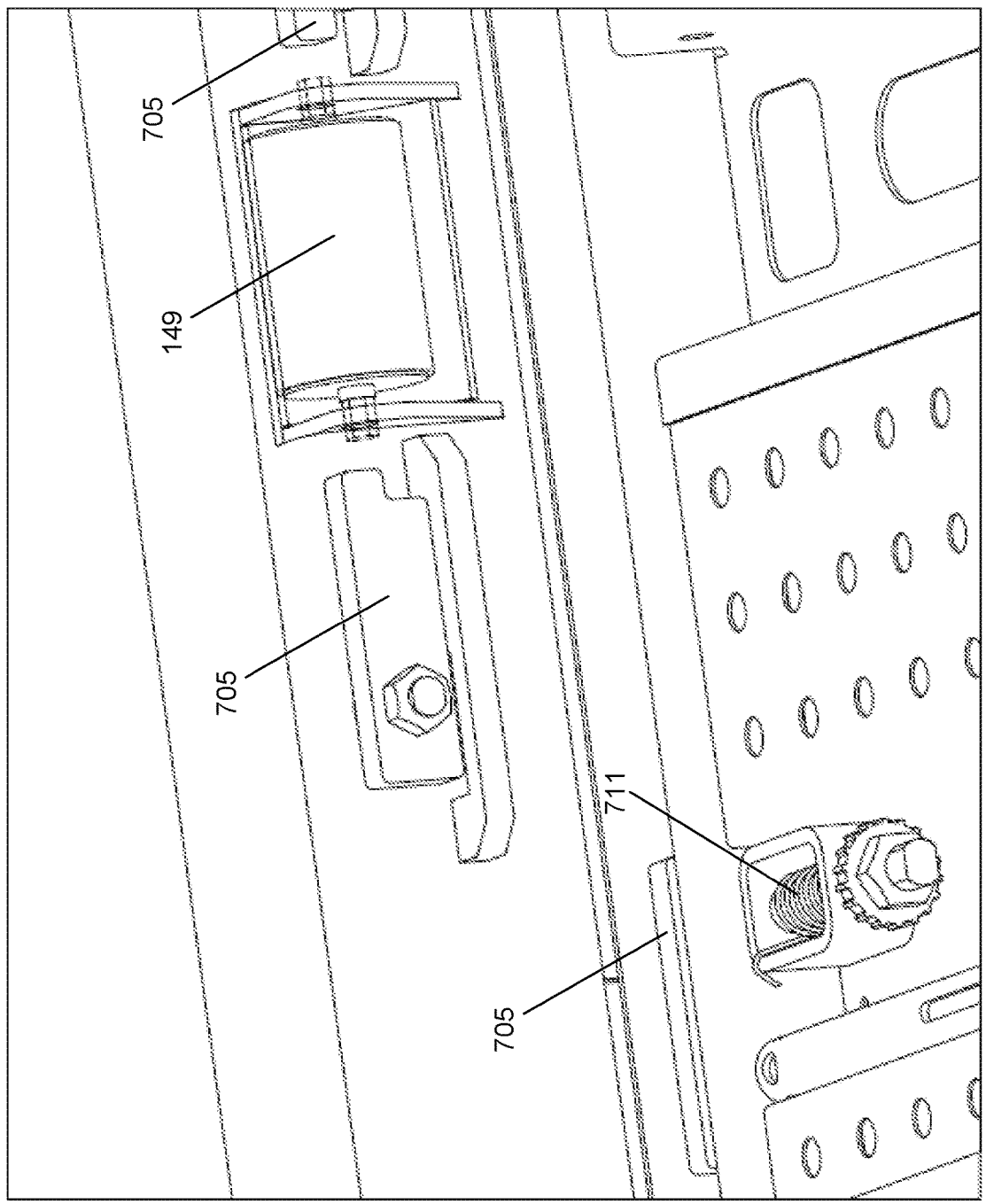
FIG. 9 illustrates a perspective, magnified view of a junction between two decks and/or the front cargo bay area that includes rotatable stop arms.
Figure 12:
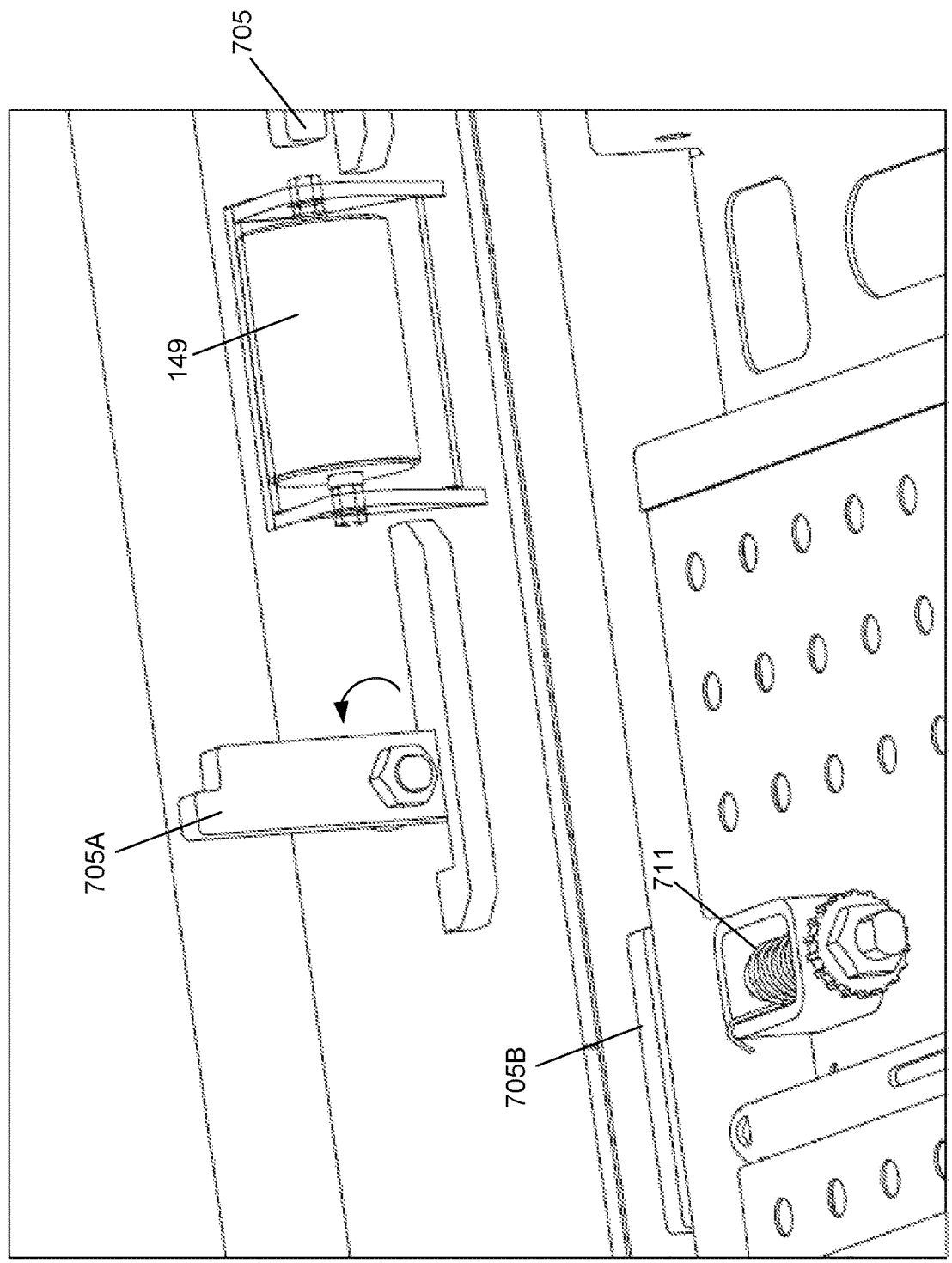
FIG. 12 illustrates a perspective, magnified view of a junction between two decks and/or the front cargo bay area that includes a first rotatable stop arm that has been rotated to an upright position.

Referring now to FIG. 9, this figure illustrates a perspective, magnified view of a junction between two decks 101, 103, 105 and/or the front cargo bay area 113 that includes rotatable stop arms 705. As will be shown in later figures, the stop arms 705 may rotate from a "lowered" position as illustrated in FIG. 9 to an "upright" position as shown in FIG. 12 described below. Each stop arm 705 may be biased by a spring 711.

Figure 10:
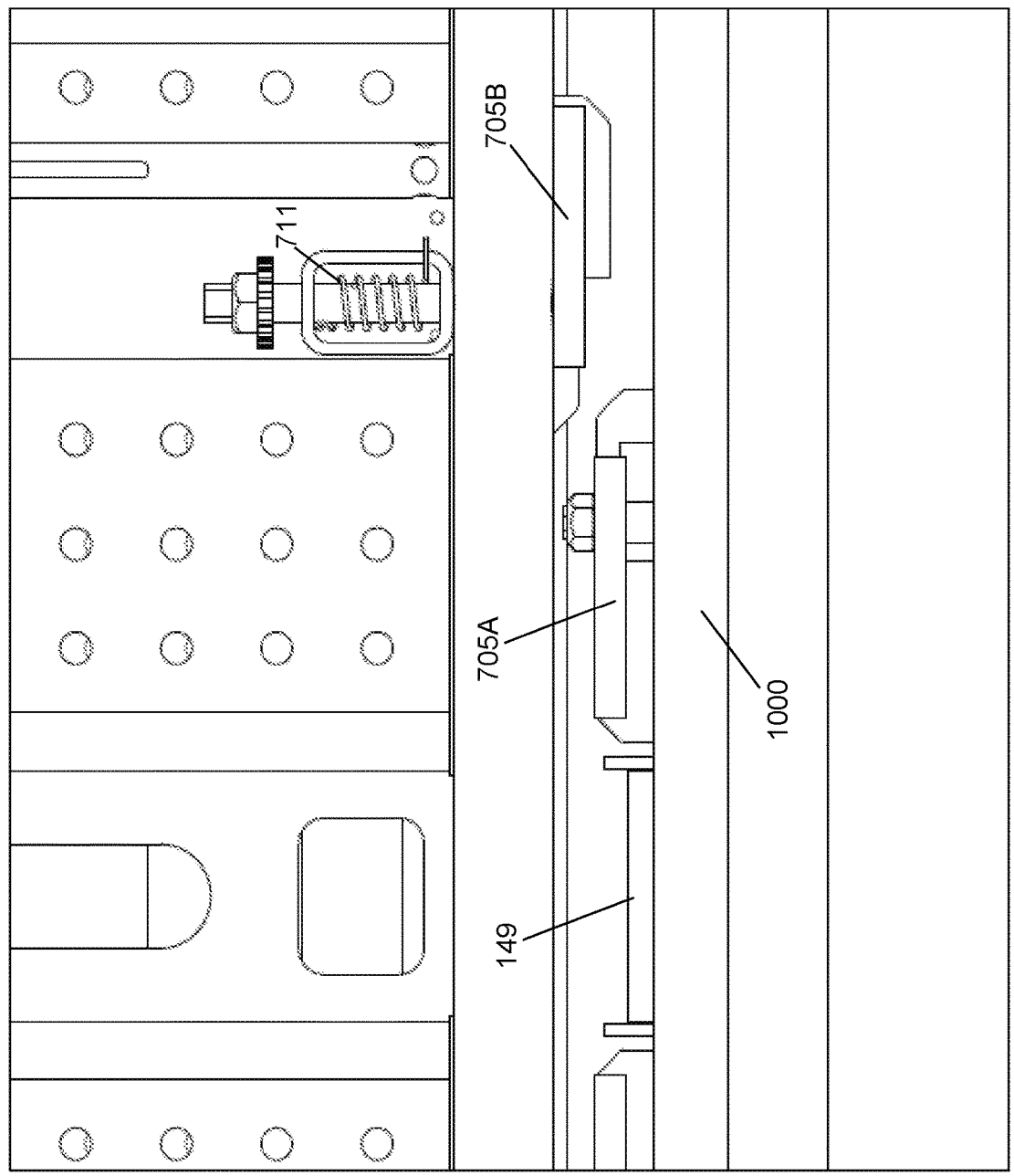
FIG. 10 illustrates a top view of a junction between two decks and/or the front cargo bay area that includes rotatable stop arms.

Referring now to FIG. 10, this figure illustrates a top view of a junction between two decks 101, 103, 105 and/or the front cargo bay area 113 that includes rotatable stop arms 705. This view of FIG. 10 is similar to the perspective view of FIG. 9. In FIG. 10, a first stop arm 705A is in a "lowered" position, and spaced apart from an edge section 1000 of a deck.

Figure 11:
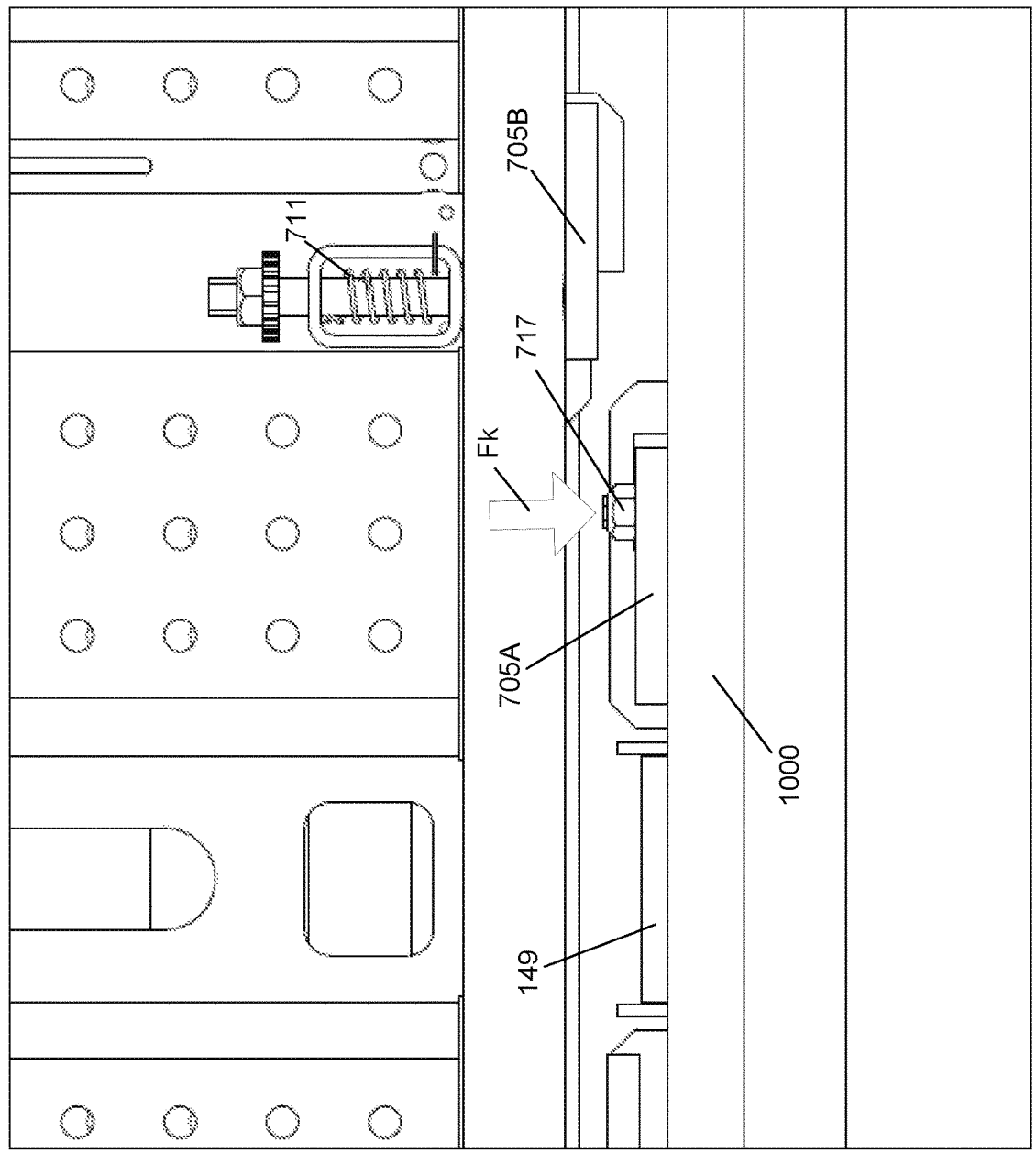
FIG. 11 illustrates a top view of a junction between two decks and/or the front cargo bay area that includes rotatable stop arms, and one stop arm that has been displaced towards an edge of a deck.

Referring now to FIG. 11, this figure illustrates a top view of a junction between two decks 101, 103, 105 and/or the front cargo bay area 113 that includes rotatable stop arms 705.

This view in FIG. 11 is substantially similar to FIG. 10, so only the differences between the two figures will be described here. In this exemplary embodiment, a force Fk has been applied to a shaft 717 that is coupled to the stop arm 705A, and which causes the stop arm 705A to contact the edge 1000 of a deck. This force Fk has compressed a spring 711, similar to the spring 711 for the other stop arm 705B shown in this FIG. 11. Further details of the stop arm 705 and its corresponding spring 711 will be described below in connection with FIGS. 15A-15C.

Referring now to FIG. 12, this figure illustrates a perspective, magnified view of a junction between two decks 101, 103, 105 and/or the front cargo bay area 113 that includes a first rotatable stop arm 705A that has been rotated to an upright position. This view of FIG. 12 is substantially similar to FIG. 11, so only the differences will be described here. In FIG. 12, the first rotatable stop arm 705A has been rotated to an upright position after receiving the force Fk shown in FIG. 11. This force Fk is usually generated by a foot of a human operator. However, it is well within the scope of this disclosure that each stop arm 705 may be activated by a machine, such as a loading drone vehicle or a robot (not shown). Alternatively, actuators may be installed that apply the force Fk such as a pin or hydraulic shaft actuator as understood by one of ordinary skill in the art.

Figure 13:
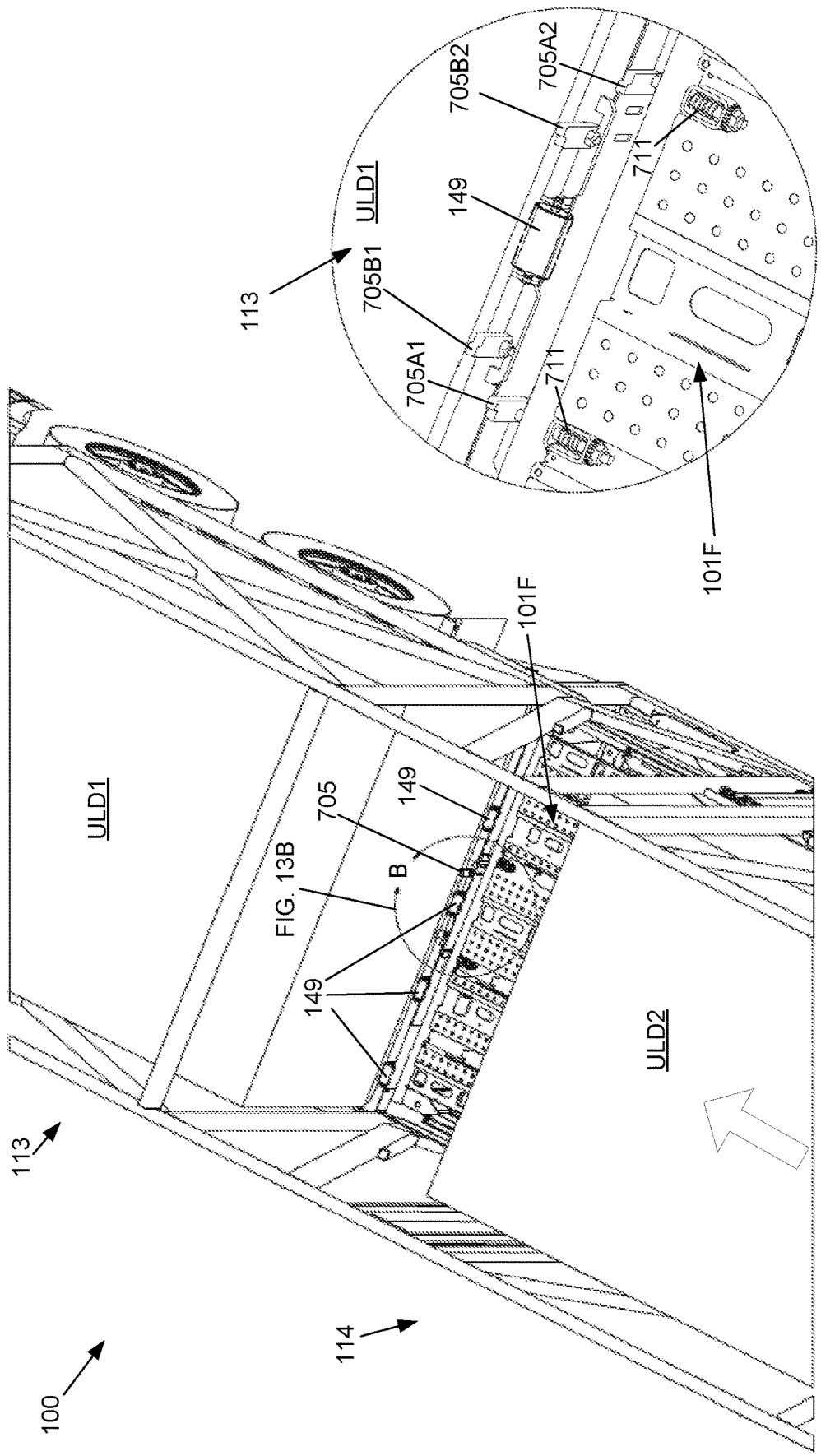
FIG. 13A illustrates a perspective view of the trailer system, and particularly, the front deck and the front cargo bay and how stop arms are positioned at this junction.
FIG. 13B illustrates a perspective view of the trailer system, and particularly, a magnification of a view found in FIG. 13A which shows the front deck and the front cargo bay and how stop arms are positioned at this junction for holding cargo.

Referring now to FIG. 13A, this figure illustrates a perspective view of the trailer system 100, and particularly, the front deck 101F and the front cargo bay 113 and how stop arms 705 are positioned at this junction. The stop arms 705 may hold ULDs in a particular location. In the exemplary embodiment illustrated in FIG. 13A, the front cargo bay 113 is occupied by a first ULD1. Meanwhile, a second ULD2 is being moved across the front deck 101F. The stop arms 705 at the end of a respective deck 101, 103, 105 or front cargo bay 113, may hold a particular ULD in its place within a particular cargo bay area.

Referring now to FIG. 13B, this figure illustrates a perspective view of the trailer system 100, and particularly, a magnification of a view found in FIG. 13A which shows the front deck 101F and the front cargo bay 113 and how stop arms 705 are positioned at this junction. In this view of FIG. 13B, it is clear that the front deck 101F has at least two stop arms 705A1, 705A2 which can stop the second ULD2 as it is moved towards the two stop arms 705A1, 705A2. Similarly, the front cargo bay area 113 which contains the first ULD1, has at least two stop arms 705B1, 705B2 in the upright position and which hold the first ULD1 in position within front cargo bay area 113 and prevents the first ULD1 from moving backwards and crossing on to the front deck 101F.

Figure 14:
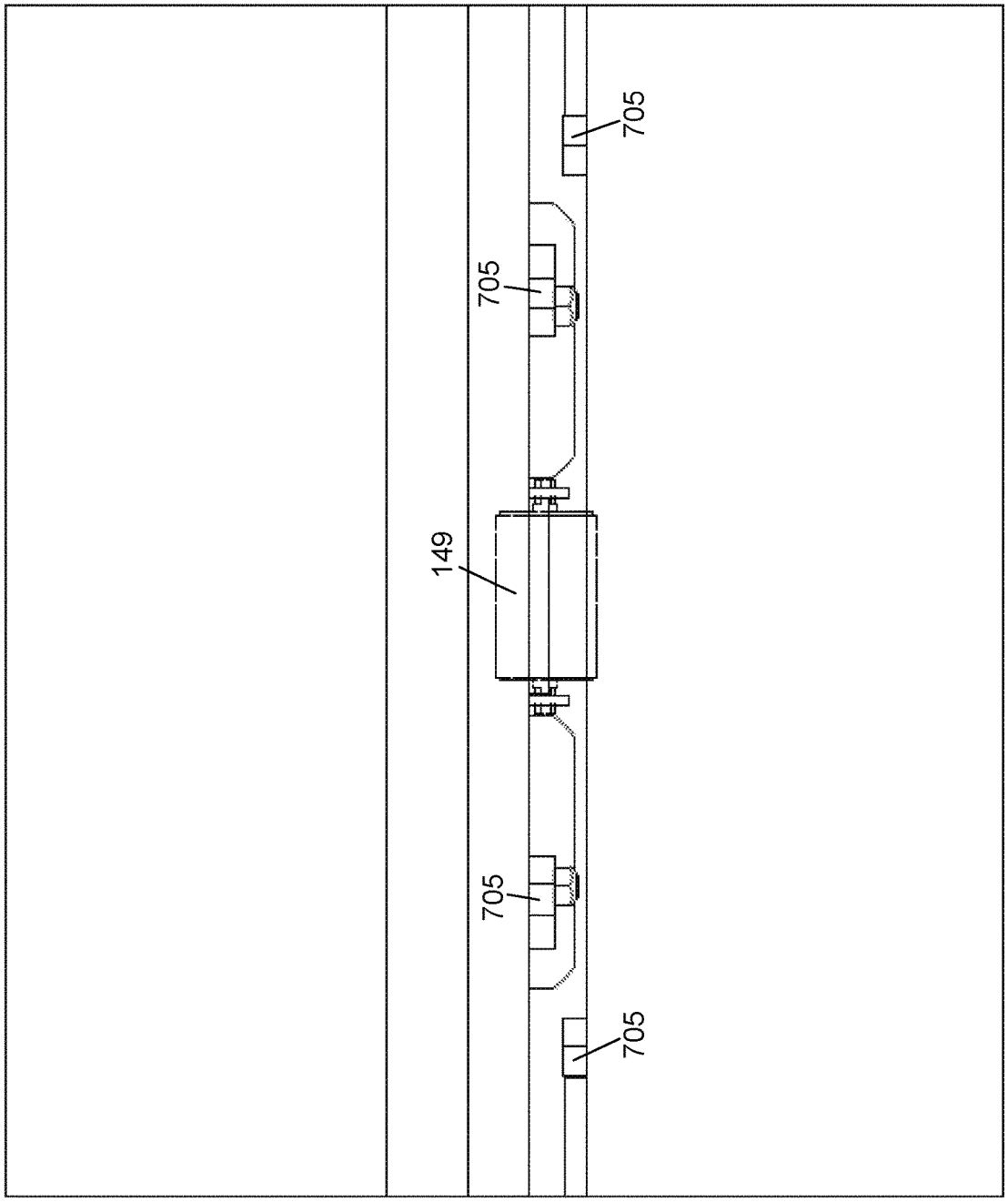
FIG. 14 illustrates a top or elevation view of two stop arms in the raised or upright position according to an exemplary embodiment.

Referring now to FIG. 14, this figure is a top or elevation view of two stop arms 705 in the raised or upright position according to an exemplary embodiment. This view shows how a barrel roller 149 may be positioned between a respective pair of stop arms 705.

Referring now to FIGS. 15A-15C, these figures illustrate an exemplary ULD kick-stop device 700 used in certain embodiments of the improved trailer system 100 according to the solution to prevent forward and/or backward movement of the ULD1. Once the ULD1 is positioned on a given deck 101, 103, 105, kick-stop devices 700 may be rotated to an up position in order to prevent forward or backward shifting of the ULD 301 on the barrel rollers 149.

Advantageously, when the kick-stop devices 700 for a given deck 101, 103, 105 or front cargo bay 113 are rotated to an up position, the ULD1 positioned on the deck 101, 103, 105 or in cargo area 113 is secured in place such that it is prevented from longitudinal movement along the central axis of the trailer system 100. As illustrated in FIG. 15A, the exemplary kick-stop device 700 shown in FIG. 15A comprises a rotatable stop arm 705 and a base stop 707. The rotatable stop arm 705 is spring-loaded with a spring 711 contained within a case 713 such that it is biased downward when ULDs are desired to pass over or go between decks 101, 103, 105 and over to cargo area 113.

In this way, when the rotatable stop arm 705 is in an "up" position, as shown in FIG. 15A, the torsional and extension spring force works to seat the arm 705 against a portion 709 of the base stop 707, thereby holding the arm 705 in an upright position to prevent passage of the ULD1 over the upright arm shown in FIG. 15A.

Referring now to FIG. 15B, similarly, when the rotatable stop arm 705 is in a "down" position as shown in FIG. 15B, the spring force of spring 711 works to urge the arm 705 towards the deck and against the base stop 707, thereby preventing the arm 705 from being inadvertently rotated.

Referring now to FIG. 15C, this figure illustrates an exploded parts view of the kick stop device 700. The kick stop device may include a central shaft 717 which is biased with the spring 711. The spring 711 may engage pin 715 which couples to the central shaft 717. The central shaft 717 couples to the rotatable stop arm 705. The kick stop devices 700 use the word "kick" because when a kick force (Fk) from a shoe of a worker is applied to the shaft 717, the rotatable stop arm 705 will rotate in a counter clock-wise motion to the "upright" position as illustrated in FIG. 15A.

The kick force (Fk) may be generated by a human according to one exemplary embodiment. However, this force Fk could be exerted by a remote controlled machine such as a pin actuator and/or a motor (not illustrated) as understood by one of ordinary skill in the art.

Figure 16:
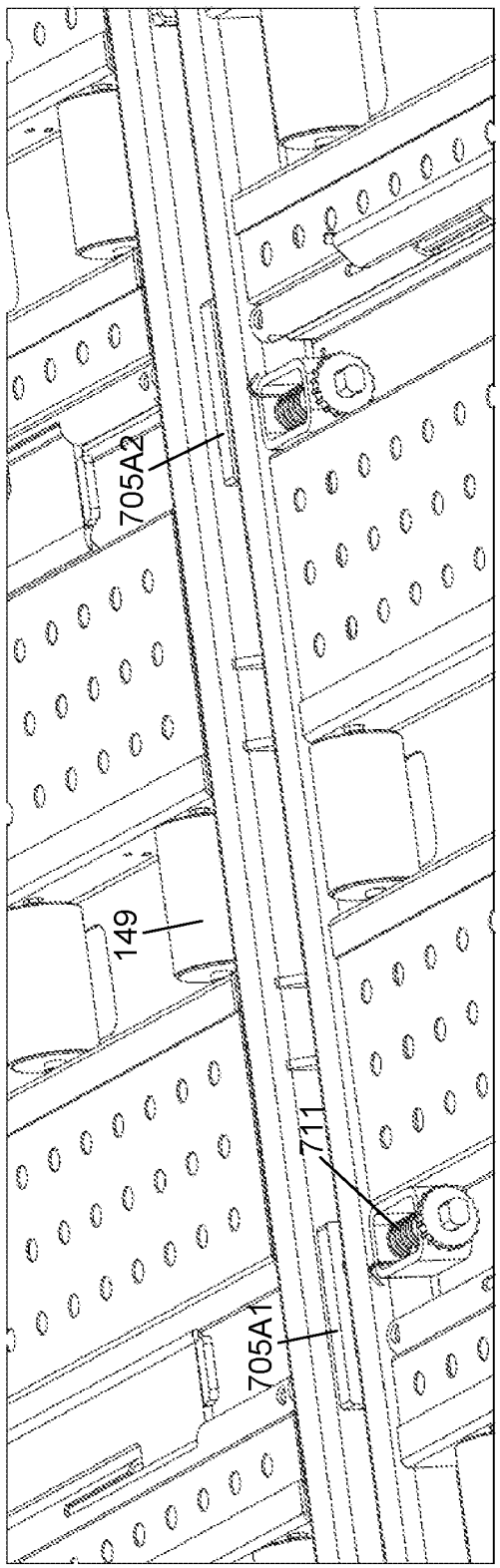
FIG. 16 illustrates a perspective view between two decks and how stop arms in a lowered state are positioned at this junction.

Referring now to FIG. 16, this figure illustrates a perspective view between two decks and how stop arms 705A1, 705A2 in a lowered state are positioned at this junction. When the stop arms 705 are in a lowered state illustrated in FIG. 16, ULDs may freely roll across deck junctions using barrel rollers 149.

Figure 17:
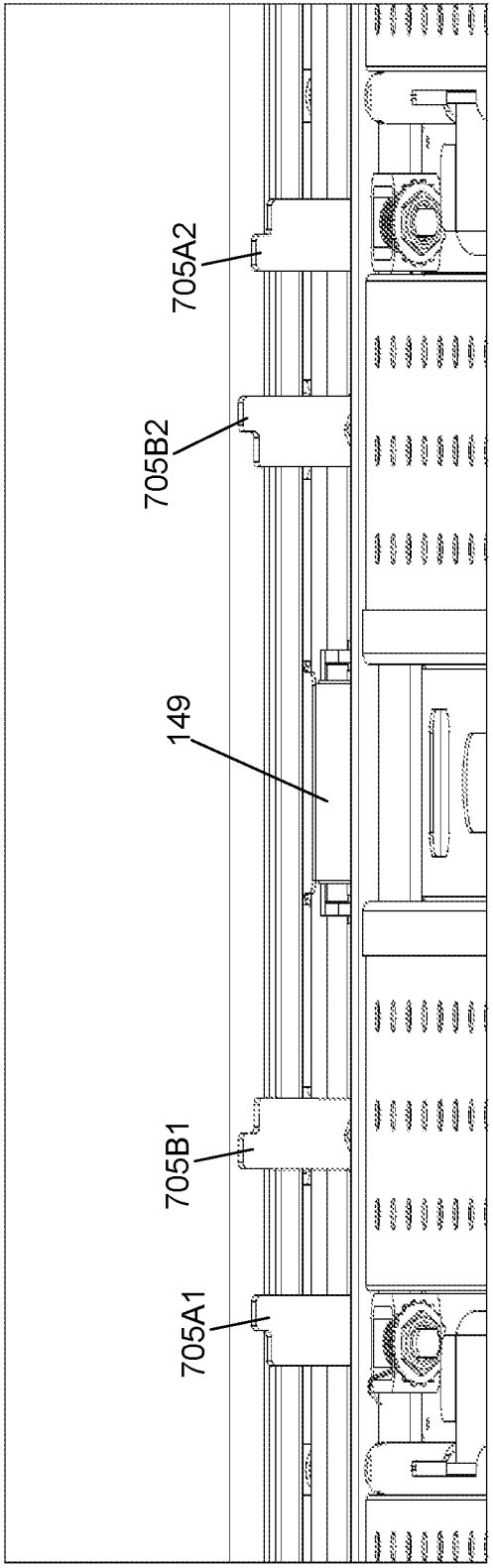
FIG. 17 illustrates a perspective view between two decks and how stop arms in a raised state are positioned at this junction.

Referring now to FIG. 17, this figure illustrates a perspective view between two decks and how stop arms 705A1, 705A2, 705B1, 705B2 in a raised state are positioned at this junction. When the stop arms 705A1, 705A2, 705B1, 705B2 are in a raised state, they may prevent traveling of ULDs between respective decks. Further, the arms 705A1, 705A2, 705B1, 705B2 may also confine a ULD to a respective cargo area 113, 114, and 115.

Figure 18:
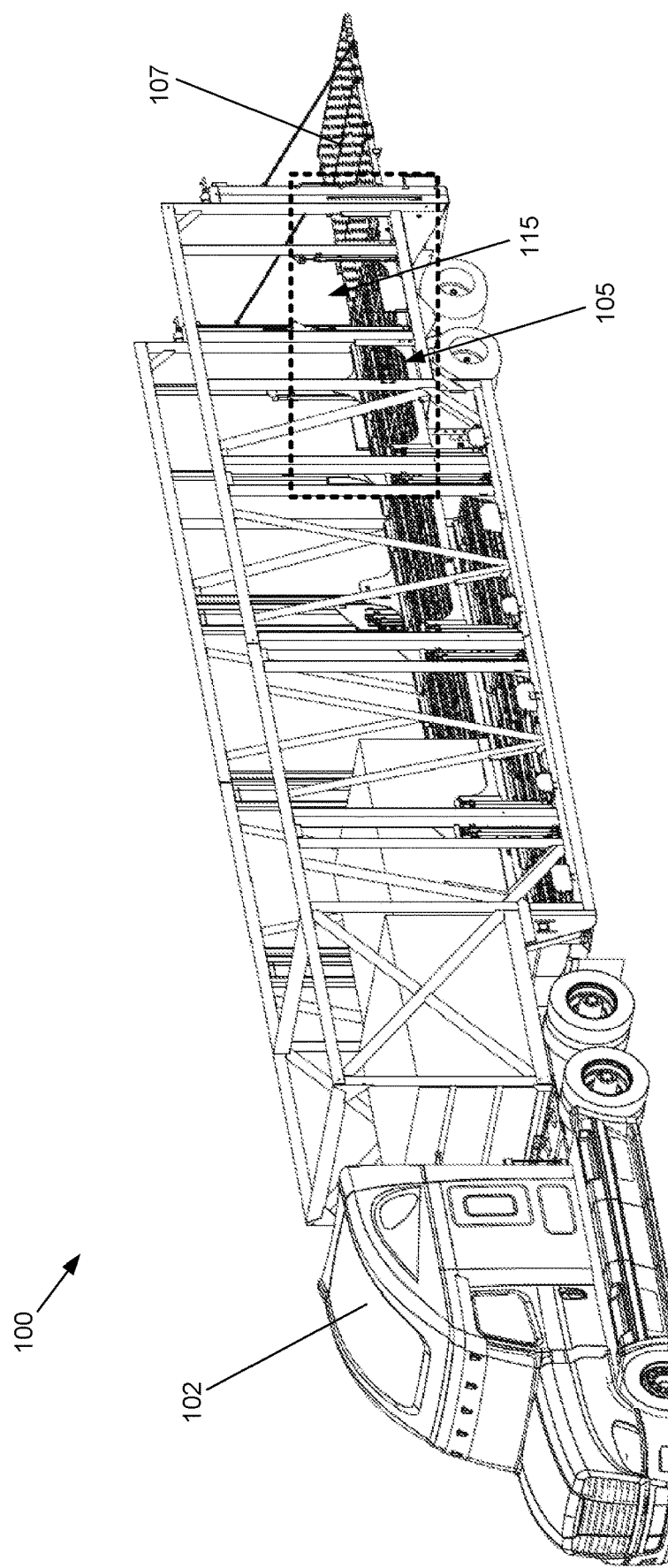
FIG. 18 illustrates another perspective view of the trailer system and it highlights the rear cargo bay and its rear deck that will be described in further detail below.

Referring now to FIG. 18, this figure illustrates another perspective view of the trailer system 100 with the rear cargo bay 115 and its rear deck 105 highlighted with a dashed rectangular box to indicate that this region will be the focus of the next several views. FIG. 18 shows the tailgate 107 in a lowered position for receiving cargo, such as, but not limited to a ULD (not shown).

Figure 19:
FIG. 19 illustrates an exemplary ULD guide and constraint device that is present in each deck, such as the rear deck illustrated and highlighted in FIG. 18.

Referring now to FIG. 19, this figure illustrates exemplary ULD guide and constraint system 500 that are present in each deck of the trailer system 100, such as the rear deck 105 illustrated in FIG. 18. The ULD guide and restraint system 500 may be used in certain embodiments of an improved trailer system 100 according to the solution to guide forward and backward movement of a ULD (not shown) while restricting side-to-side and/or vertical movement of same. As illustrated in FIG. 19, the inner six ULD guide and constraint systems 500B-E have various ULD widths. Each system 500 may comprise at least one guide flange 510 that is hinged. Meanwhile, the outer two flanges 512 of the ULD guide and restraint system 500A may be permanently held/positioned in a raised or elevated manner and are not hinged.

The flanges 510, 512 of each system 500 may engage lower portions of ULDs (not shown) which may have various widths. Notably the upper portion of flange 512 and flange 510 are positioned to fit over a lower flange typically found on the base of a ULD such that vertical movement is limited.

Each pair of guide flanges 510, 512 for a respective ULD guide and restraint system 500 may have predetermined spacing or set widths according to widths of ULDs which may be standardized. For example, the distance between flanges 510, 512 of each ULD guide and constraint device 500 may be provided as follows: width for system 500A=about 96.0 inches; width for system 500B=about 88.0 inches; widths for systems 500C, 500D, and 500E=about 61.5 inches. Other dimensions smaller or larger between these pairs of flanges 510, 512 are possible and are included within the scope of this disclosure. Moreover, other variations of flange types and device spacings are envisioned for receiving/guiding and restraining other types of cargo, such as, but not limited to, pallets for example.

Figure 20:
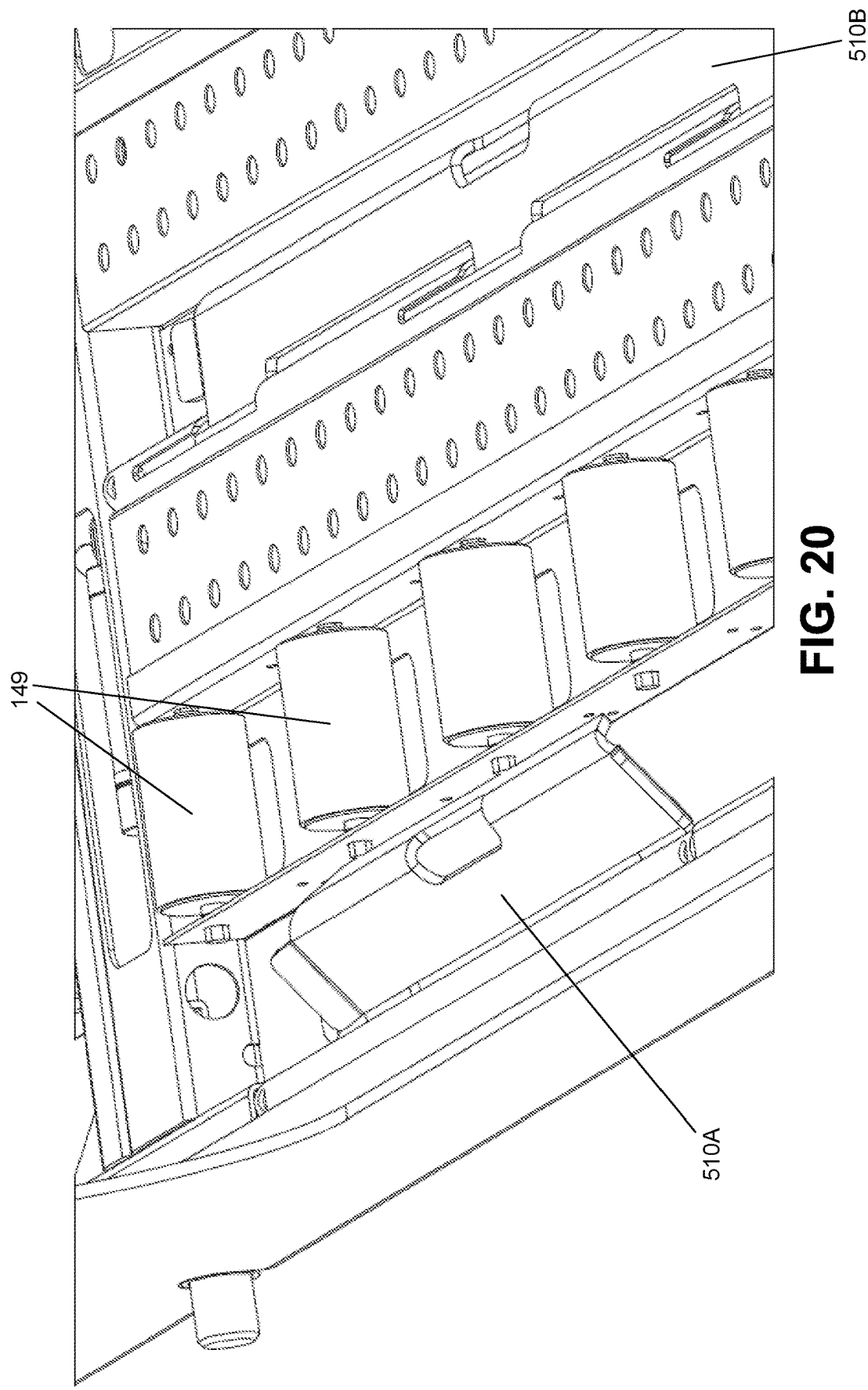
FIG. 20 illustrates a perspective view of the deck illustrated in FIG. 19.

Referring now to FIG. 20, this figure illustrates a perspective view of the deck 105 illustrated in FIG. 19. As shown, the guide flanges 510A, 510B may be folded down into a stored position in order to be stowed beneath a level defined by barrel rollers 149 of a given deck 105. And as such, when stored or stowed, each guide flange 510 will not impede positioning or transitioning of a ULD on or between decks 101, 103, 105. In the next several figures, it will be shown that the guide flange 510A may be rotated and slid forward to a deployed or elevated position, like that shown in FIG. 19 such that the vertical wall of the ULD guide and constraint device 500 is received by a flange 510.

Figure 21:
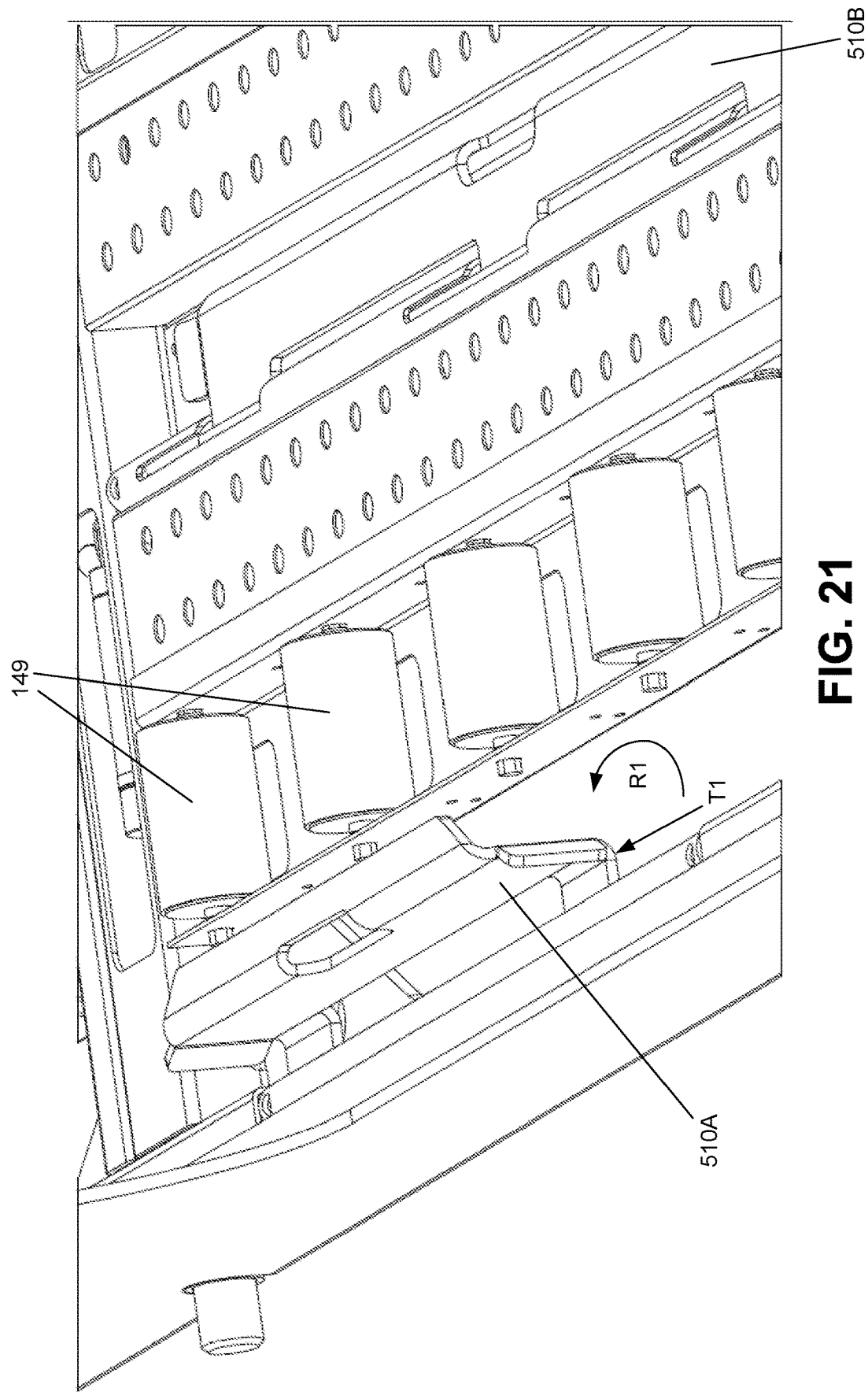
FIG. 21 illustrates a perspective view of the deck in FIG. 20, but with one flange now rotated to an elevated or deployed position as well as moved/translated along an axis of the deck.

Referring now to FIG. 21, this figure illustrates a perspective view of the deck 105 illustrated in FIG. 20, but with one flange 510A now rotated to an elevated or fully deployed position as well as moved/translated along an axis of the deck 105. Specifically, a first flange 510A has been rotated along the rotation directional arrow R1 relative to the position shown in FIG. 20. And the flange 510A has been translated along a directional arrow T1 which is along a longitudinal axis of the rear deck 105. Advantageously, the flanges 510 rotate towards the space that may be occupied by a ULD, such that when a ULD is present, the flange 510 cannot be rotated back to its stored position until the ULD is removed.

And as a further advantage, when in the deployed position, as shown in FIG. 21, the first guide flange 510A may engage a lower portion of a ULD (not shown). The first guide flange 510A may work in concert with a second guide flange 510, as illustrated in FIG. 19 described above. In this way, pairs of flanges 510, 512 for each ULD guide and constraint system 500 may receive a ULD and prevent it from moving in a lateral direction or vertical direction. Other pairs of flanges 510, 512 for each ULD guide and constraint system 500 may be provided on the various decks 101, 103, 105 and positioned for receiving ULDs of different sizes. The hinged flanges 510 may be kept in a stored (i.e. lowered) position when not in use.

Figure 22:
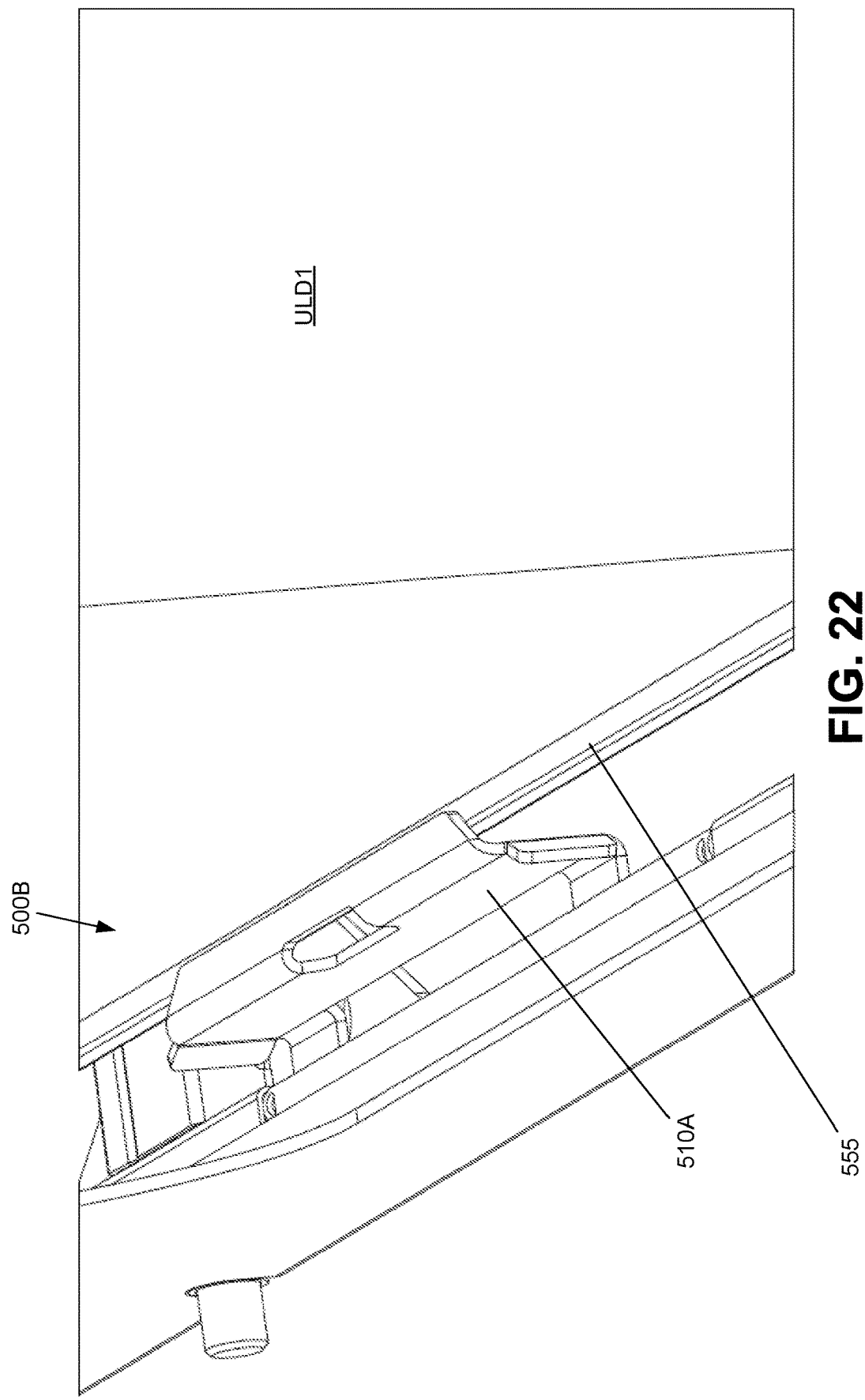
FIG. 22 illustrates a perspective view of the deck illustrated in FIG. 20, but with a flange of a ULD guide and constraint device engaging a lower portion of a first ULD.

Referring now to FIG. 22, this figure illustrates a perspective view of the deck 105 illustrated in FIG. 20, but with a flange 510A of a ULD guide and restraint device 500B engaging a lower portion 555 of a first ULD1. In this figure, the lower portion 555 of a first ULD1 is visible and it may comprise a metal rail. The flange 510 is in a deployed position and directly contacts/engages the lower portion 555 of the first ULD1 in order to keep the ULD1 from moving/shifting during transport.

Figures 23A, 23B, 23C, 23D:
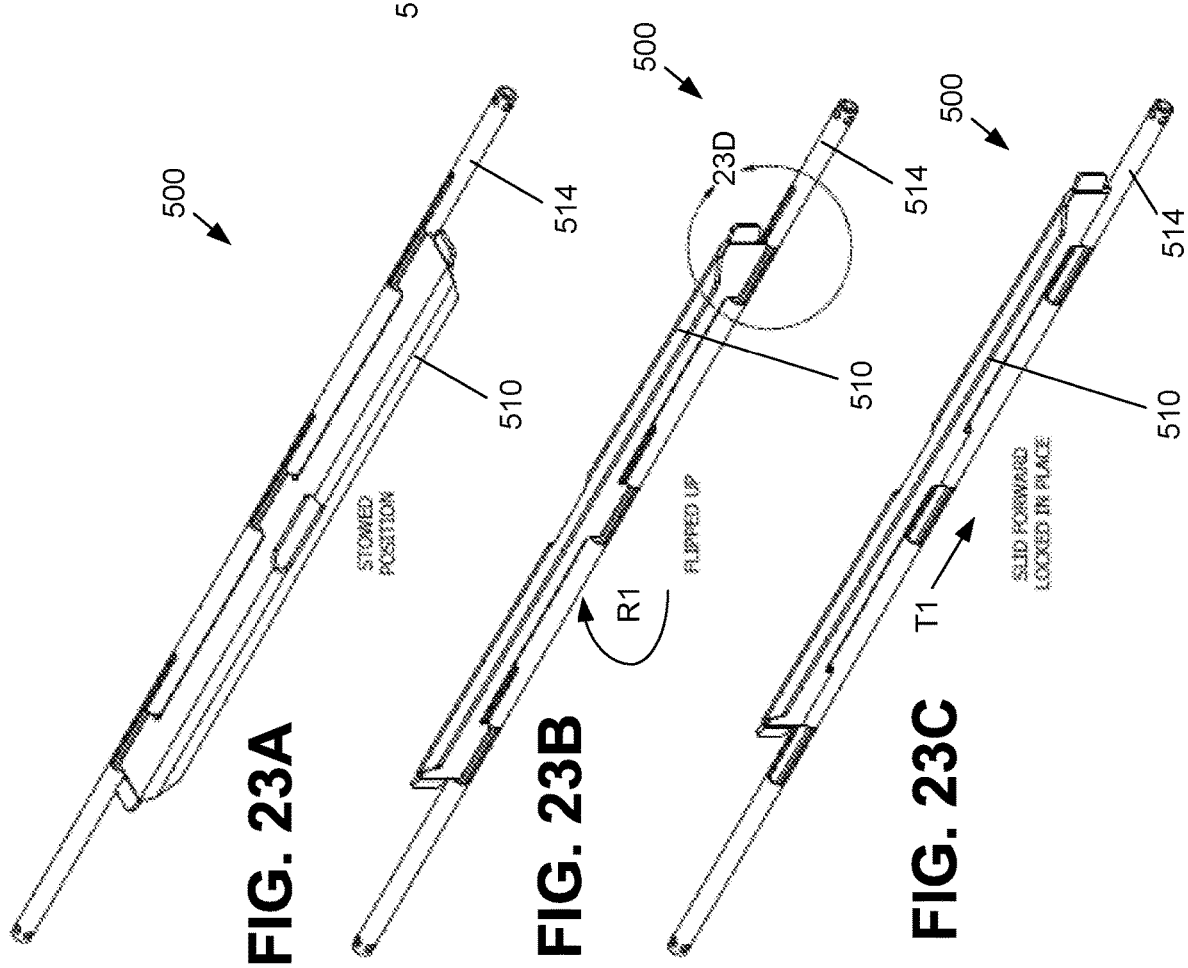
FIG. 23A illustrates a side perspective view of a ULD guide and restraint device in a stowed position.
FIG. 23B illustrates a side perspective view of the ULD guide and restraint device from FIG. 23A, but now rotated.
FIG. 23C illustrates a side perspective view of the ULD guide and restraint device 500 from FIG. 23B, but now translated along a linear direction.
FIG. 23D illustrates a side and closeup perspective view of the ULD guide and restraint device from FIG. 23B after the flange has been rotated but before the flange has been locked into position.

Referring now to FIG. 23A, this figure illustrates a perspective view of a ULD guide and restraint device 500 in a stowed position. As noted previously, the ULD guide and restraint device 500 may comprise a flange 510. The device 500 may further comprise a cylindrical pipe 514 that is coupled to the flange 510. This pipe 514 is usually hollow so that it may engage a solid pin or rod 516 (see FIG. 23D) about which the flange 510 rotates. That is, the pipe 514 is usually held stationary in a respective deck 101, 103, 105 such that the solid pin 516 coupled to the flange 510 may rotate within the pipe 514.

Referring now to FIG. 23B, this figure illustrates a perspective view of the ULD guide and restraint device 500 from FIG. 23A, but now rotated. Specifically, the flange 510 of the device 500 has been rotated within the pipe 514 according to a clockwise directional arrow R1.

Referring now to FIG. 23C, this figure illustrates a perspective view of the ULD guide and restraint device 500 from FIG. 23B, but now translated along a linear direction. Specifically, the device 500 has been translated/moved according to directional arrow T1 such that the solid pin 516 has moved along a central axis of the pipe 514 so that the flange 510 may be locked into an upright position.

Referring now to FIG. 23D, this figure illustrates a closeup perspective view of the ULD guide and restraint device 500 from FIG. 23B after the flange 510 has been rotated but before the flange 510 has been locked into position. In this view, the pin or rod 516 which is coupled to the flange 510 is visible. The pin 516 rotates within the hollow shaft 514. As shown in FIG. 23D, the pipe or shaft 514 may further comprise a slot 518 for receiving the flange 510 when the pin 516 is translated/moved towards the slot 518. The slot 518 may "lock" the flange 510 in an upright position to engage a ULD.

Figure 24:
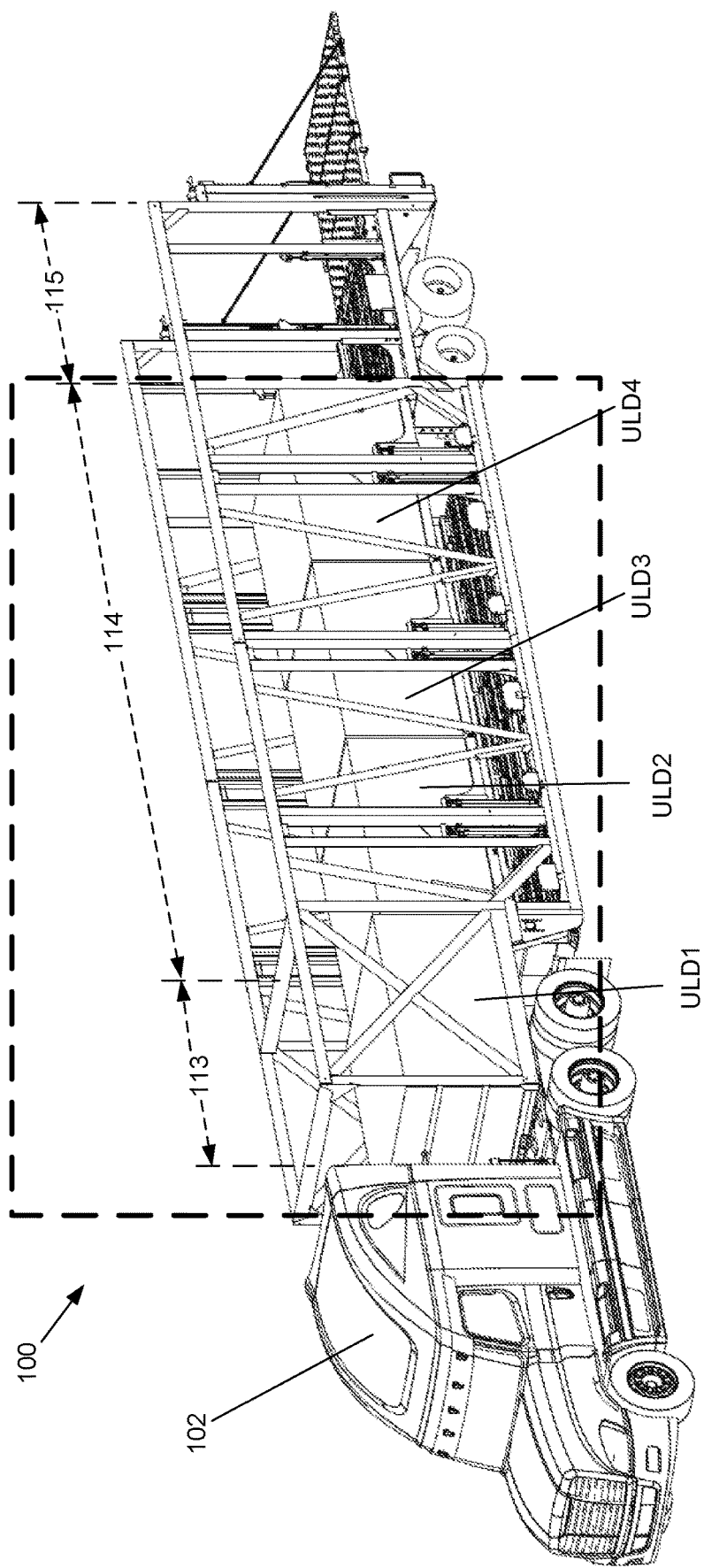
FIG. 24 illustrates a perspective view of the trailer system with four ULDs loaded onto it, and specifically, ULDs loaded within the front cargo bay area and the middle cargo bay area.

Referring now to FIG. 24, this figure illustrates a perspective view of the trailer system 100 with four ULDs1-4 loaded onto it, and specifically, ULDs loaded within the front cargo bay area 113 and the middle cargo bay area 114. The middle cargo bay area 114 is the focus of the next several figures since it has adjustable decks 101, 103 described previously. The middle cargo bay area 114, as illustrated in FIG. 24, may hold at least three ULDs. With its adjustable decks 101, 103, the middle cargo bay area can support two levels of cargo which may translate into at least six ULDs as will be described below.

Figure 25:
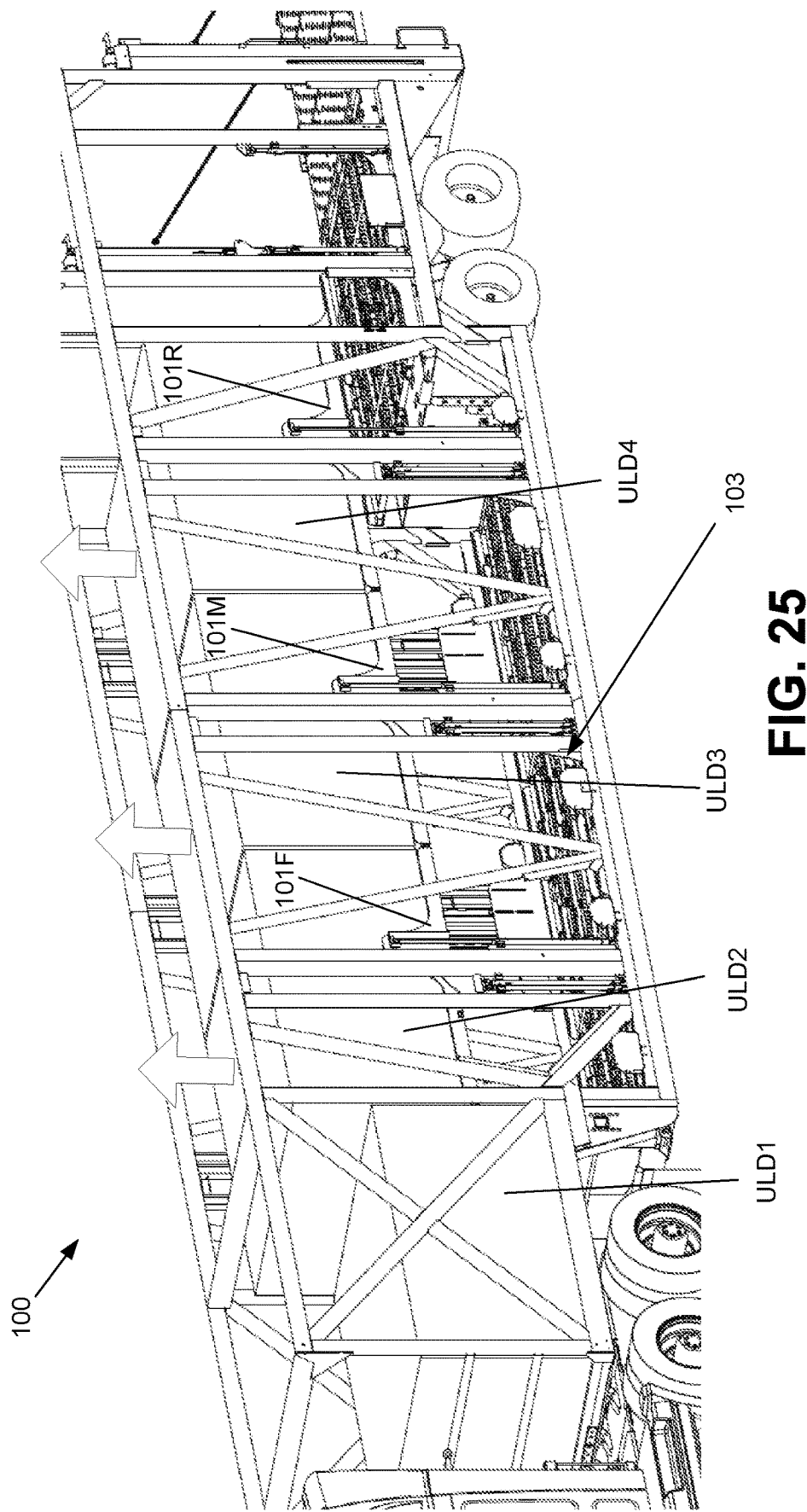
FIG. 25 is a perspective view of the trailer system shown in FIG. 24, however, in this figure the upper middle decks have been moved upward to about a half-way point relative to their fully extended position.

Referring now to FIG. 25, this figure is a perspective view of the trailer system 100 shown in FIG. 24, however, in this figure the upper decks 101F, 101M, 101R have been moved upward to about a half-way point relative to their fully extended position. Directional arrows have been provided to show the movement of the upper decks 101F, 101M, and 101R. When the upper decks 101 have been raised to a fully extended position, then this allows the lower decks 103 to be loaded with cargo, such as with additional ULDs.

Figure 26:
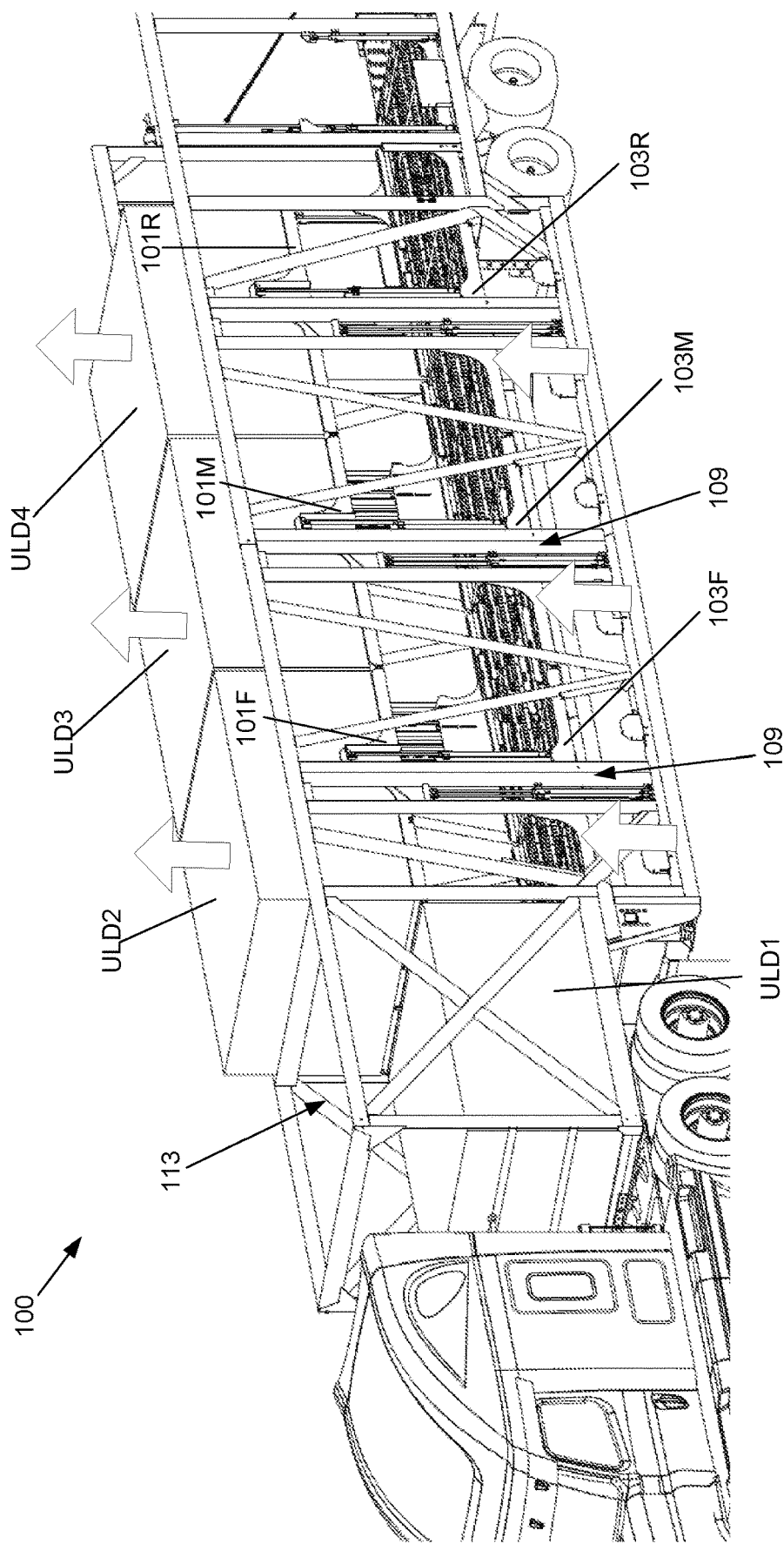
FIG. 26 is a perspective view of the trailer system shown in FIG. 25, however, in this figure the upper middle decks have been moved upward to their fully extended position while the lower middle decks have been elevated to have a height equal to the height of the rear cargo bay area.

Referring now to FIG. 26, this figure is a perspective view of the trailer system 100 shown in FIG. 25, however, in this figure the upper decks 101F, 101M, 101R have been moved upward to their fully extended position while the lower decks 103F, 103M, 103R have been elevated to have a height equal to the height of the rear deck 105 of the rear cargo bay area 115. The movements of these decks 101, 103 are made possible by the plurality of actuator subsystems 109 which will be described in more detail below. With the upper decks 101F, 101M, 101R in their fully raised position shown in this FIG. 26, the lower decks 103F, 103M, 103R may now be loaded with cargo, such as with ULDs.

Figure 27:
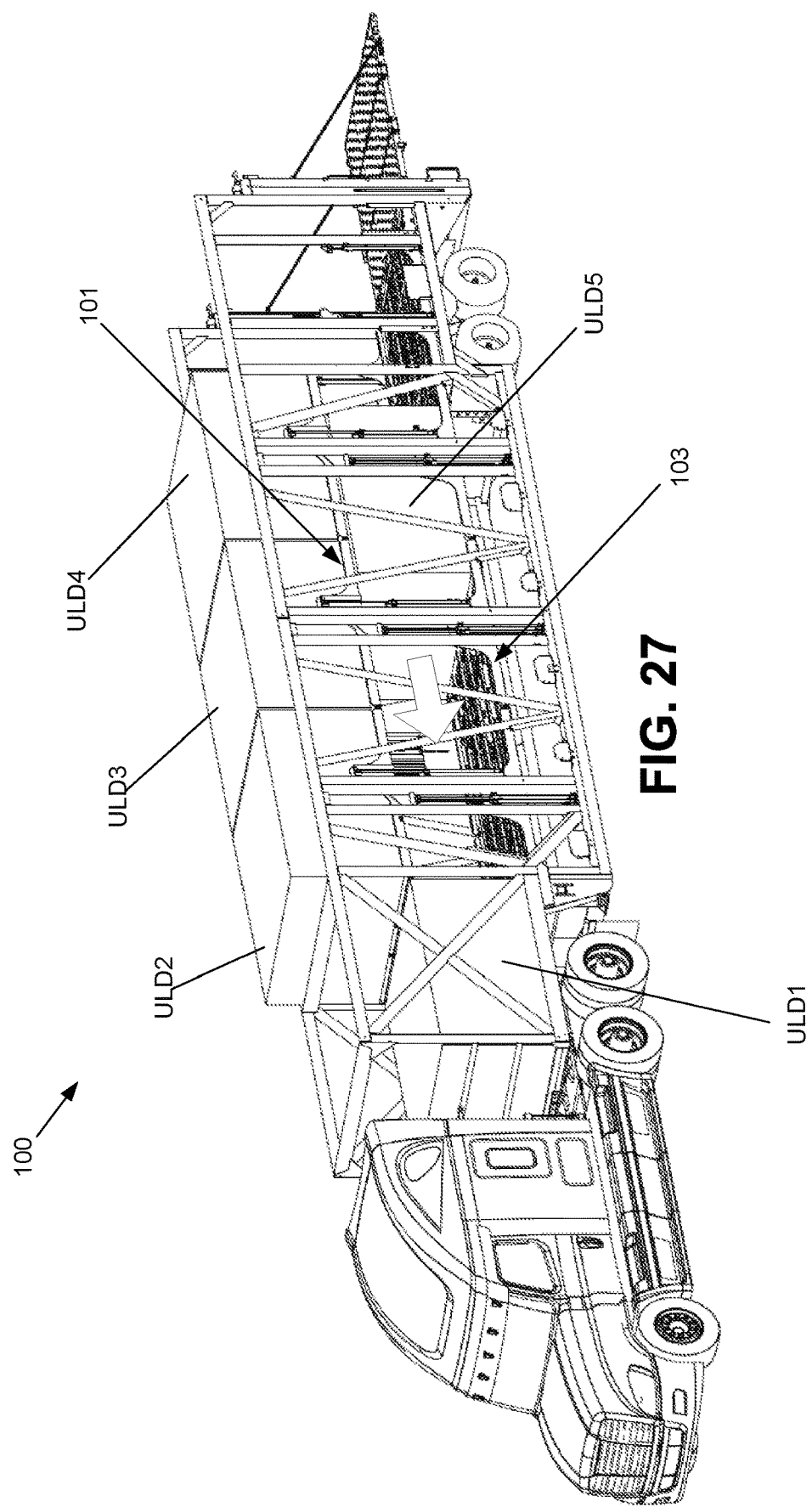
FIG. 27 is a perspective view of the trailer system shown in FIG. 26 where the upper middle decks remain in their fully extended position and after a fifth ULD5 is moved onto the set of lower decks 103.

Referring now to FIG. 27, this figure is a perspective view of the trailer system 100 shown in FIG. 26, where the upper decks 101 remain in their fully extended position and after a fifth ULD5 is moved onto the set of lower decks 103. A directional arrow has been provided adjacent to the fifth ULD5 to show how it can translate across the lower decks 103 via the barrel rollers 149 (not visible in this figure, but see FIG. 5B described above).

Figure 28:
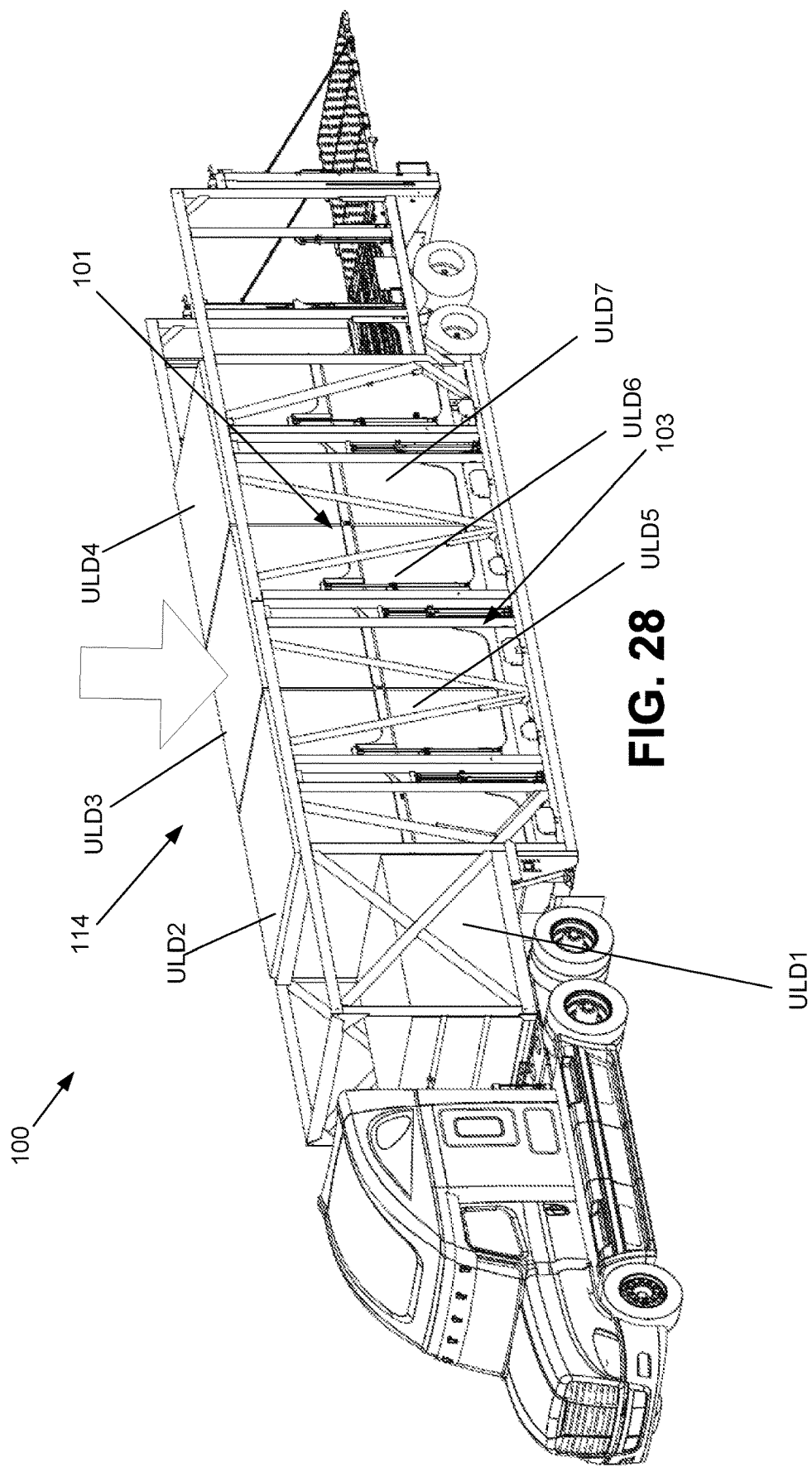
FIG. 28 is a perspective view of the trailer system shown in FIG. 27, after the upper middle decks and lower middle decks have been loaded with ULDs and then lowered to an intermediate position prior to a transport position.

Referring now to FIG. 28, this figure is a perspective view of the trailer system 100 shown in FIG. 27, after the upper decks 101 and lower decks 103 have been loaded with ULDs and then lowered to an intermediate position which is prior to a transport position. Specifically, the upper three decks 101F, 101M, 101R each have been loaded with ULDs2-4, while lower decks 103F, 103M, 103R each have been loaded with ULDs5-7. Relative to FIG. 27, both the upper decks 101 and lower decks 103 have been lowered to an intermediate position which is close to a transport position for the trailer system 100 as shown by the directional arrow. This intermediate position of the ULDs2-7 of the middle cargo bay is very close to, but it is not at the transport position which will be shown in FIG. 29. In this intermediate position shown in FIG. 28, the upper three ULDs2-4 on the upper decks 101 have been lowered such that the top surfaces of these ULDs are substantially even or just below a top edge/portion of the volume defined by the middle cargo bay area 114.

Figure 29:
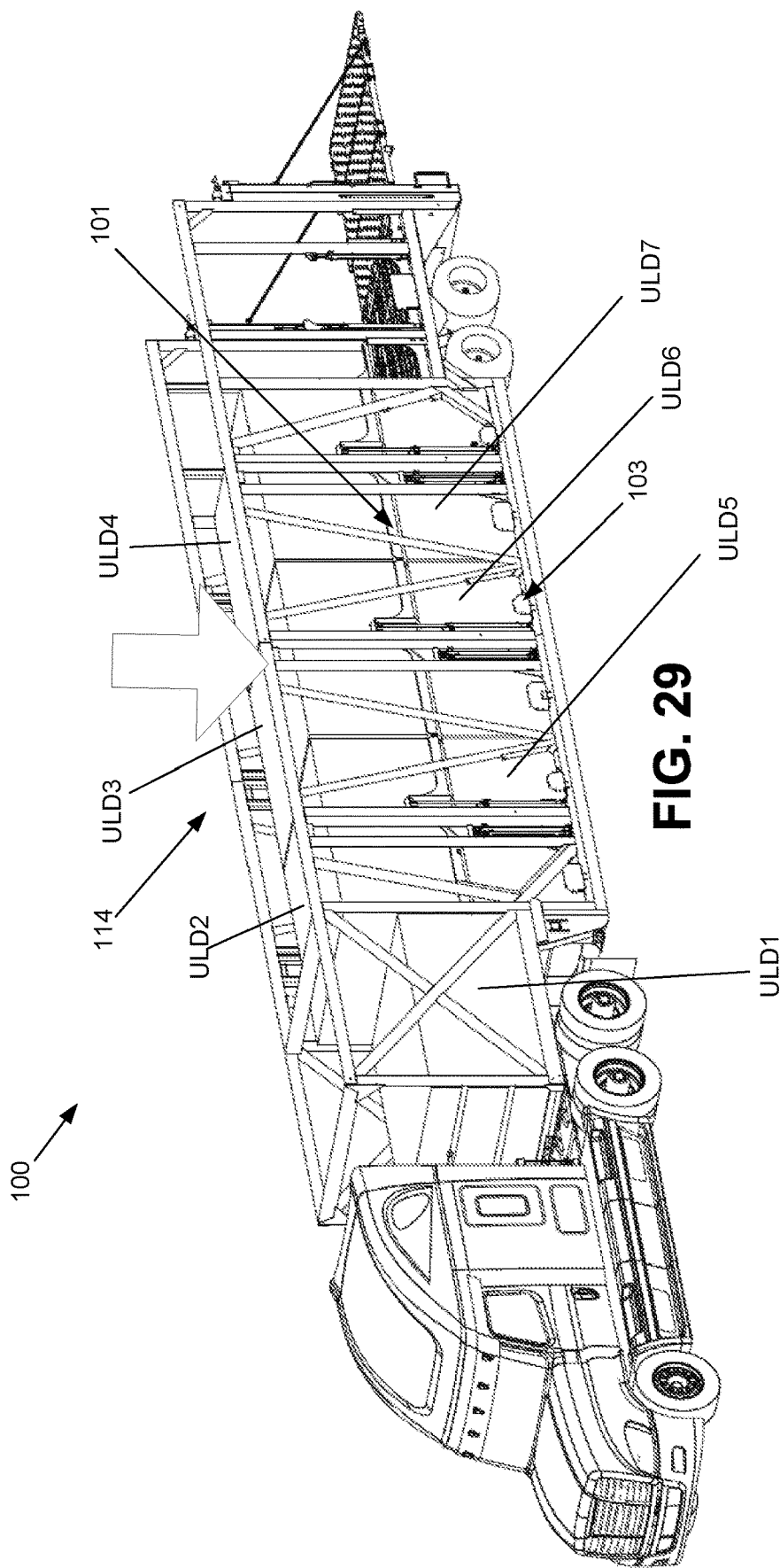
FIG. 29 is a perspective view of the trailer system shown in FIG. 28 after the upper middle decks and lower middle decks have been lowered to a transport position.

Referring now to FIG. 29, this figure is a perspective view of the trailer system 100 shown in FIG. 28, after the upper decks 101 and lower decks 103 have been lowered to a transport position as indicated by the directional arrow. In this transport position, the upper three ULDs2-4 have a top surface which are below the top edge/portion of the volume defined by the middle cargo bay area 114. The lower three ULDs5-7 are also positioned at their lowest position relative to the bottom of the trailer system 100 in this transport position.

Figure 30:
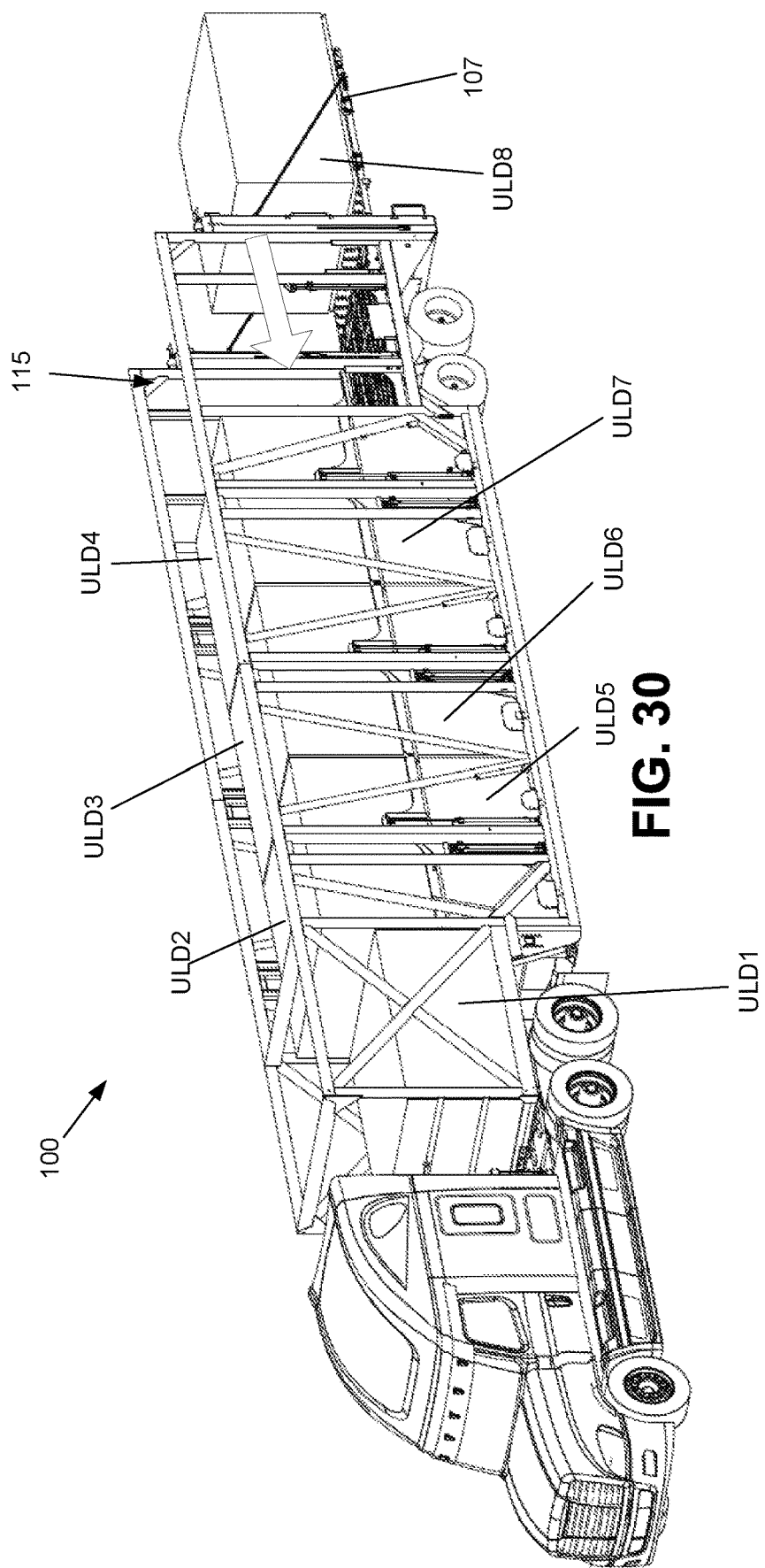
FIG. 30 is a perspective view of the trailer system shown in FIG. 28, after the upper middle decks and lower middle decks have been lowered to a transport position and with the tailgate receiving an eighth ULD.

Referring now to FIG. 30, this figure is a perspective view of the trailer system 100 shown in FIG. 29, after the upper decks 101 and lower decks 103 have been lowered to a transport position and with the tailgate 107 receiving an eighth ULD8. As noted previously, the tailgate 107 may comprise a plurality of ball rollers 144 (not shown) that allow each ULD to easily move across the tailgate 107 and into the rear cargo bay 115. The ball rollers 144 are sometimes also referred to as spherical roller balls or ball transfers 144 as understood by one of ordinary skill in the art.

Figure 31:
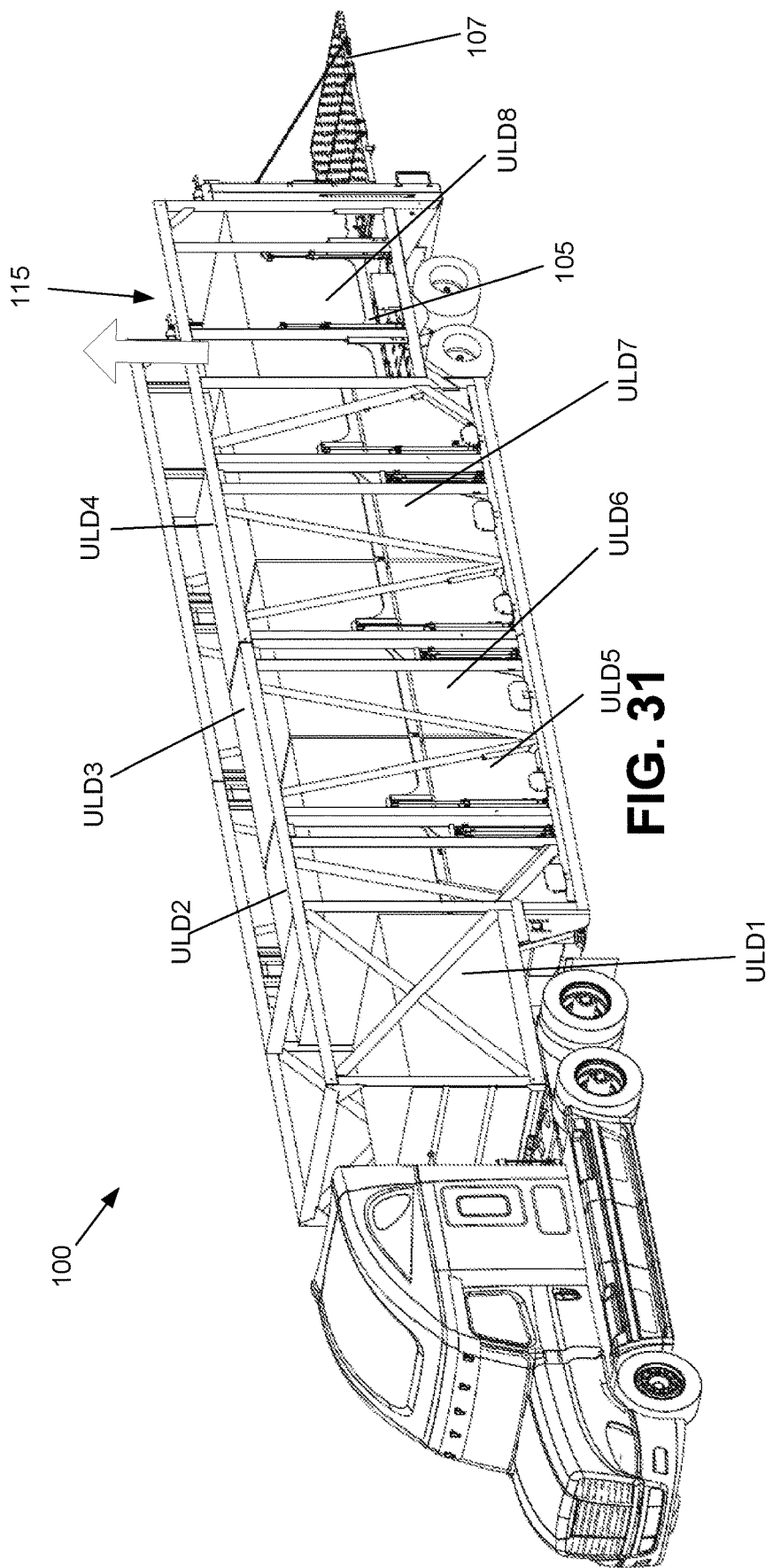
FIG. 31 is a perspective view of the trailer system shown in FIG. 30, after the eighth ULD has been moved from the tailgate and elevated by the rear deck.

Referring now to FIG. 31, this figure is a perspective view of the trailer system 100 shown in FIG. 30, after the eighth ULD8 has been moved from the tailgate 107 and elevated by the rear deck 105. The rear deck 105 may be elevated so that additional cargo, such as another ULD may be positioned under the rear deck 105 and the eighth ULD8.

Figure 32:
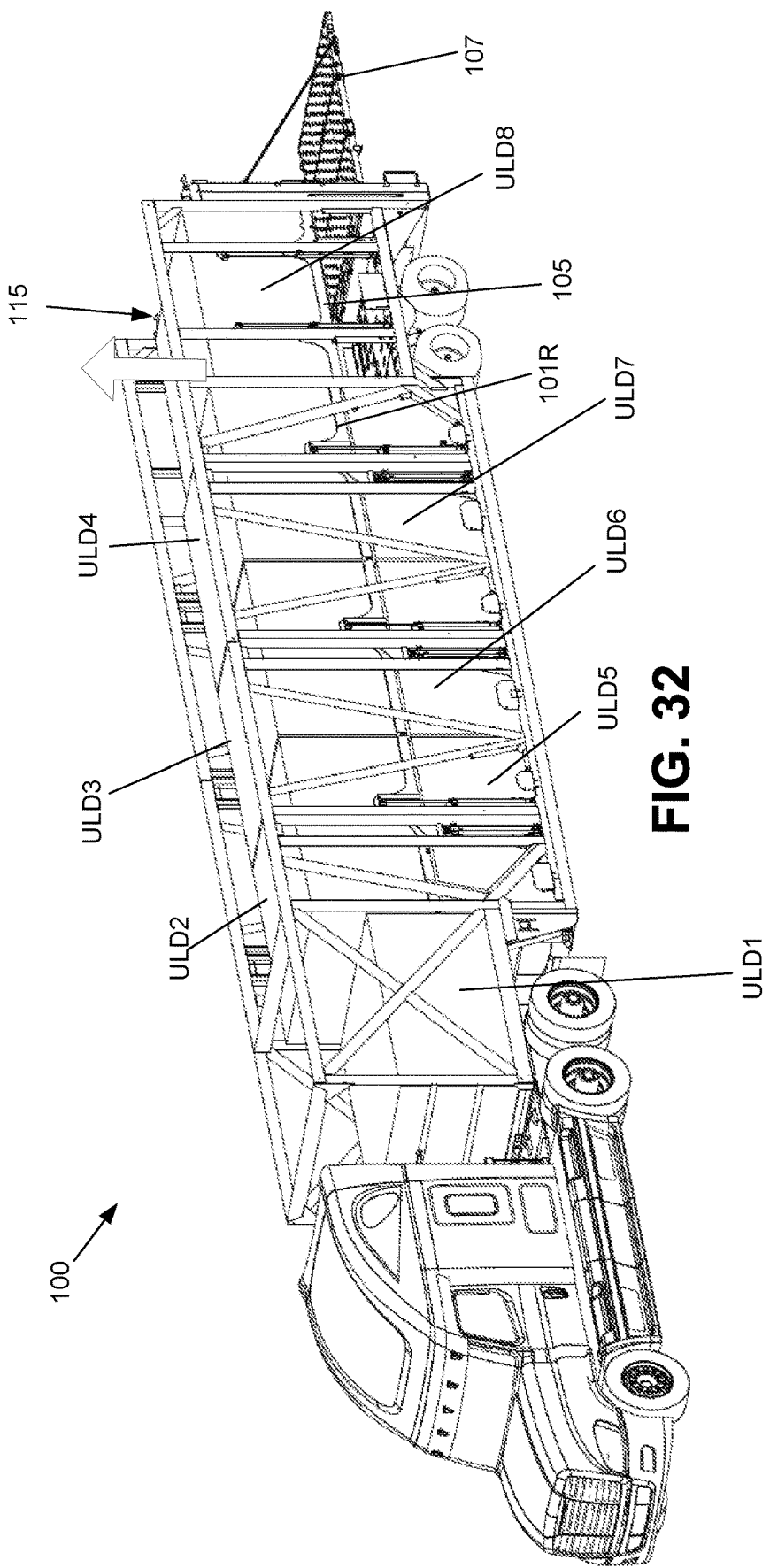
FIG. 32 is a perspective view of the trailer system shown in FIG. 31, after the eighth ULD is elevated by the rear deck to a transport position.

Referring now to FIG. 32, this figure is a perspective view of the trailer system 100 shown in FIG. 31, after the eighth ULD8 is elevated by the rear deck 105 to a transport position as shown by the directional arrow. The rear deck 105 is generally in a transport position when deck 105 is substantially even with the rear, upper deck 101R as shown in this figure. It is noted that deck 105 only has to be raised if a ULD is being positioned underneath, otherwise it does not have to be raised to be even with 101R as understood by one of ordinary skill in the art.

Figure 33:
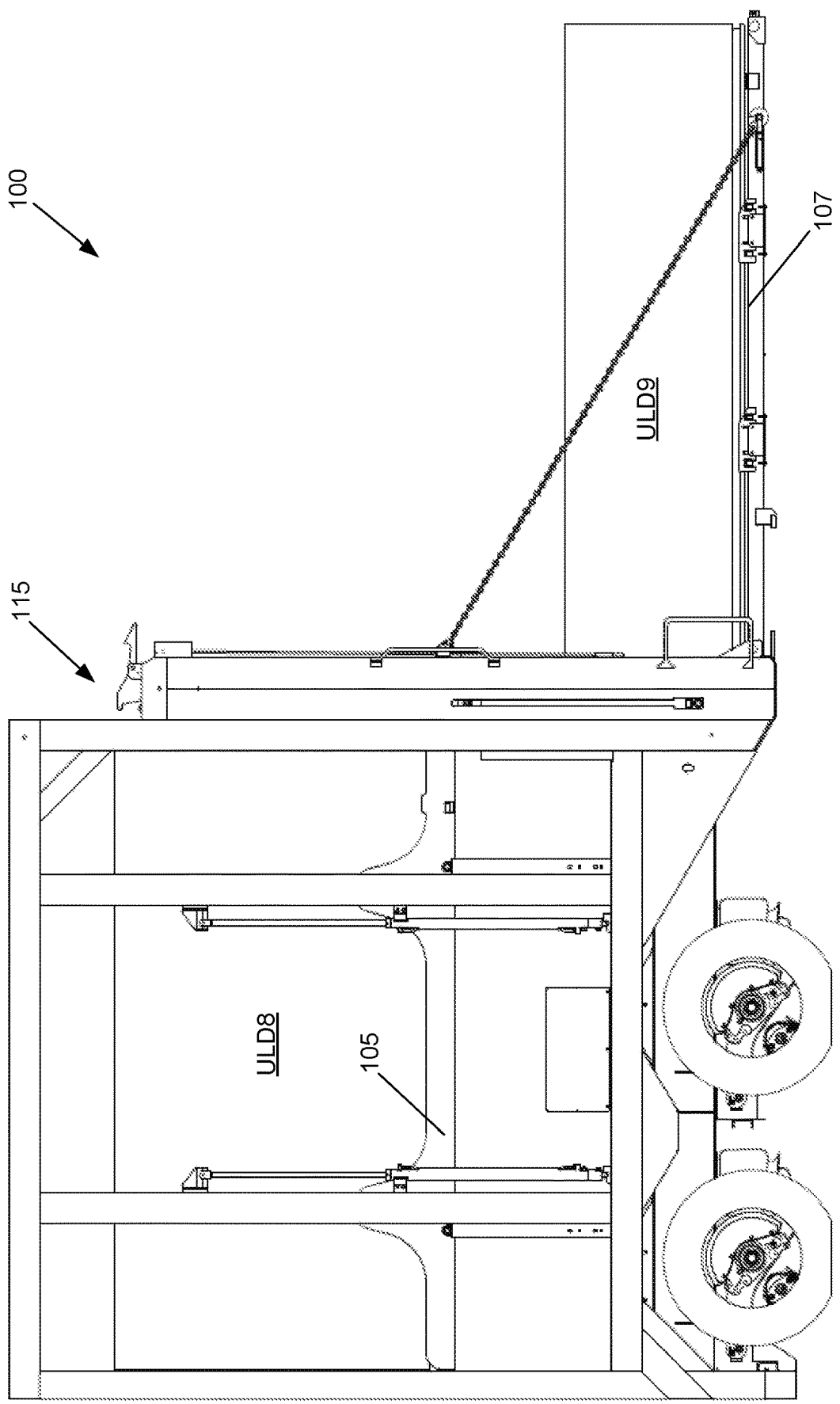
FIG. 33 is a side view of the trailer system of FIG. 32 and after a ninth ULD is loaded onto the tailgate.

Referring now to FIG. 33, this figure is a side view of the trailer system 100 of FIG. 32 and after a ninth ULD9 is loaded onto the tailgate 107. As noted previously, the tailgate 107 can be raised or lowered as needed to lift cargo, such as ULDs. The tailgate 107 may engage a loading dock or it may engage the ground if there is no loading dock. In FIG. 33, there is no loading dock and therefore, the tailgate 107 may be lowered near to the ground to receive the ninth ULD9. Once loaded, the tailgate 107 may then raise the cargo for loading into the rear cargo bay area 115. The tailgate 105 has a deployable foot (not shown) that may sit on the ground, but the roller surface of the tailgate 107 may remain elevated such that it can be at the same height as a storage platform or a ground support vehicle.

Figure 34:
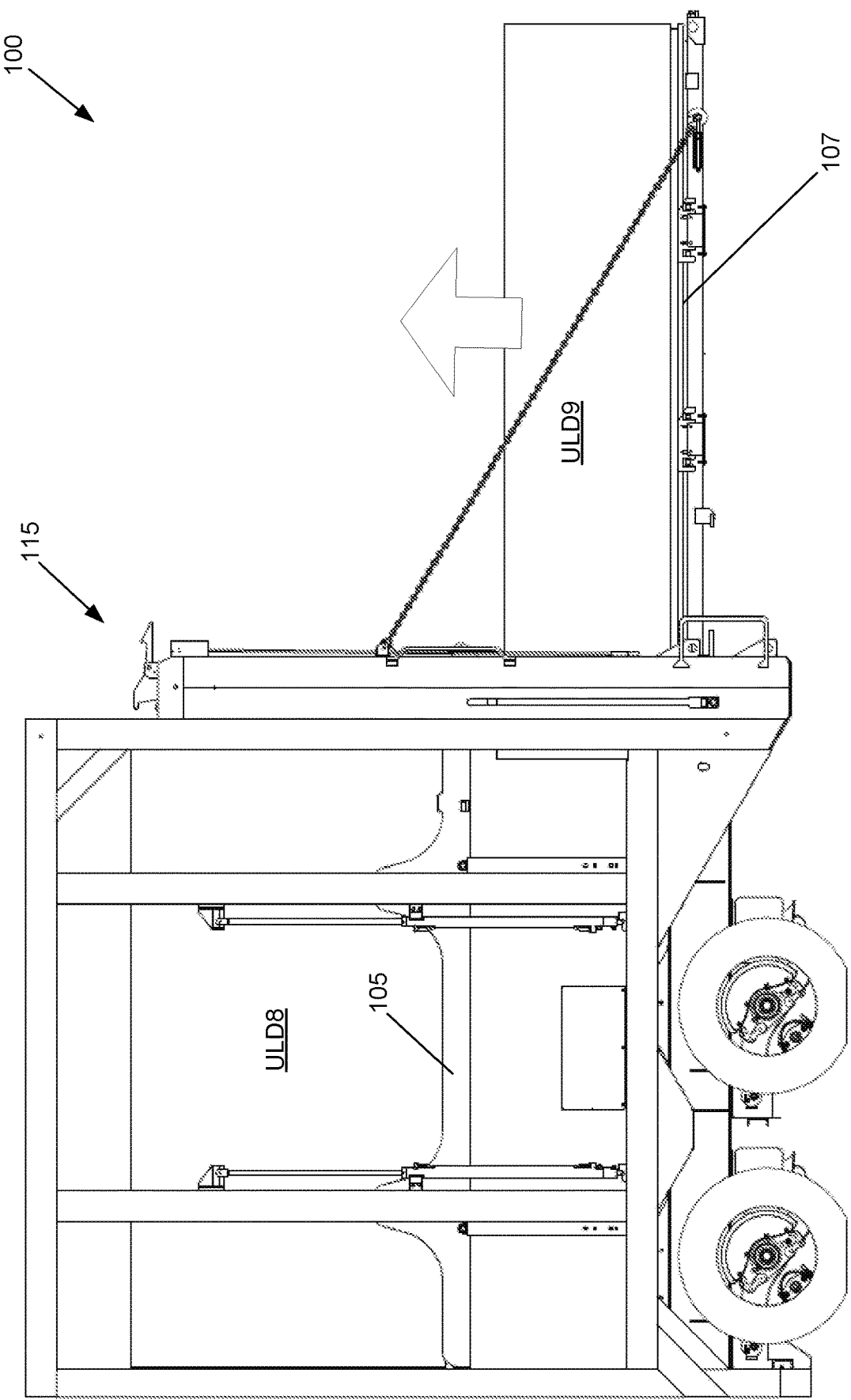
FIG. 34 is a side view of the trailer system of FIG. 33 and after a ninth ULD has been loaded onto the tailgate and raised upwards as shown by the directional arrow.
Figure 35:
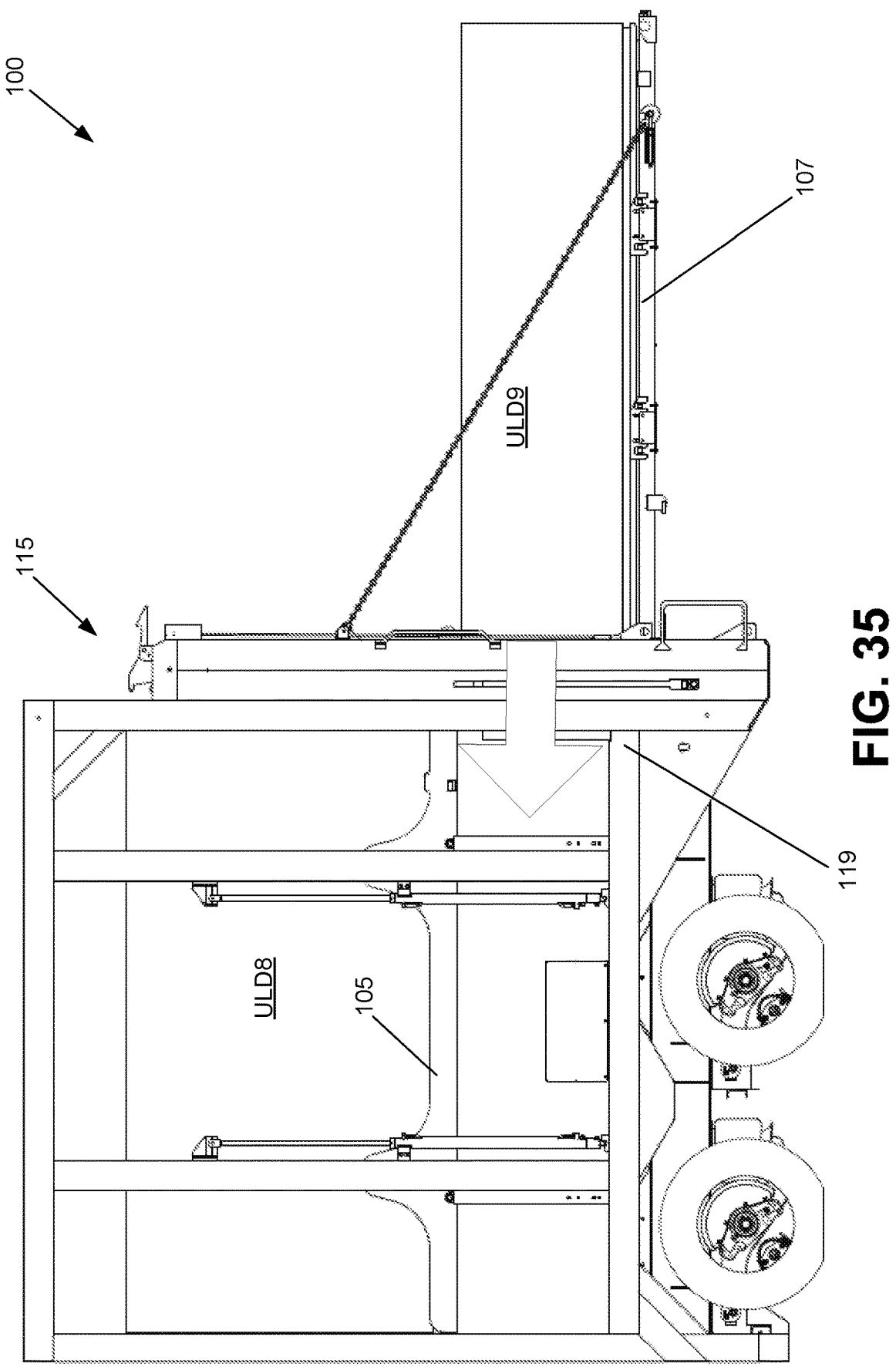
FIG. 35 is a side view of the trailer system of FIG. 34 but now with the tailgate further raised such that it is in alignment with the bottom portion of the rear cargo bay area.

Referring now to FIG. 34, this figure is a side view of the trailer system 100 of FIG. 33 and after a ninth ULD9 has been loaded onto the tailgate 107 and raised upwards as shown by the directional arrow. FIG. 35 is a side view of the trailer system 100 of FIG. 34 but now with the tailgate 107 further raised such that it is in alignment with the bottom portion 119 of the rear cargo bay area 115. Specifically, the tailgate 107 is now positioned such that it is substantially parallel to the bottom portion 119 of the rear cargo bay area 115. The ninth ULD9 may be pushed off of the tailgate 107 using the ball rollers 144 (not visible, but described previously) as shown by the horizontal directional arrow. The barrel rollers 149 (not visible, but described previously) of the bottom portion 119 of the rear cargo bay area 115 may engage the ninth ULD9 as it moves off the tailgate 107 and into the rear cargo bay area 115.

Figure 36:
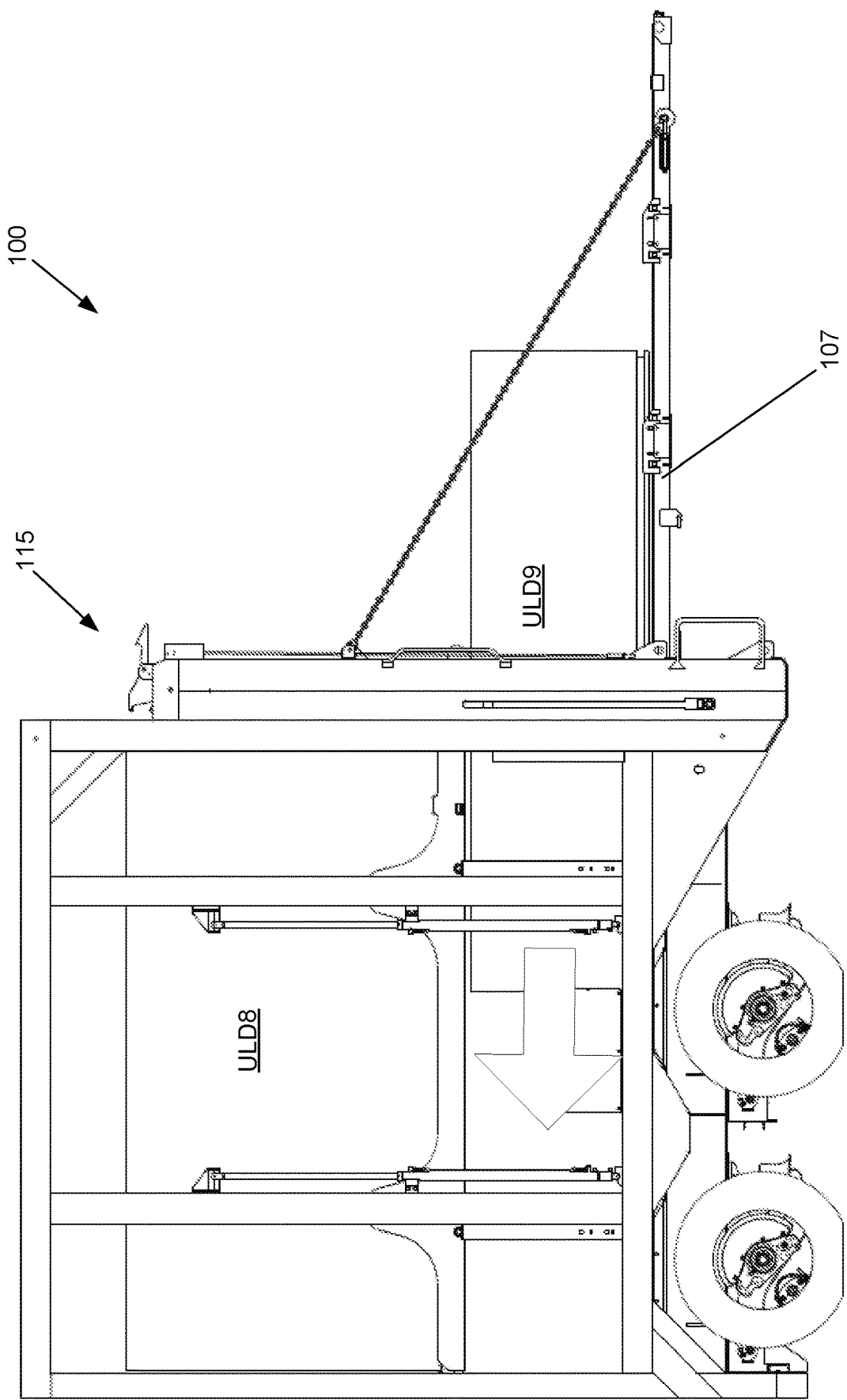
FIG. 36 is a side view of the trailer system of FIG. 35 but now with the ninth ULD entering the rear cargo bay area.

Referring now to FIG. 36, this figure is a side view of the trailer system 100 of FIG. 35 but now with the ninth ULD9 entering the rear cargo bay area 115. Specifically, the ninth ULD9 may be pushed off of the tailgate 107 via ball rollers 144 (not shown) and into the rear cargo bay area 115 via barrel rollers 149 (not shown). Referring now to FIG. 37, this figure is a side view of the trailer system 100 of FIG. 36 but with the ninth ULD9 being completely positioned within the rear cargo bay area 115. With the ninth ULD9 being fully loaded into the rear cargo bay area 115, the tailgate 107 may now be raised to close-off the rear cargo bay area 115 so the system 100 is ready for transport.

Referring now to FIG. 38A, this figure illustrates a perspective view of the tailgate 107 loaded with a ninth ULD9. At an edge of the tailgate 107 near the rear cargo bay area 115 is a handle 905 for an exemplary retractable tailgate stop device 900 used in an exemplary improved trailer system 100 according to the solution. The retractable tailgate stop device 900 serves a similar purpose as the previously described kick-stop device 700 in that when the stops 705 are in a raised position the retractable tailgate stop device 900 prevents a ULD9 from sliding or transferring onto tailgate 107 from rear deck 105. The tailgate stop device 900 may prevent ULD9 from moving past the front edge of the tailgate 107 while the tailgate 107 is moving up or down.

The tailgate stop device usually is retracted once the ULD9 needs to be transitioned into the trailer system 100 whether that is onto deck 105 (and beyond) or into rear cargo area 115. There are additional sets of kick stops at the rear of deck 105 and at the rear of bottom portion 119 of the rear cargo areal 115 that prevent the ULDs from shifting backwards once they are loaded. Further details of the tailgate stop device 900 are illustrated in FIG. 38B, described below.

Referring now to FIG. 38B, this figure illustrates further details of the retractable tailgate stop device 900 shown in FIG. 38A. The tailgate stop device 900 comprises a handle 905 and a shaft 907 running through a series of guides 909. According to one exemplary embodiment, the shaft 907 and the guides 909 have a square-shaped cross-section. However, other shapes are possible and are included within the scope of this disclosure. For example, other shapes include, but are not limited to, circular/round, elliptical, etc.

Referring now to FIG. 39A, this figure is a perspective view of the tailgate stop device 900 in the retracted position. The stop 705 is rotatably mounted to a pivot point 911 and slidably mounted via a slot and pin arrangement 913. In this way, when the handle 905 is pulled (or pushed in some embodiments), the stops 705 are translated to a raised position (see FIG. 9B). And, when the handle 905 is pushed (or pulled in some embodiments), the stops 705 are translated to a lowered position that will not impede transfer of a ULD from/to the tailgate 107 to/from the rear deck 105 of the rear cargo bay area 115 or the bottom portion 119 of the rear cargo bay area 115. In some other embodiments an additional handle 905 may be incorporated to the opposite end of shaft 907 such that the tailgate stop device 900 may be actuated from either side of tailgate 107.

Referring now to FIG. 39B, this figure is a top view of the tailgate stop device 900 in an expanded/upright position. Relative to FIG. 39A, and as shown by the directional arrows, the handle 905 has been shifted to the right of the page causing the stop 705 to be elevated/raised to an upright or expanded position. The stop 705 may impede/stop transfer of a ULD from/to the tailgate 107 to/from the rear deck 105 or the bottom portion 119 of the rear cargo bay area 115. While the tailgate stop device 900 is provided with a handle 905 as illustrated in FIGS. 38-39 intended for manual/handheld movement from a human operator, it is well within the scope of this disclosure to provide a machine-based actuator, such as a pneumatic or hydraulic cylinder, and/or electrical motor, or otherwise, to provide automated movement of the tailgate stop device 900 as understood by one of ordinary skill in the art.

Figure 40:
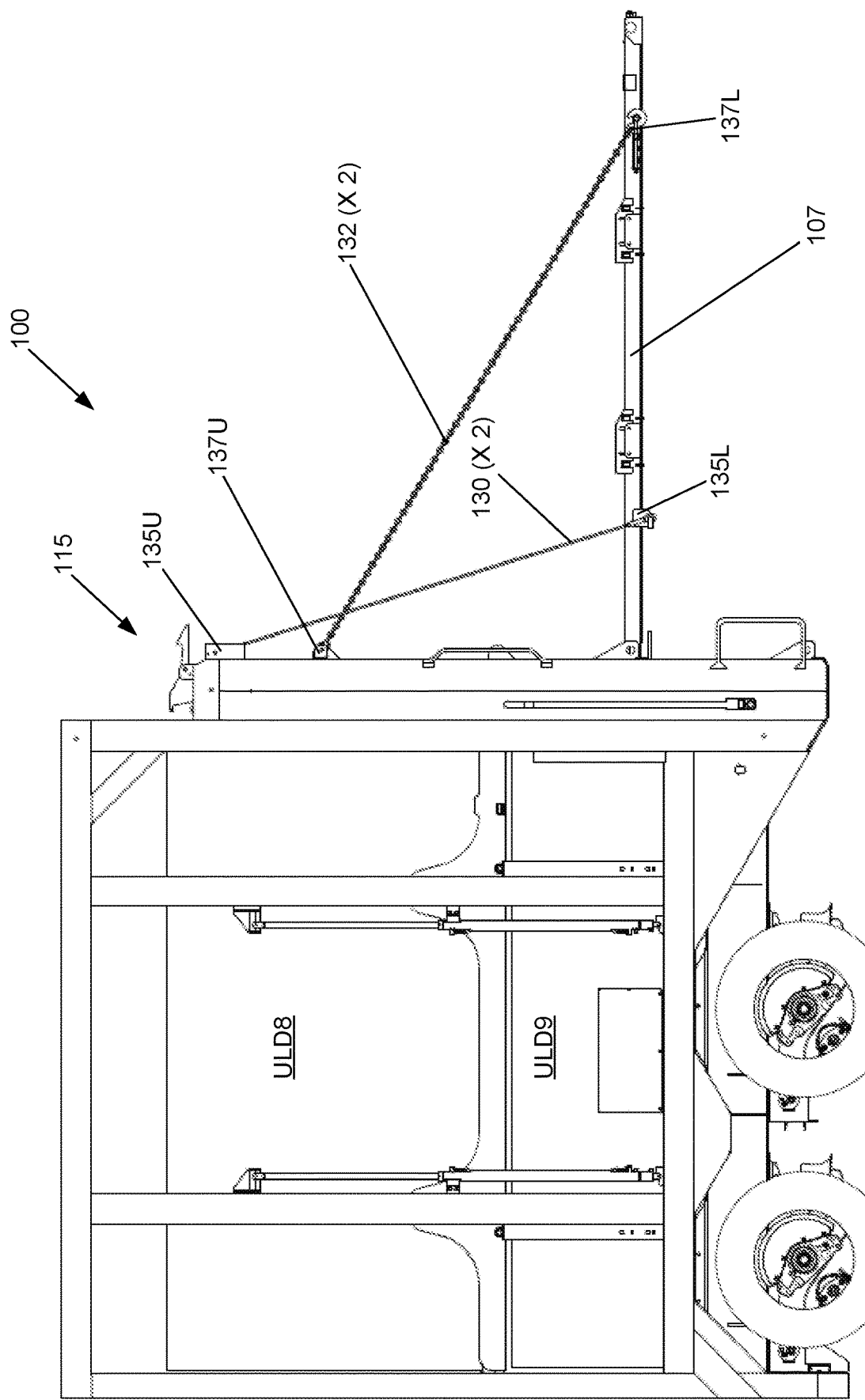
FIG. 40 illustrates a side view of the tailgate in an unloaded state so that it is ready for closure in order to close the rear cargo bay area.

Referring now to FIG. 40, this figure illustrates a side view of the tailgate 107 in an unloaded state so that it is ready for closure in order to close the rear cargo bay area 115. After the last ULD is loaded into the system 101, the raising/lowering cable 130 may be attached to the tailgate 107 via lower coupler 135L. It is noted that there are two cables 130 but since this is a side view of the system 101, only one cable 130 is visible. Similarly, there are two tension chains 132 but only one chain 132 is visible.

As noted previously, the tension chains 132 are designed to hold heavy cargo, such as ULDs. Once there is no further cargo to be loaded onto the tailgate 107, then the two tension chains 132 may be removed (although not necessary) while the raising/lowering cables 130 are attached to raise or lower the tailgate 107.

Figure 41:
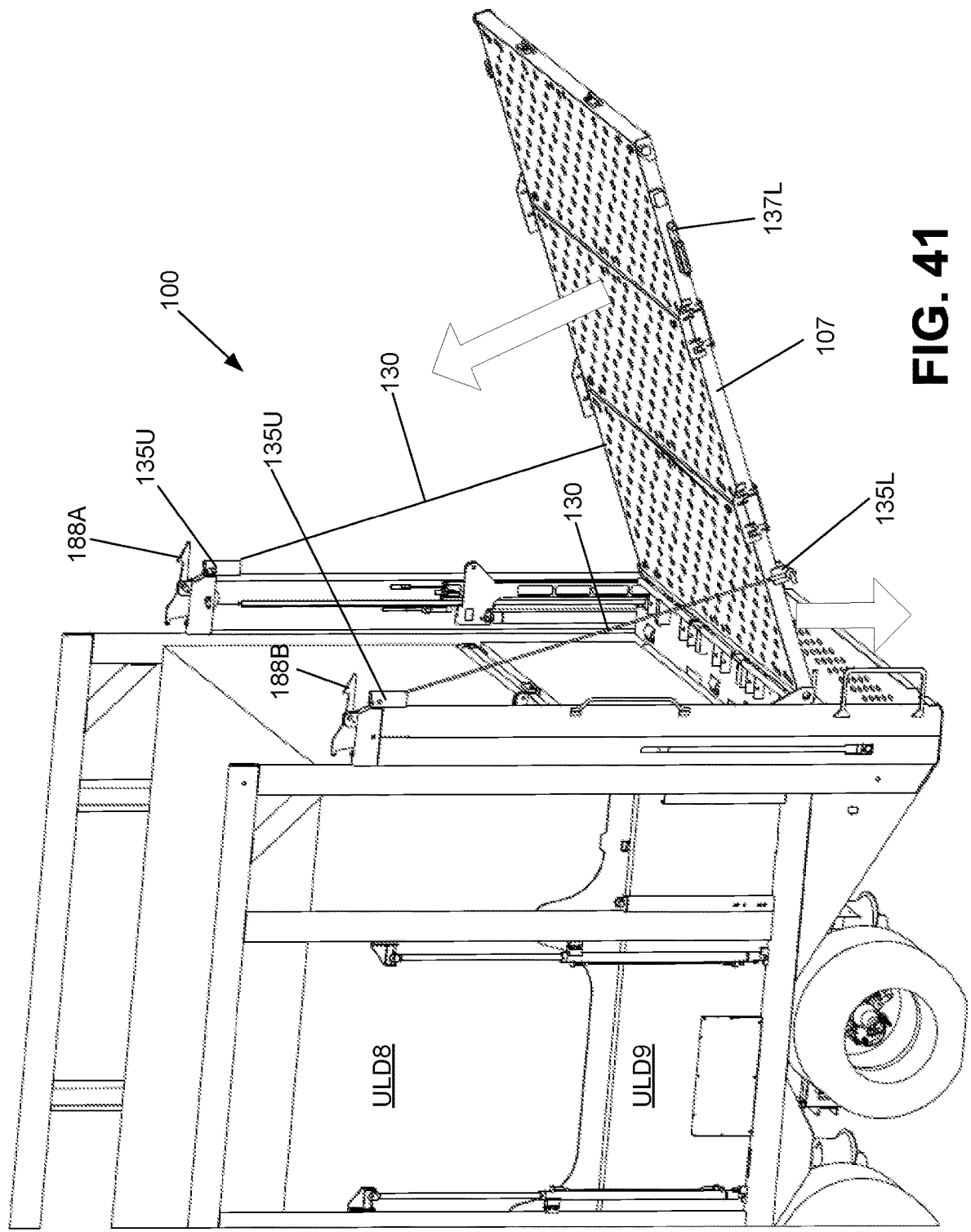
FIG. 41 illustrates a perspective view of the tailgate where its front edge has translated downward while a remainder of the tailgate has been pivoted to initiate closing of the tailgate against a back end of the trailer system.
Figure 42:
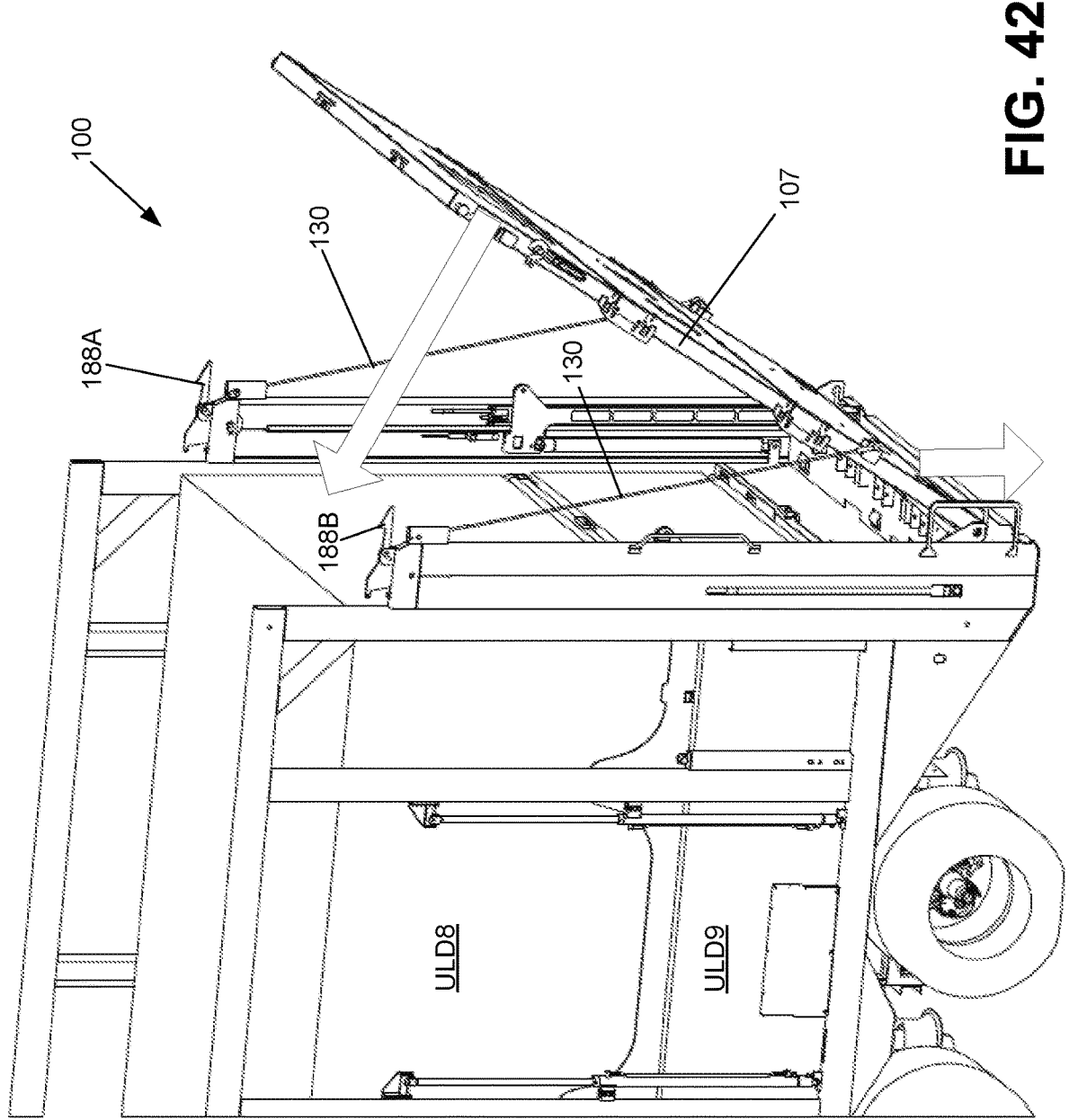
FIG. 42 illustrates a perspective view of the tailgate where its bottom edge has been further translated downward while the remainder of the tailgate has been further pivoted relative to FIG. 41.

Referring now to FIG. 41, this figure illustrates a perspective view of the tailgate 107 where its front edge has translated downward while a remainder of the tailgate 107 has been pivoted to initiate closing of the tailgate 107 against a back end of the trailer system 100. In this view, the tension chains 132 have been removed, while raising/lowering cables 130 have been attached to the tailgate 107 via couplers 135L. The tailgate system illustrated in FIG. 41 further comprises a pair latches 188A, 188B. Each latch 188 has a "beak"—shaped geometry on the rear of the trailer system as illustrated in FIGS. 41 and 42. The latches 188 are further described below in connection with FIG. 43 which illustrates when the tailgate 107 is closed.

Referring now to FIG. 42, this figure illustrates a perspective view of the tailgate 107 where its front edge has been further translated downward while a remainder of the tailgate 107 has been further pivoted relative to FIG. 41. As noted previously, the lower edge of the tailgate 107 closest to the trailer system 100 may be coupled to an actuator such as a hydraulic or pneumatic piston or electrical motor with gears, etc. Meanwhile, upper edges of the tailgate 107 are coupled to the raising/lower cables 130 at couplers 135L.

Figure 43:
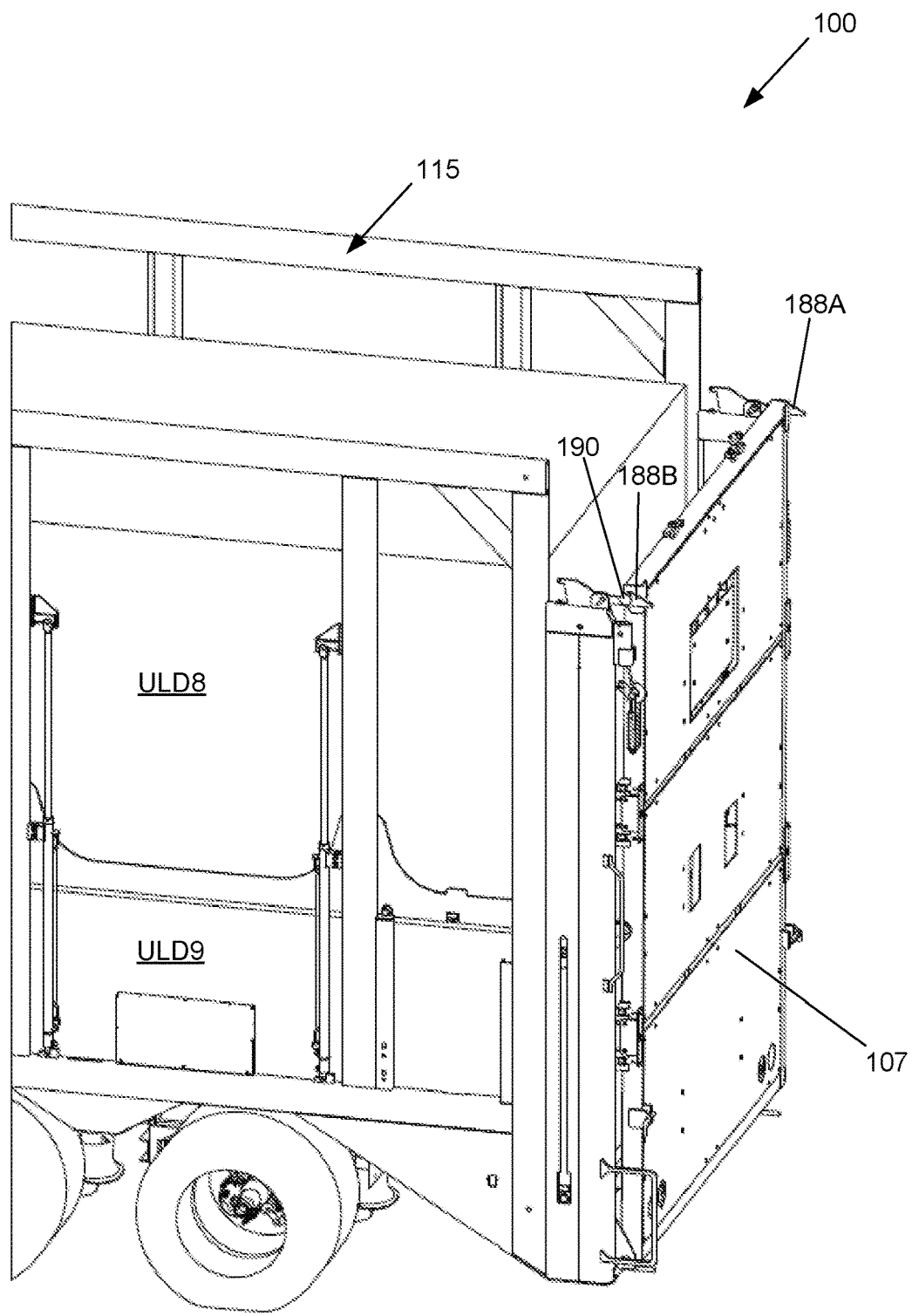
FIG. 43 illustrates a side perspective view of the rear of the trailer system when the tailgate has been closed completely against the trailer system.

Referring now to FIG. 43, this figure illustrates a side perspective view of the rear of the trailer system 100 when the tailgate 107 has been closed completely against the trailer system 100. As shown in FIG. 43, each latch 188 automatically engages a pin 109 on the side of the tailgate 107 when the tailgate 107 has been closed completely. When the tailgate 107 has been closed completely against the trailer system 100, then the trailer system 100 is ready for transport/movement of the loaded ULDs, such as ULD8, ULD9 shown.

Figure 44:
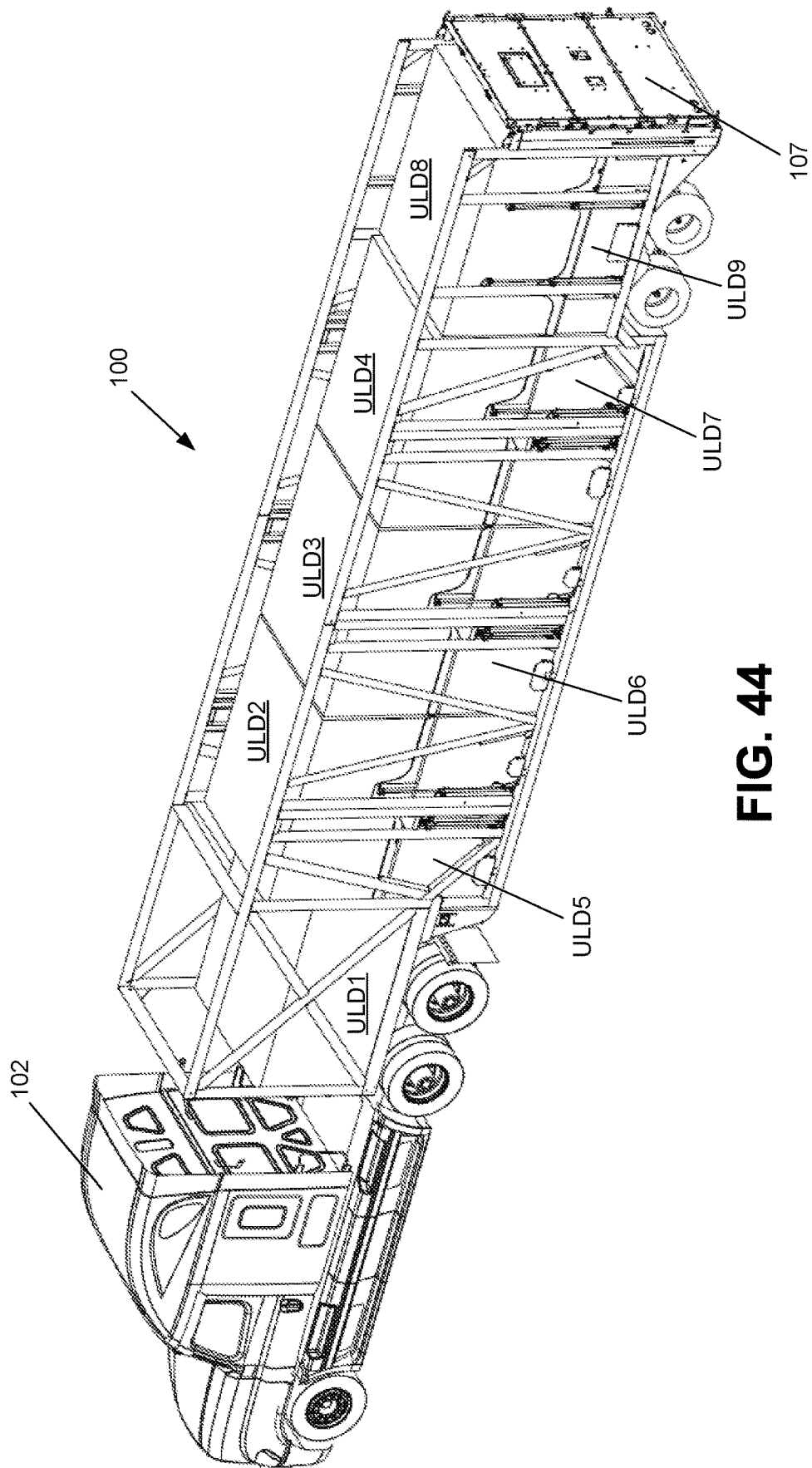
FIG. 44 illustrates a fully loaded trailer system with nine ULDs according to one exemplary embodiment.

Referring now to FIG. 44, this figure illustrates a fully loaded trailer system 100 with nine ULDs according to one exemplary embodiment. According to this exemplary embodiment, ULDs 1-8 may have a size and shape which are substantially equal. Meanwhile, the ninth ULD9 may have a size and shape which is different compared to the first eight ULDs1-8.

Figure 45:
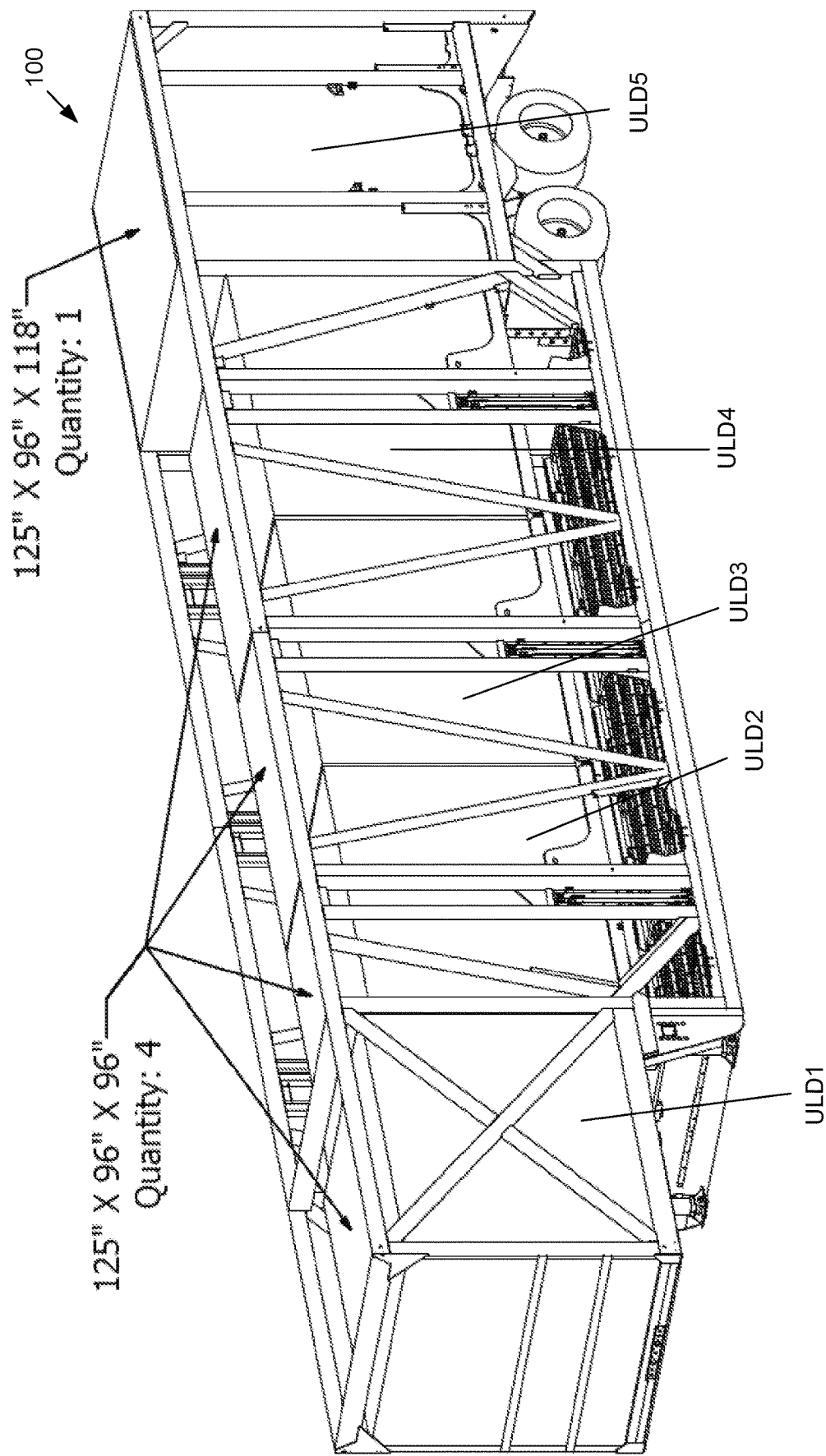
FIG. 45 illustrates a fully loaded trailer system with five ULDs according to one exemplary embodiment.

Referring now to FIG. 45, this figure illustrates a fully loaded trailer system 100 with five ULDs according to one exemplary embodiment. The first through fourth ULDs1-4 may have a size and shape which are substantially equal. Meanwhile, the last and fifth ULD5 may have a size and shape which is different relative to the first four ULDs1-4. According to an exemplary embodiment, the first through fourth ULDs 1-4 may have a length of about 125.0 inches, a width of about 96.0 inches, and height of about 96.0 inches. However, other dimensions smaller or greater are possible and are included within the scope of this disclosure.

Meanwhile, the fifth and last ULD5 of FIG. 45 may have a length of about 125.0 inches, a width of about 96.0 inches, and a height of about 118.0 inches. However, other dimensions smaller or greater are possible and are included within the scope of this disclosure. Further, while the trailer system 100 may be designed for ULDs which have sizes governed by standards, it is within the scope of this disclosure for the trailer system 100 to handle cargo other than ULDs and which may or may not be standardized.

Figure 46:
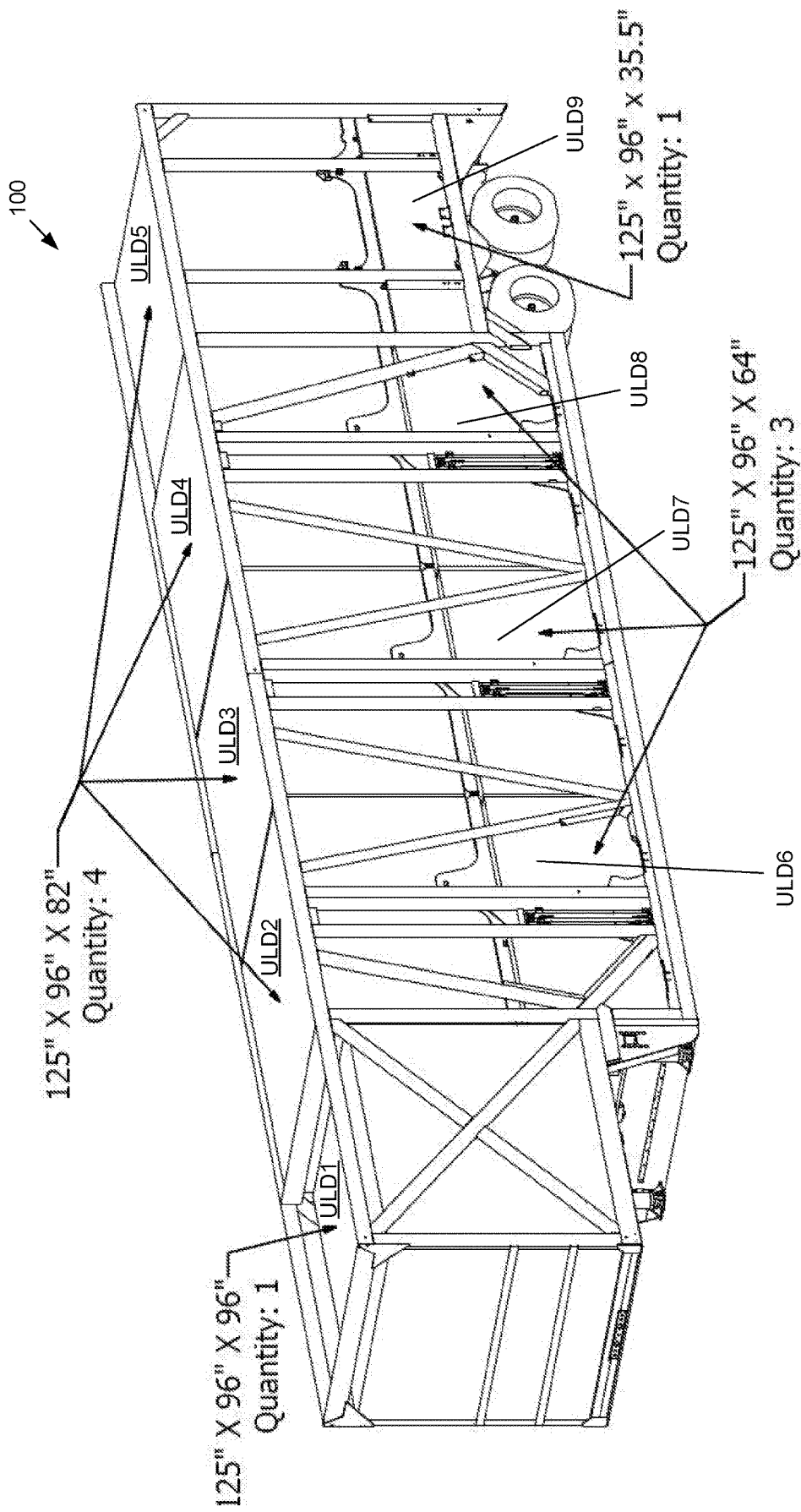
FIG. 46 illustrates a fully loaded trailer system with nine ULDs according to one exemplary embodiment.

Referring now to FIG. 46, this figure illustrates a fully loaded trailer system 100 with nine ULDs according to one exemplary embodiment. In this exemplary embodiment, there are four sets of ULDs having unique sizes/dimensions. A first set comprises one ULD: the first ULD1 which may have an exemplary length of about 125.0 inches, a width of about 96.0 inches, and a height of about 96.0 inches. A second set of ULDs may comprise the second through fifth ULD2-5: these four ULDs2-5 may have an exemplary length of about 125.0 inches, a width of about 96.0 inches, and a height of about 82.0 inches.

A third set of ULDs may comprise the sixth through eighth ULDs6-8: these three ULDs6-8 may have an exemplary length of about 125.0 inches, a width of about 96.0 inches, and a height of about 82.0 inches. A fourth set of ULDs may comprise the last and ninth ULD9: the ninth ULD9 may have an exemplary length of about 125.0 inches, a width of about 96.0 inches, and a height of about 35.5 inches. However, other dimensions smaller or greater for these four sets of ULDs1-9 are possible and are included within the scope of this disclosure.

Figure 47:
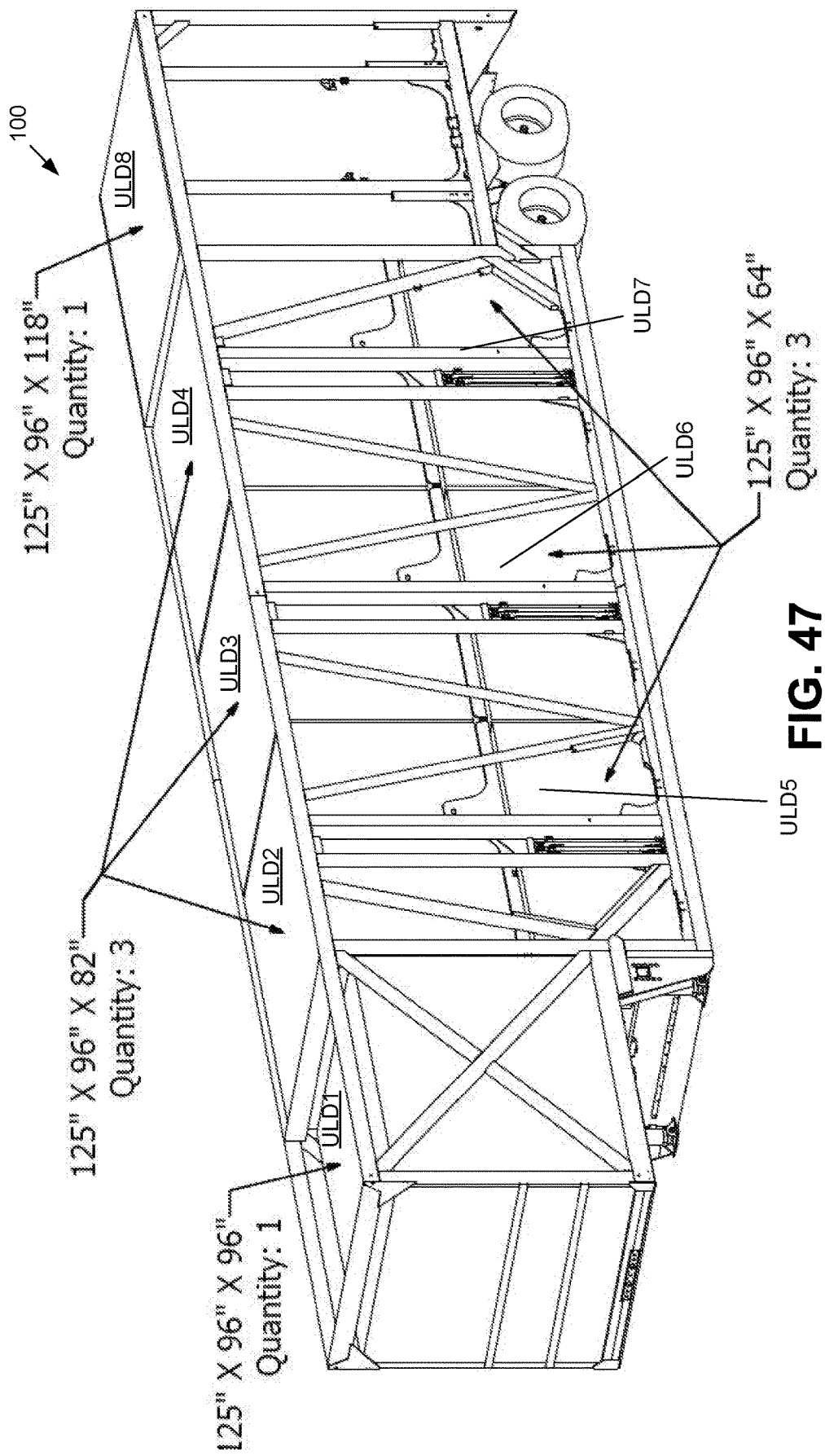
FIG. 47 illustrates a fully loaded trailer system with eight ULDs according to one exemplary embodiment.

Referring now to FIG. 47, this figure illustrates a fully loaded trailer system 100 with eight ULDs according to one exemplary embodiment. In this exemplary embodiment, there are four sets of ULDs having unique sizes/dimensions. A first set comprises one ULD: the first ULD1 which may have an exemplary length of about 125.0 inches, a width of about 96.0 inches, and a height of about 96.0 inches. A second set of ULDs may comprise the second through fourth ULD2-4: these three ULDs2-4 may have an exemplary length of about 125.0 inches, a width of about 96.0 inches, and a height of about 82.0 inches.

A third set of ULDs may comprise the fifth through seventh ULD5-7: these three ULDs5-7 may have an exemplary length of about 125.0 inches, a width of about 96.0 inches, and a height of about 64.0 inches. A fourth set of ULDs may comprise the last and eighth ULD8: the eighth ULD8 may have an exemplary length of about 125.0 inches, a width of about 96.0 inches, and a height of about 118.0 inches. However, other dimensions smaller or greater for these four sets of ULDs1-8 are possible and are included within the scope of this disclosure.

Figures 48, 49:
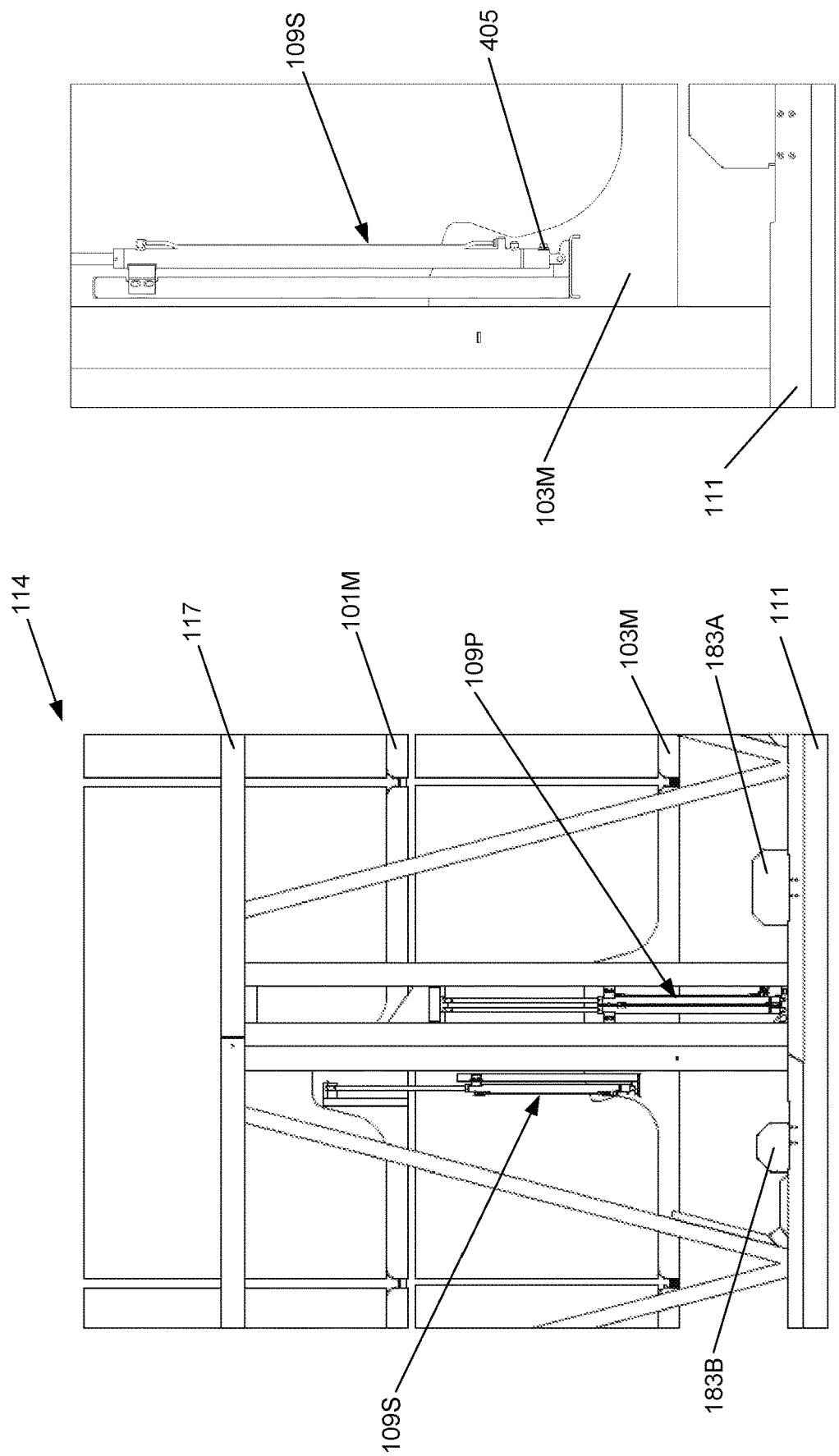
FIG. 48 illustrates a side view of the primary and secondary actuator sets for the upper and lower decks of the middle cargo bay area according to one exemplary embodiment.
FIG. 49 illustrates a side view of a secondary actuator according to an exemplary embodiment.

Referring now to FIG. 48, this figure illustrates a side view of the primary and secondary actuator sets 109P, 109S for the upper and lower decks 101, 103 of the middle cargo bay area according to one exemplary embodiment. The primary actuator sets 109P are coupled to the bottom structure 111 of the trailer system 100 and the lower deck 101M. The secondary actuator sets 109S are coupled to the lower deck 103M and upper deck 101M.

Also illustrated in FIG. 48 are housings 183A, 183B for the valves that may direct the actuator sets 109P, 109S. FIG. 48 shows the lower deck 103M in a slightly elevated position relative to the bottom structure 111. FIG. 48 also shows the upper deck 101M in a slightly elevated position relative to the lower deck 103M.

In the exemplary embodiment, the primary actuator set(s) 109P may comprise a pair of hydraulic cylinders, as opposed to the secondary actuator set(s) 109S which may comprise single hydraulic cylinders. The actuators 109P, 109S may be coupled to respective valves 183A, 183B as understood by one of ordinary skill in the art. While the actuators 109P, 109S may comprise hydraulic type actuators, other actuators are possible. Other actuators include, but are not limited to, pneumatic, rotating screws, electro-mechanical, belts and pulleys, etc.

The multiple actuator sets 109 may be used in order to raise/lower decks 101, 103 individually and/or in tandem. As might be expected by one of ordinary skill in the art, decks 101, 103 should be raised and lowered in such a manner that the decks 101, 103 are kept substantially level in order to avoid binding within the trailer superstructure and/or inadvertently shifting ULDs residing thereon.

Referring now to FIG. 49, this figure illustrates a side view of a secondary actuator 109S according to an exemplary embodiment. Advantageously, to maintain decks 101, 103 in a substantially level position during raising or lowering, embodiments of the actuator sets 109 may include sensors. The sensors (not visible) may generate electrical signals which are sent through an electrical connector 405.

The sensors associated with the actuator set(s) 109 may be in the form of internal sensors embedded within actuators 109 or, in other embodiments (not shown), may be external to actuators 109. In the exemplary actuators 109 shown in FIGS. 48-49, the position sensors are of a linear variable differential transformer ("LVDT") type located internal to the actuators 109.

As understood by one of ordinary skill in the art, a LVDT sensor comprises an electrical coil in communication with an electrically charged probe. The probe runs a length of the actuator such that position of the coil relative to the probe operates to generate an electrical output from the probe that is indicative of the coil location. From the coil location, an extension length of the actuator 109 may be determined. Other sensor types and arrangements are possible and are included within the scope of this disclosure. As can be seen in FIG. 49, the embedded sensors may output their signals via an electrical connector 405 which may be coupled to a central controller (not shown).

Referring now to FIG. 50, this figure illustrates a side and close up view of a primary actuator 109P according to one exemplary embodiment. The primary actuator 109P may comprise at least two cylinders 109P1, 109P2 and the electrical connector 405 described above. As shown in FIG. 50, the two cylinders 109P1, 109P2 are in a fully retracted state. These two cylinders 109P1, 109P2 may be coupled to bottom structure 111 and a lifting structure 120 of movable deck 103 via coupling points 622a-d. Coupling points 622a-d may comprise pin-type connectors, or bolts, rivets, as well as other mechanical fasteners as understood by one of ordinary skill in the art.

As each actuator 109 extends or retracts, its position feedback sensor (internal) may generate a signal indicative of the stroke length of an actuator 109 and transmit the signal to a central control system 193 (not shown in FIG. 50, but see FIG. 52) via the electrical connector 405. The central control system 193 may receive similar signals from other actuator sets 109 associated with a given deck and, based on a comparison of the signals, determine the relative levelness of the given deck. To maintain the level of a deck, the control system 193 may generate a return signal(s) that causes one or more actuator sets 109 associated with the deck 101, 103 to extend relatively faster than, or relatively slower than, including others to arrive at a full stop, compared to other actuator sets 109.

Referring now to FIG. 51, this figure illustrates a close up, side view of the primary actuator set 109P of FIG. 50. Each primary actuator set 109P may comprise dual actuators 109P1, 109P2 as opposed to a single long, large actuator. In this way, a primary actuator set 109P according to embodiments of the solution may generate a linear force substantially equivalent to a single actuator that has a relatively larger diameter than that of one of the individual actuators that make up the primary actuator set 109P. And, as such, a primary actuator set 109P may maintain a low profile such that it is easily integrated into the superstructure of trailer 100 such that a widest possible ULD may be accommodated.

As one of ordinary skill in the art may understand, smaller diameter actuators 109P can be subject to greater instability than larger diameter actuators, therefore the dual primary actuators 109P1 and 109P2 may be coupled together in such a manner that they act as a single mechanically stiffer assembly. Furthermore, actuator couplers 600 may be attached to the superstructure of trailer system 100 and provide additional constraint perpendicular to the direction DL of loading as illustrated in FIG. 51. An additional embodiment may include actuator couplers 600 configured to engage the secondary actuators 109S, shown in FIG. 53B described below.

Referring back to FIG. 51, the first primary actuator 109P1 may be coupled to the second primary actuator 109P2 by a connection point 606 that comprises a metal structure which is welded to each actuator 109. Each actuator 109P is further coupled to a vertical beam 122. Specifically, the first primary actuator 109P1 is coupled/connected to a vertical beam 122b by a coupler 600A. The coupler 600A comprises a female structure 604A and a male structure 602A. The female structure 604A comprises a U-shaped channel that receives the male structure 602A. The female structure 604A is welded to the vertical beam 122b. The male structure 602A is also welded to the first primary actuator 109P1.

When constructing the trailer system 100, the male structure 602A is slid into the U-shape channel of the female structure 604A for a tight fit where the two structures 602A, 604A contact each other, but can slide within this fit/contact. While the female structure 604A has two apertures illustrated in FIG. 51 for receiving other couplers such as screws and/or bolts, the exemplary embodiment of FIG. 51 does not require such additionally couplers within those apertures. Thus, the apertures in the female structure 604A could be eliminated if desired. However, in other exemplary embodiments, the apertures may be desired along with the additional couplers increase structural rigidity as desired.

Also illustrated in FIG. 51 is a hydraulic line 608 that feeds into the first primary actuator 109P1. Also visible is a hydraulic coupling 610 that receives hydraulic fluid flow from the primary actuator 109P1 which feeds into the second primary actuator 109P2. This system illustrated in FIG. 51 is an advance over prior art systems which could employ a single larger, cylinder but such larger cylinders would be unable to accommodate larger ULDs such as those illustrated and described previously. The inventive system illustrated in FIG. 51 is relatively compact and has a low profile relative to its cargo, that may include ULDs.

Figure 52:
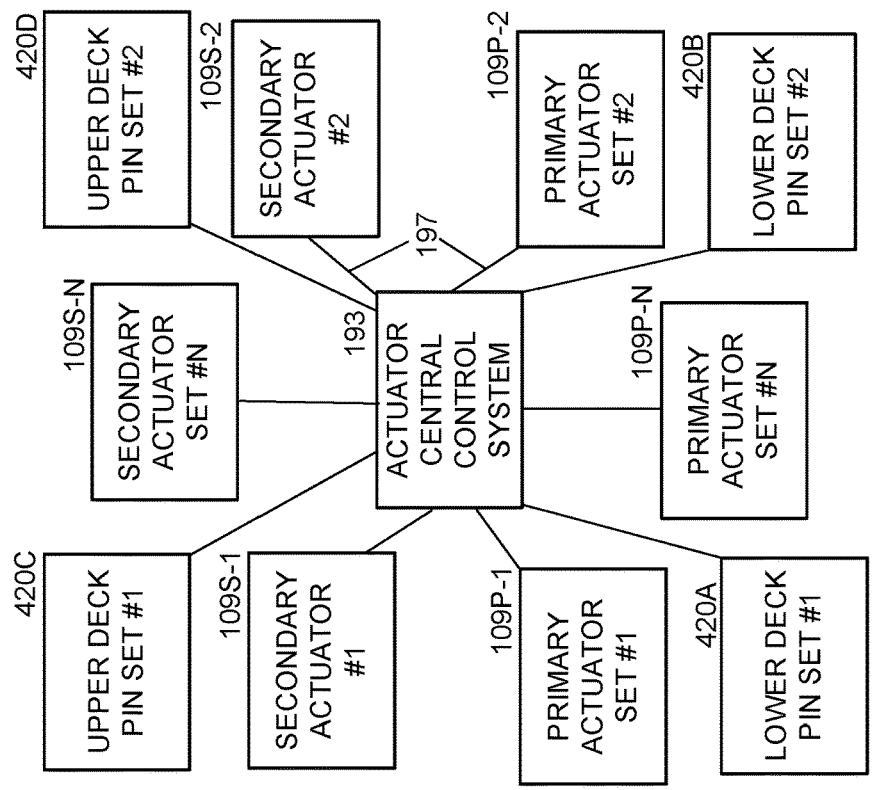
FIG. 52 illustrates an actuator central control system according to an exemplary embodiment.

Referring now to FIG. 52, this figure illustrates an actuator central control system 193 according to an exemplary embodiment. The actuator central control system 193 may comprise a general purpose processor or computer. It is noted that the flow charts of FIGS. 57A-57D described below and their corresponding text descriptions sufficiently disclose a plurality of algorithms which transform the general purpose microprocessor of FIG. 52 into a special purpose computer as understood by one of ordinary skill in the art.

As illustrated in FIG. 52, the central control system 193 may be coupled to each actuator 109 by wired or wireless links 197. As noted previously, the central control system 193 may receive similar signals from other actuator sets 109 associated with a given deck and, based on a comparison of the signals, determine the relative levelness of the given deck. To maintain the level of a deck, the central control system 193 may generate a return signal(s) that causes one or more actuator sets 109 associated with the deck 101, 103 to extend relatively faster than, or relatively slower than, including full stops, compared to other associated actuator sets 109.

The central control system 193 may also be coupled to one or more pin actuator systems 420. The pin actuator systems 420 are part of an exemplary deck locking subsystem according to an exemplary embodiment. The deck locking subsystem may lock each deck 103, 105 against the superstructure of the trailer system 100 when a respective deck 103, 105 reaches a certain height relative to the superstructure.

The deck locking subsystem may also lock deck 101 to a portion of the lifting structure 120 of deck 103 when deck 101 reaches a certain height relative to deck 103. For clarity, it is noted that lifting structure t 120 is mechanically coupled to deck 103 so that they always move together. Advantageously when deck 103 is subsequently moved, the relative separation between decks 101 and 103 is maintained. The central control system 193 works with the actuators 109 for the decks and pin actuator system 420 to maintain relative positions for the decks 101, 103, and 105.

Figure 53A:
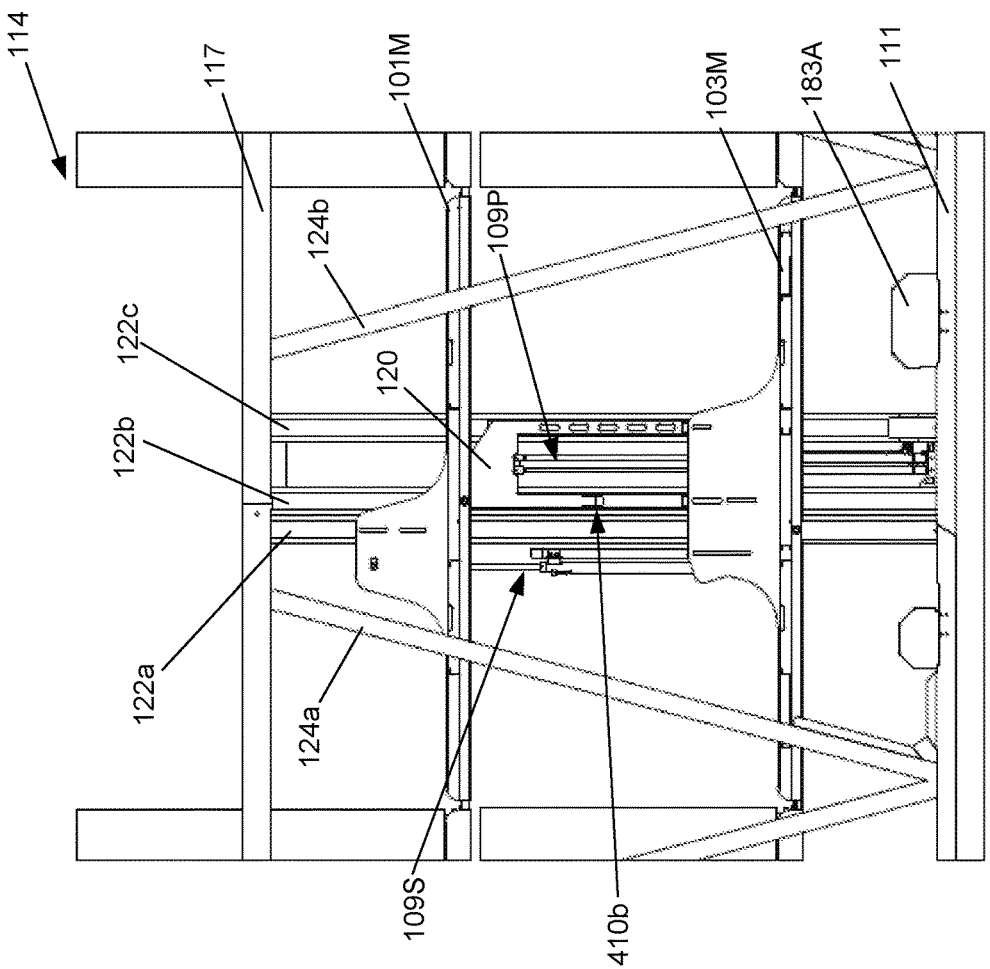
FIG. 53A is an inside view (relative to the middle cargo bay) of the primary and secondary actuators and it also provides exemplary locations for pin receiving apertures that are for pin actuators.

Referring now to FIG. 53A, this figure is an inside view (relative to the middle cargo bay 114) of the primary and secondary actuators 109P, 109S and it also provides exemplary locations for pin receiving apertures 410 that are for pin actuator systems 420 (not visible). Relative to FIG. 48 which shows an external view of the actuators 109P, 109S, FIG. 53 illustrates an internal view looking outward from the middle cargo bay 114. One or more vertical beams 122a, 122b, 122c may comprise apertures 410.

Additional apertures 410 may be included in a portion of the lifting structure 120 of deck 103 that is guided by vertical beams 122 such that the pin actuator system 420 of deck 101 will lock deck 101 in a position relative to deck 103. As shown in FIG. 53A, only aperture 410b is visible in a portion of the lifting structure 120 of deck 103 which will be described in more detail below.

Figure 53B:
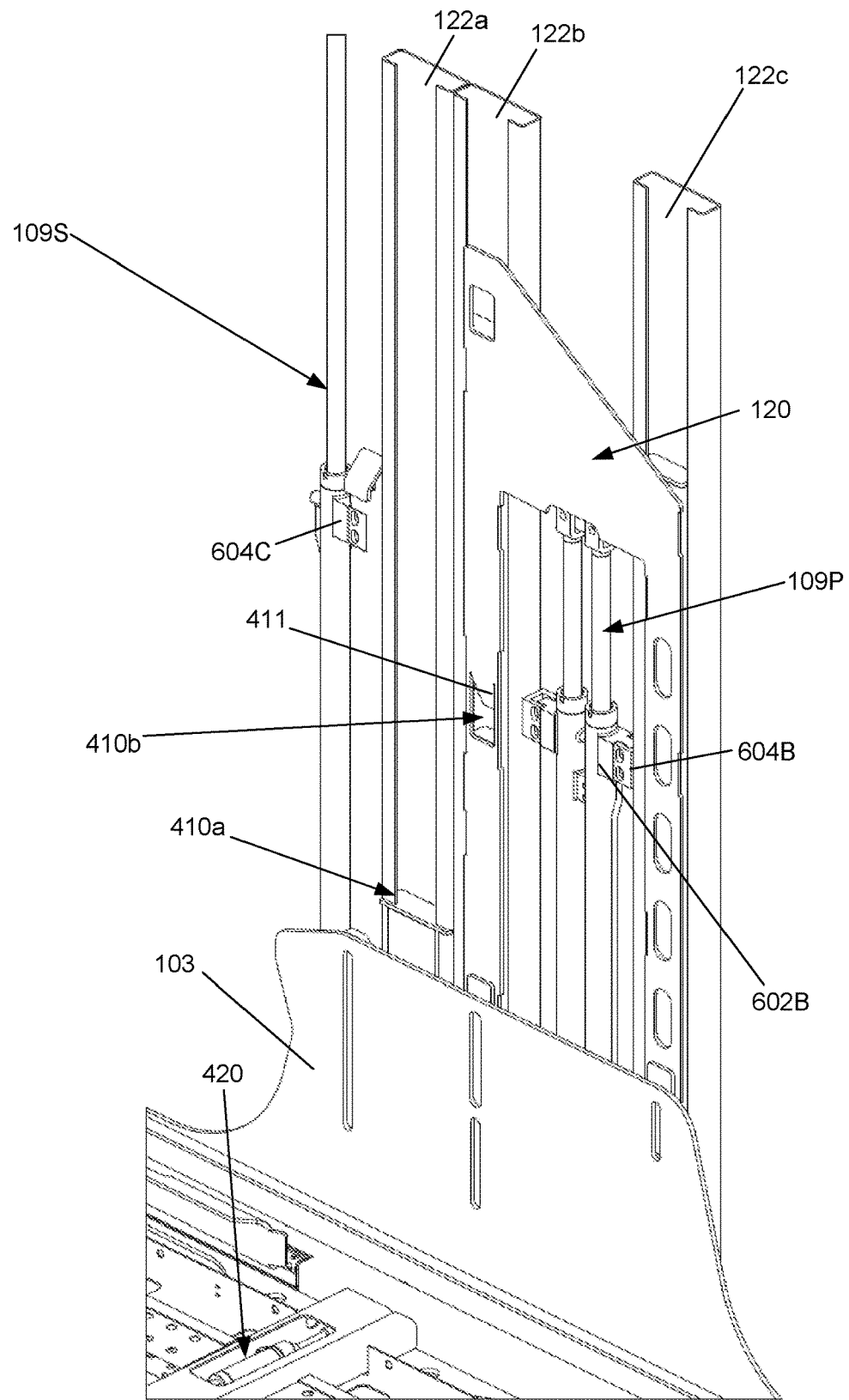
FIG. 53B is a perspective view of the primary and secondary actuators illustrated in FIG. 53.

Referring now to FIG. 53B, this figure illustrates a perspective view of the primary and secondary actuators 109P, 109S illustrated in FIG. 53A. FIG. 53A illustrates two pin receiving apertures 410a, 410b. While the pin receiving aperture 410a is not clearly visible in FIG. 53A, see FIG. 54 which shows this aperture 410a more clearly. The aperture 410a is located within the vertical beam 122a while the aperture 410b is located within a lifting structure 120 of deck 103, described in more detail below in connection with FIG. 54.

Also shown in FIG. 53B is a ramp feature 411 for the aperture 410b which will be described in more detail below. Additionally, a female structure 604c is shown that couples a single-type cylinder of a secondary actuator 109S to a support device. According to this exemplary embodiment illustrated in FIG. 53B, additional coupling devices (i.e. bolts, rivets, screws, etc.) are used within the two apertures of the female structure 604c, unlike the female structures 604A, 604B for the primary actuator 109P. Also shown in FIG. 53B is a pin actuator system 420 that will be described in further detail below in connection with FIG. 55.

Figure 54:
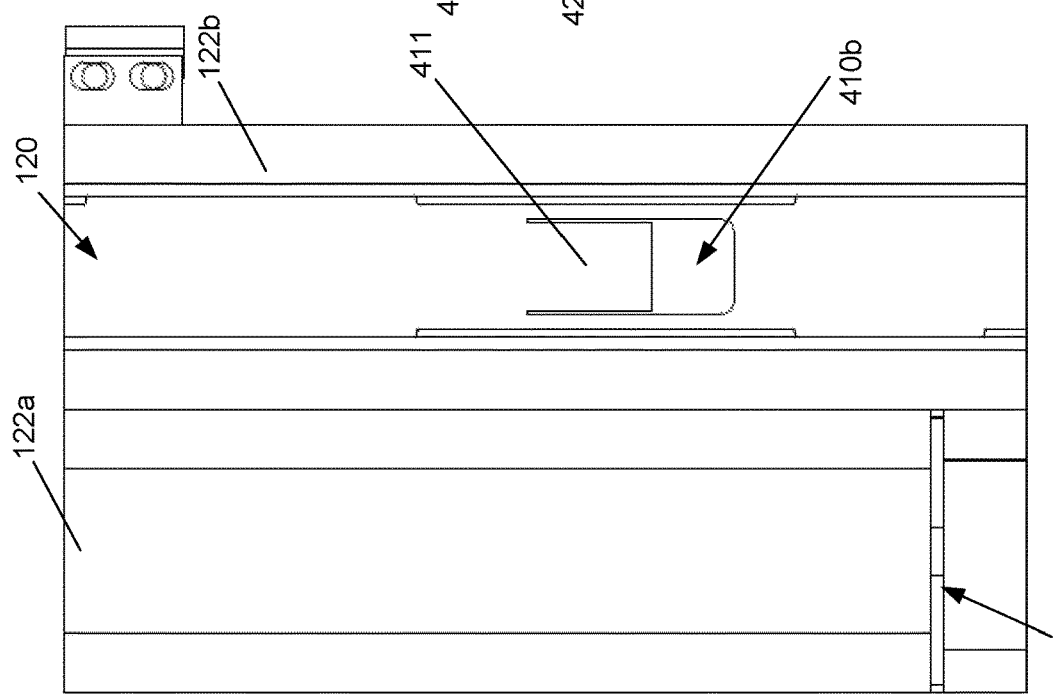
FIG. 54 illustrates a aperture located within a vertical beam according to an exemplary embodiment.

Referring now to FIG. 54, this figure illustrates the aperture 410a located within a vertical beam 122a and an aperture 410b located within a portion of the lifting structure 120 of deck 103 according to an exemplary embodiment. The aperture 410a may receive a pin 409 (not visible) of a pin actuator system 420 for locking a deck 103 into position at a height relative to the superstructure of trailer 100. The aperture 410b may receive a pin 409 (not visible) of a pin actuator system 420 (not visible) for locking deck 101 (omitted for clarity) to the lifting structure 120 of deck 103 into a position relative to deck 103. Multiple apertures 410 may be positioned along a height of a vertical beams 122 to lock a deck 101, 103, 105 at a height corresponding to these apertures 410.

Advantageously these apertures 410 are positioned with spacings that correspond to the preferred relative positions of decks 101, 103, 105. As an example, referring back to FIG. 8, when transitioning ULD1 from deck 101F to cargo bay 113, aperture 410 would be located to receive a pin 409 of deck 103 in order to position deck 101F relative to cargo bay 113 such that the barrel rollers 149 are at the same relative height.

As a further example, referring back to FIGS. 26, 27, and 28, apertures 410 may be located in the lifting structure 120 of deck 103 such that pins 409 in deck 101 hold the position of deck 101 relative to deck 103 with a spacing that is compatible with the height of ULD5, ULD6, and ULD7. Furthermore, concurrently additional apertures 410 located in vertical beams 122 would receive pins 409 of deck 103 that would position deck 103 relative to deck 105 such that the barrel rollers 149 on deck 103 and deck 105 are at the same height to facilitate the transfer of ULD5, ULD6, and ULD7. Additional aperture locations, not shown, are possible and are included within the scope of this disclosure.

Figure 55:
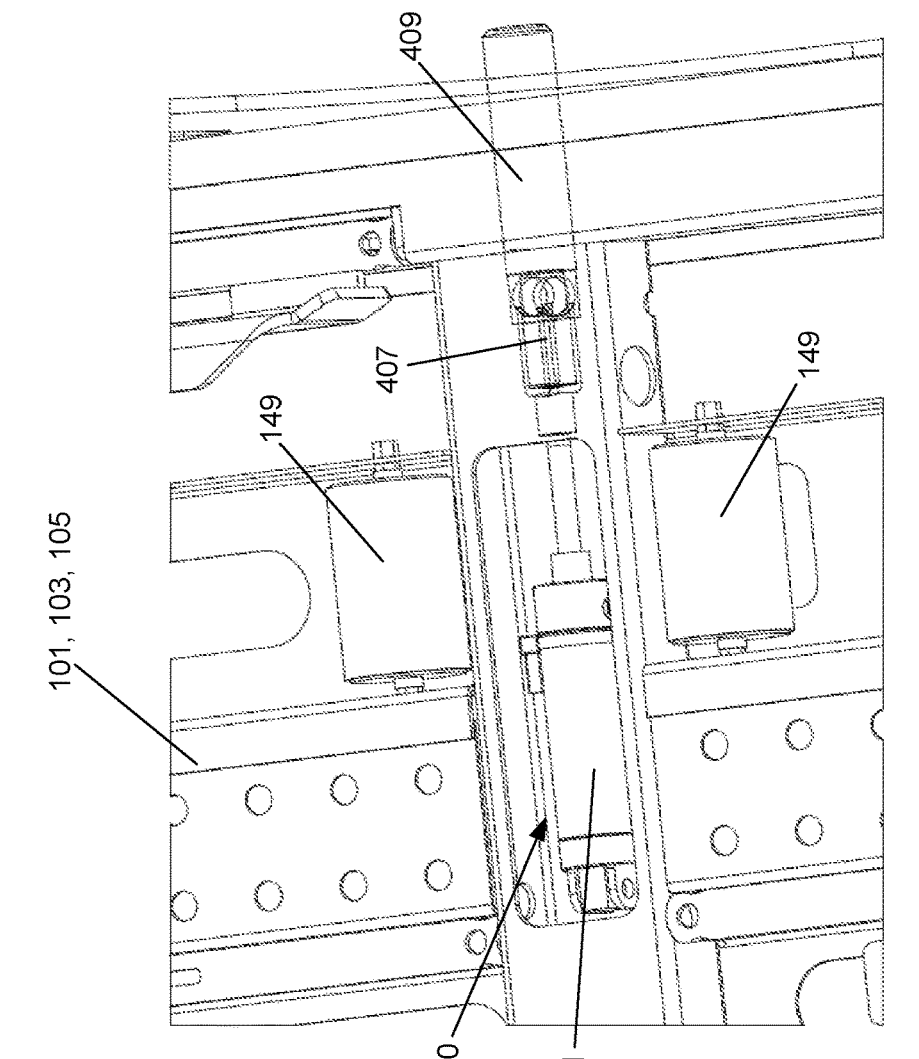
FIG. 55 illustrates an elevational view of a movable deck which may have a plurality of pin actuators.

Referring now to FIG. 55, this figure illustrates a perspective view of a movable deck 101, 103, 105 which may have a plurality of pin actuator systems 420. Each pin actuator system 420 may comprise a spring 407 (not visible) which urges a pin 409 outward from a portion of the movable deck 101, 103, 105, and a hydraulic, pneumatic, or electrical actuating device 421 (i.e. motor with gears, etc.) which causes said pin 409 to retract back into same portion of the movable deck.

The exemplary embodiment envisions an actuating device 421 that is a single-acting pneumatic cylinder with an internal spring 407 that urges the pin 409 to remain in an extended condition and would be moved to a retracted position by the application of pneumatic or hydraulic pressure. The actuating device 421 is sold by Clippard Instrument Laboratory (CIL) of Ohio. However, the spring 407 and pin 409 are not made or sold by CIL and were developed by the inventors.

Although the spring 407 of the pin actuator system 420 is urging the pin 409 outward from the movable deck 101, 103, 105, it may be blocked from moving to an extended state due to the proximity of the trailer superstructure 122 or the lifting structure 120 of deck 103. For the central controller 193 of FIG. 52 to determine if the a pin 409 has been extended and "locked," a position switch (not visible) is actually incorporated the pin actuating device 421 that indicates to the central control controller 193 that the pin 409 is extended into an aperture 410 and therefore in a "locked" position.

However as the movable deck 101, 103, 105 transitions into a "lock zone", pin 409 may encounter an aperture 410 described above and illustrated in FIGS. 53-54, into which the pin 409 will be urged to engage. Advantageously, a ramp feature 411 may be incorporated immediately above certain apertures 410 such that as a movable deck 101, 103, 105 is raising, the pin 409 will engage aperture 410, but then be pushed back into the deck by the ramp 411 and subsequently by the proximity of the trailer super structure 122 or the lifting structure 120 of deck 103 until it reaches the next aperture 410.

As described above in connection with FIG. 52, a central control system 193 may leverage position feedback from sensors associated with actuator sets 109. Using the feedback signals, the central control system 193 may adjust stroke lengths of one or more actuator sets 109 in order to level a given deck or decks. It is envisioned, however, that during transport over the road (as well as during loading of ULDs), the decks 101, 103 be mechanically supported in order to not rely on the actuator sets 109 to maintain a position. Consequently, certain embodiments of the system 100 may incorporate position locking features, such as pin actuator systems 420, as a part of the deck locking subsystem.

The pin-receiving apertures 410 may be incorporated into the superstructure of the trailer 100 and/or, with respect to a tandem set of decks (e.g., upper deck 101M and lower deck 103M), the pin-receiving apertures 410 for the respective upper deck may be locked to the associated lower deck.

The central control system 193, in response to a command to raise or lower the position of the decks, leverages the feedback signals from the position sensors to recognize that the pin(s) 409 are aligned with a "lock zone" and responds by causing the pin actuator systems 420 to retract the springs 407 that are operable to extend the pin(s) 409 into the associated pin-receiving aperture(s) 410.

With the springs 407 retracted via actuation of the pin actuator systems 420, the pin(s) 409 are disengaged from the aperture(s) 410 and the given deck may thereafter be translated up or down via actuators 109P, 109S. Once out of the "lock zone," the central control system 193 may release the pin actuator(s) 420 such that the spring(s) cause the pin(s) 409 to seek extension, thereby ensuring that the pin(s) 409 engage into the next pin-receiving aperture(s) 410 encountered.

In this way, a deck 101, 103 may maintain a position when movement of the decks 101, 103 is not under command, mechanically supported in place via pins 409 engaged with pin-receiving apertures 410. Subsequently, the pin actuator(s) 420 may retract the pin(s) 409 to disengage from the associated pin-receiving aperture(s) 410 so that the position of the relevant deck 101, 103 may be adjusted as described previously and as shown in the prior figures.

Figure 56:
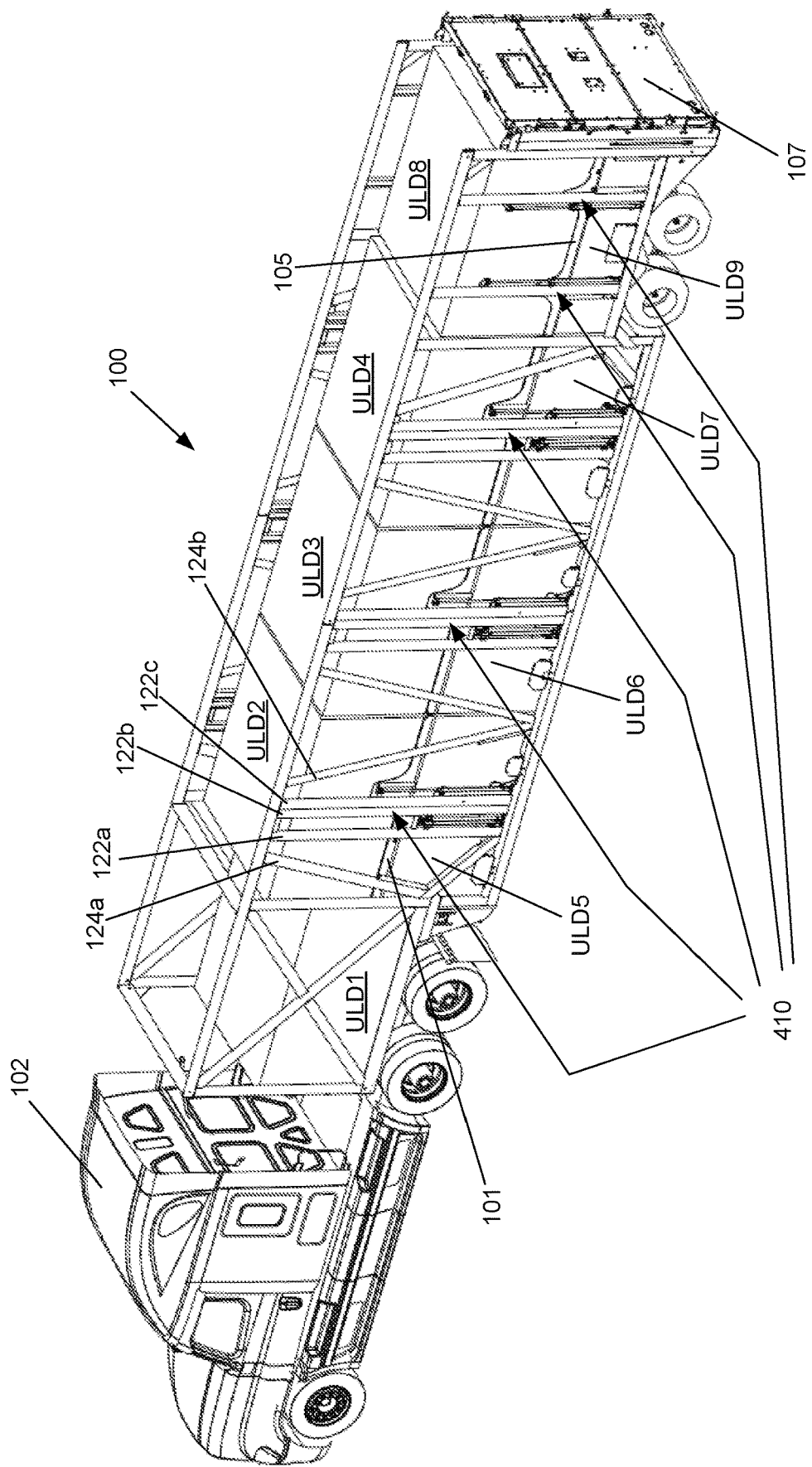
FIG. 56 illustrates exemplary positions for pin-receiving slots within vertical beams and transverse beams of the trailer system.

Referring now to FIG. 56, this figure illustrates exemplary positions for pin-receiving apertures 410 within vertical beams 122 of the trailer system 100. While exemplary positions are only illustrated for the lower decks 103 and rear deck 105, fewer or additional positions for the lower deck 103 and rear deck 105 as well as the upper decks 101 are possible and are included within the scope of this disclosure.

Figure 57A:
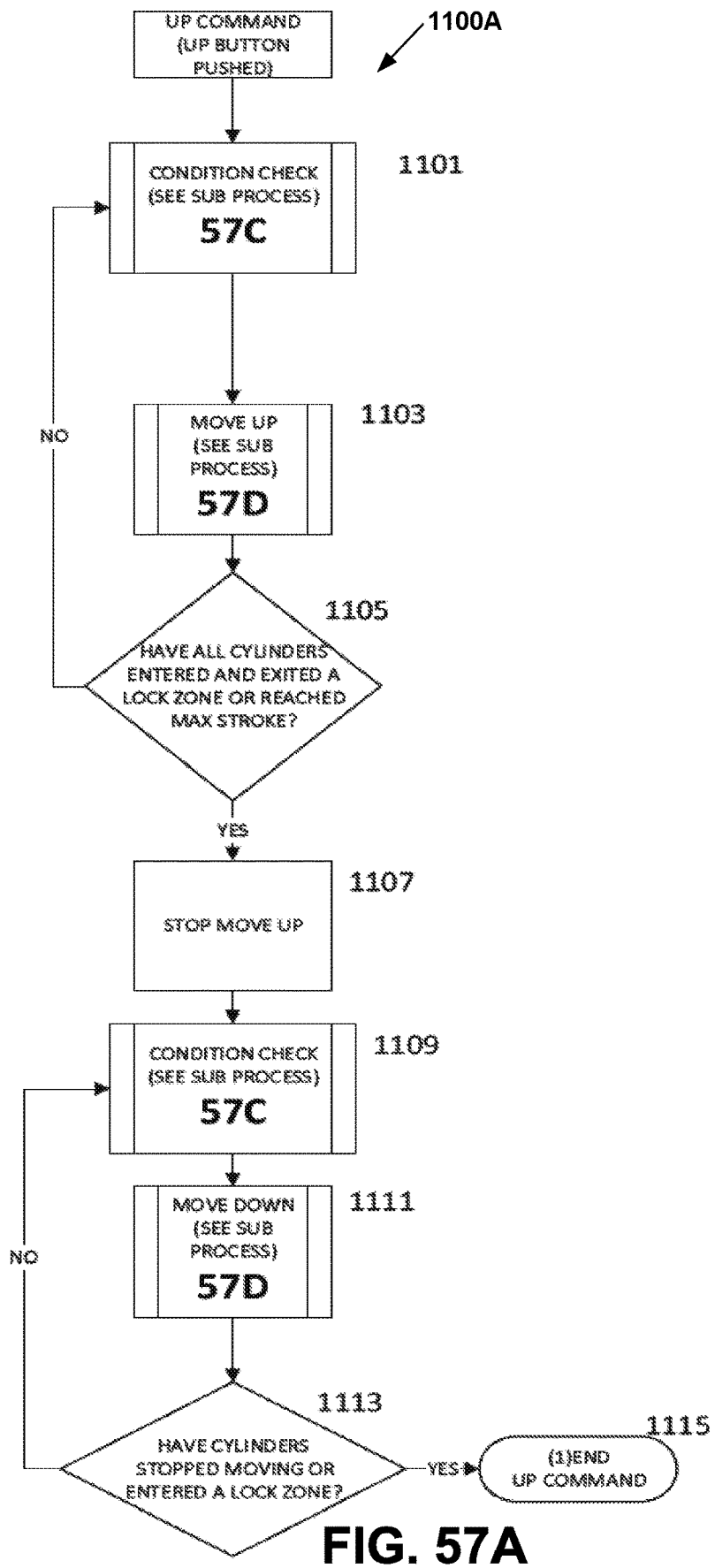
FIG. 57A illustrates a logic flow chart of a method for raising one or more decks of the trailer system.

Referring now to FIG. 57A, this figure illustrates a logic flow chart of a method 1100a for raising one or more decks of the trailer system 100. A user of the exemplary improved trailer system 100 may actuate a command to raise a deck 101, 103, 105 or a tandem of decks. The method 1100A starts with a first subroutine 1101 which comprises a system status or "condition check" subroutine 1101. Details of subroutine 1101 are illustrated in FIG. 57C described below. If the system status/condition check subroutine 1101 passes or is clear, the method proceeds to the "move up" subroutine 1103. The move up subroutine 1103 is illustrated in FIG. 57D described below.

After the "move up" subroutine 1103 of FIG. 57A, the method 1100A continues to decision block 1105. At decision block 1105, the central controller 193 determines if all cylinders (i.e., actuators/actuator sets 109/pin actuator systems 420) have either entered and exited a lock zone or are at a maximum stroke extension, the method 1100A follows the "yes" branch and continues to block 1107, otherwise the "no" branch is followed back to "condition check" subroutine 1101.

At block 1107, the method 1100A stops upward movement of the given deck 101, 103, 105 or deck tandem and the method 1100A continues to an execution of the system status/condition check subroutine at block 1109 and the "move down" subroutine at block 1111. Subroutine 1109 is the same as subroutine 1101 and is illustrated in FIG. 57C.

Similarly, the move down subroutine 1111 is the similar to the move up subroutine 1103, except for the movement direction. The move down subroutine 1111, like the move up subroutine 1103 is illustrated in FIG. 57D.

Once the "move down" subroutine 1111 is completed, the method 1100A continues to decision block 1113 and the method determines whether all cylinders (i.e., actuators/actuator sets 109) have either stopped moving (due to the pin(s) 409 having settled in apertures(s) 410) or have reached a lock zone limit. If not, the "no" branch is followed back to condition check subroutine block 1109. If yes, then the method follows the "yes" branch to termination block 1115 and the up command is completed.

Figure 57B:
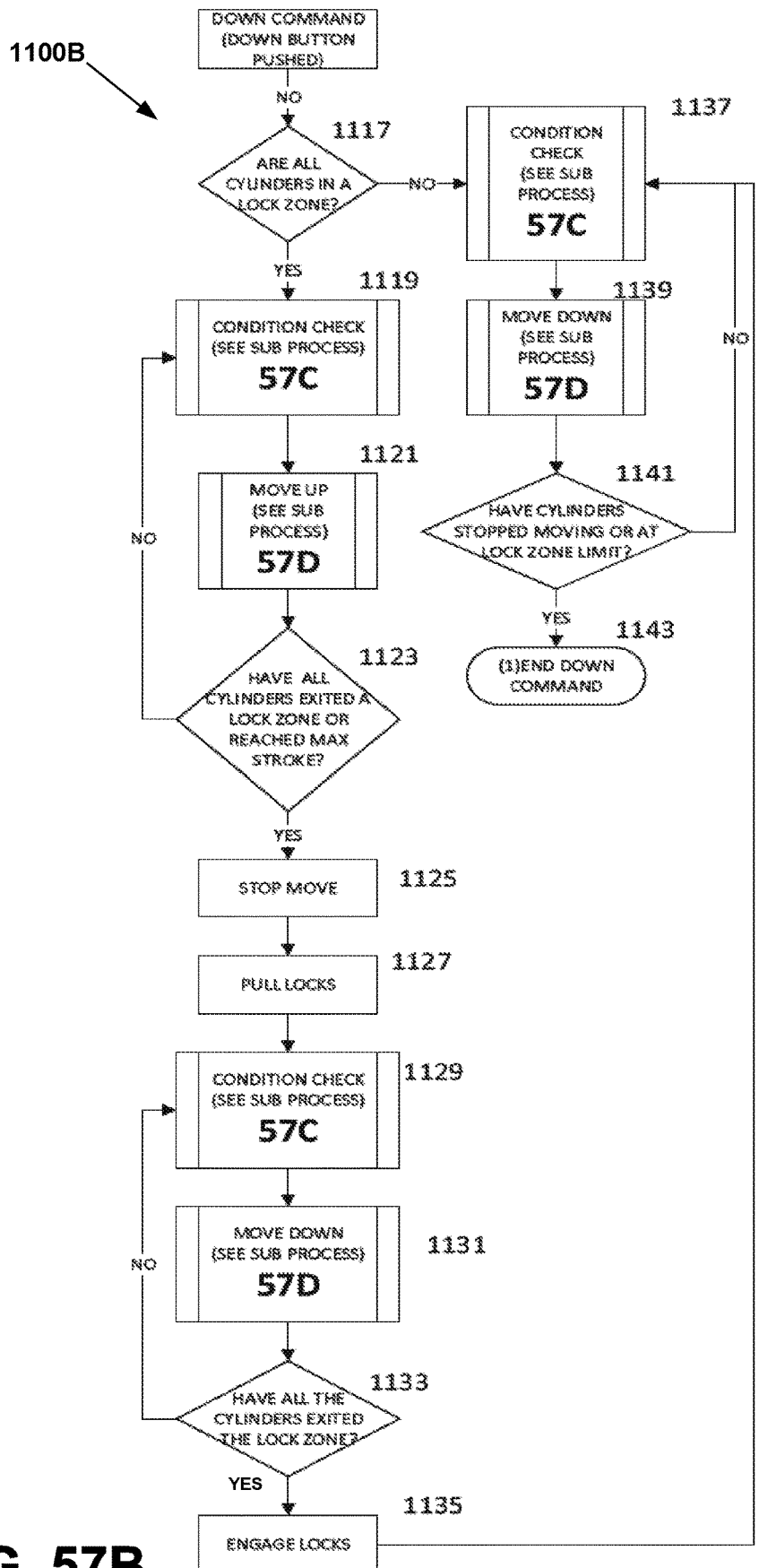
FIG. 57B illustrates a logic flow chart of a method for lowering one or more decks of the trailer system.
Figure 57C:
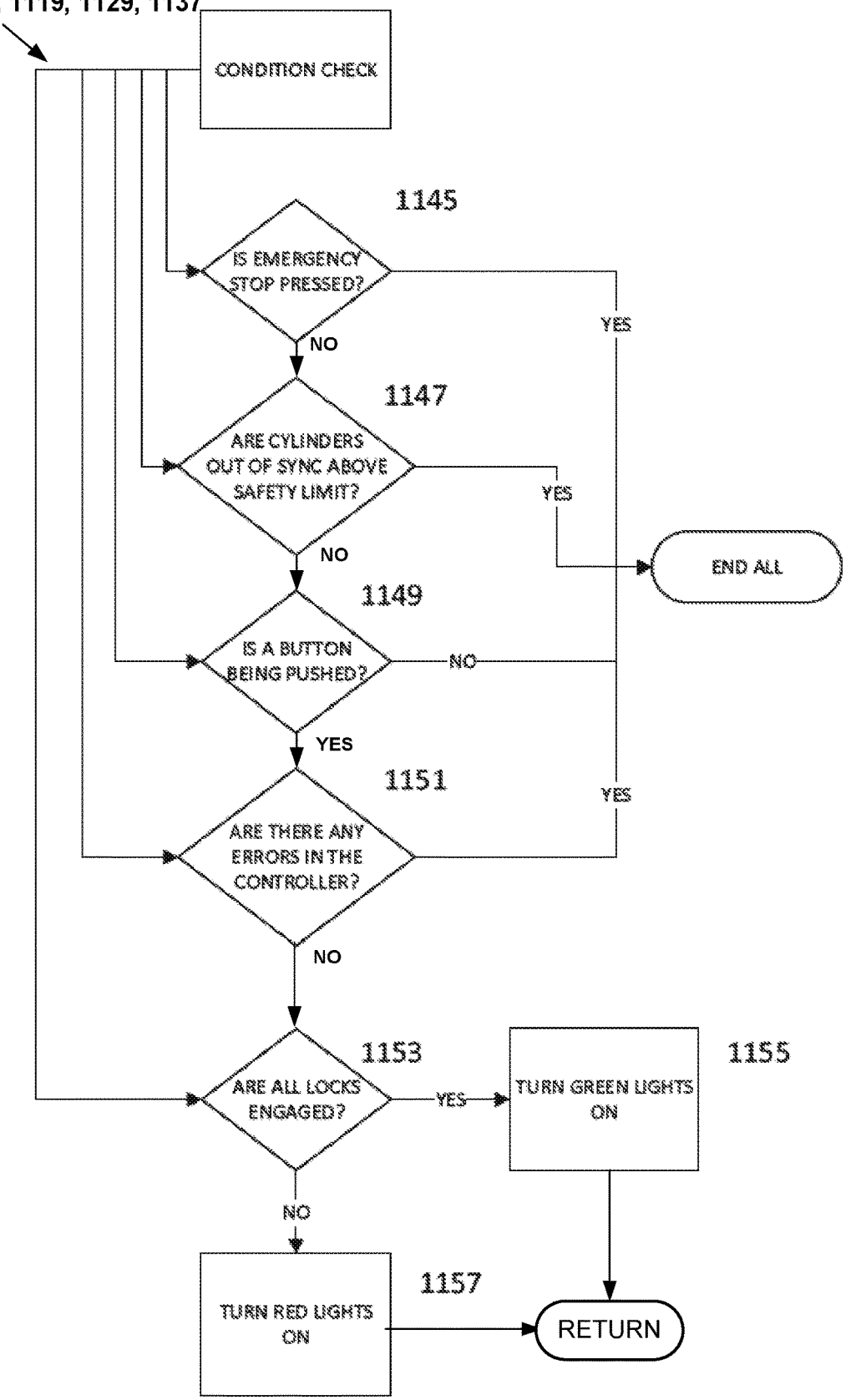
FIG. 57C illustrates a logic flow chart of a method for conducting a system element condition/status check when raising or lowering decks of the trailer system.
Figure 57D:
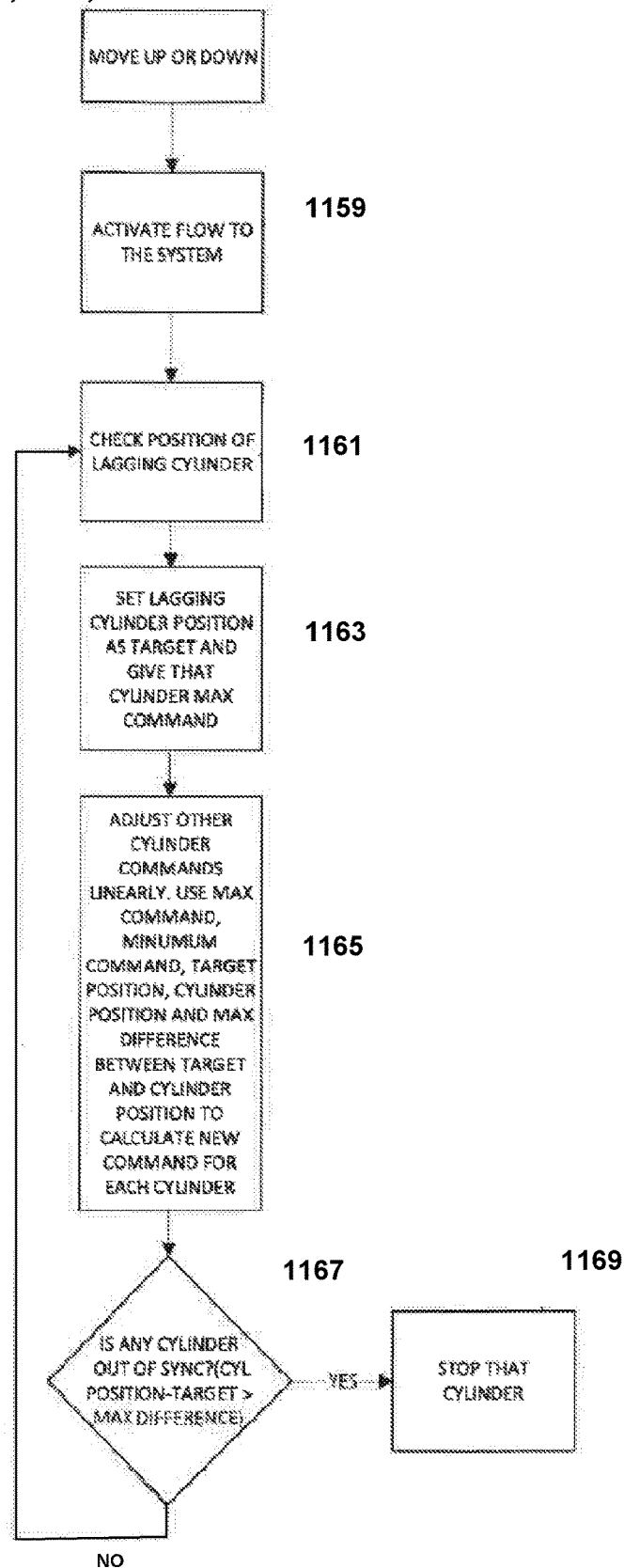
FIG. 57D illustrates a logic flow chart of a submethod for raising or lowering decks of the trailer system.

Referring now to FIG. 57B, this figure illustrates a logic flow chart of a method 1100B for lowering one or more decks of the trailer system 100. A user of the exemplary improved trailer system 100 may actuate a command to lower a deck 101, 103, 105 or a tandem of decks. The method 1100B moves to decision block 1117 where the method determines whether all cylinders (i.e., actuators/actuator sets 109/pin actuator systems 420) associated with the deck 101, 103, 105 or deck tandem to be lowered are in a lock zone.

If all cylinders are not in a lock zone, the method follows the "no" branch to subroutine block 1137 and the "condition check" subroutine, as illustrated in FIG. 57C, is executed. If the condition check subroutine at block 1137 passes/is clear, the method continues to subroutine block 1139 where the "move down" subroutine is executed. Further details of the move down subroutine 1139 are described below in connection with FIG. 57D.

Next, at decision block 1141, if the central controller 193 determines that all cylinders (i.e., actuators/actuator sets 109/pin actuator systems 420) associated with the given deck or deck tandem have either stopped moving or have entered a lock zone, the method 1100B continues to termination block 1143 and the down command is completed. Otherwise, the "no" branch is followed from decision block 1141 and the method returns to the condition check subroutine at block 1137.

Returning back to decision block 1117, if the central controller 193 determines if all cylinders (i.e., actuators/actuator sets 109/pin actuator systems 420) associated with the given deck 101, 103, 105 or deck tandem are in a lock zone, the method 1100B follows the "yes" branch to block 1119 where the status check/condition check subroutine 1119 is executed, after which the "move up" subroutine 1121. Details of the condition check subroutine are illustrated in FIG. 57C, while details of the move up subroutine are illustrated in FIG. 57D described below. The method 1100B continues to decision block 1123 and it is determined by the central controller 193 whether all cylinders have either exited a lock zone or reached a maximum stroke extension. If not, the method 1100B follows the "no" branch from decision block 1123 and returns to the condition check subroutine at block 1119. If yes, the method follows the "yes" branch from decision block 1123 to block 1125 and the deck movement is halted. Subsequently, the locks/pins 409 associated with the given deck or deck tandem are pulled or retracted by the pin actuator systems 420 from commands issued by the central controller 193 at block 1127.

The method 1100B continues from block 1127 to subroutine blocks 1129 and 1131 where the condition check (illustrated in FIG. 57C) and move down subroutines (illustrated in FIG. 57D) are executed, respectively. The method 1100B continues after the subroutine at block 1131 to decision block 1133 and it is determined by the central controller 193 whether all cylinders have exited the given lock zone. If not, then the "no" branch is followed from decision block 1133 back to block 1129 where the condition check subroutine is executed. Otherwise, the method continues to block 1135 and the pin actuator systems 420 are released thereby allowing their associated springs to apply an extension force for engaging their pins into a pin-receiving aperture 410. The method 1100B continues to blocks 1137-1143 as previously described until the pins 409 settle into the bottom of their respective receiving apertures 410, thereby securely fixing the position of the given deck 101, 103, 105, or deck tandem.

Referring now to FIG. 57C, this figure illustrates a logic flow chart of the submethod/subroutine 1101, 1109, 1119, 1129, 1137 for conducting a system check/condition check when raising or lowering decks 101, 103, 105 of the trailer system 100. That is, the "condition check" subroutine referred to above in FIGS. 57A-57B will be shown and described.

As can be understood from the FIG. 57C illustration, the condition check subroutine confirms the state of various conditions as represented by the decision blocks 1145-1151, which are preferably performed in parallel. Notably, the conditions represented by decision blocks 1145-1151 are exemplary in nature and do not necessarily encompass all conditions that may be confirmed by a condition check subroutine.

Returning to the FIG. 57C illustration, at decision block 1145, the central controller 193 determines whether an emergency stop function has been actuated. If "yes," then the condition check subroutine ends the method for actuating a deck 101, 103, 105 or deck tandem. At decision block 1147 it is determined by the central controller 193 whether the relevant cylinders (i.e., actuators/actuator sets 109) are out of sync or above a predefined condition limit. If "yes," then the condition check subroutine ends the method for actuating a deck 101, 103, 105 or deck tandem.

At decision block 1149, it is determined by the central controller 193 whether an actuation to move the deck or deck tandem (e.g., a "button" is being pushed) is being actively engaged by the user. If "no," then the condition check subroutine ends the method for actuating a deck or deck tandem. At decision block 1151, the central controller determines if there are any errors. If there are any errors, the "Yes" branch is followed where the subroutine ends.

At decision block 1153 it is determined whether all locks/pin actuator systems 420 associated with the given deck 101, 103, 105 or deck tandem are engaged. If "yes," then the subroutine at block 1155 and a positive feedback signal (e.g., a green light) is energized. If "no," then at block 1157 a negative feedback signal (e.g., a red light) is energized. After both blocks 1155 and 1157 the subroutine returns.

Referring now to FIG. 57D, this figure illustrates a logic flow chart of the subroutines 1103, 1111, 1121, 1131, 1139 mentioned in FIGS. 57A-57B for raising or lowering decks 101, 103, 105 of the trailer system 100. That is, the "move up/move down" subroutine referred to above in FIGS. 57A-57B will be shown and described. As can be understood from the FIG. 57D illustration, the "move up/move down" subroutine begins at block 1159 where the relevant actuators/actuator set(s) 109 are energized or de-energized (such as in a hydraulic application, applied fluid pressure or release of fluid pressure). The subroutine continues to block 1161 and the position of any lagging cylinder (relative to other cylinders associated with the deck 101, 103, 105 or deck tandem) is verified.

The lagging cylinder is designated as the "target" cylinder at block 1163 and a max command is executed by the central controller 193 in relation to that particular cylinder. The subroutine continues to block 1165 and all other cylinders relative to the lagging cylinder are adjusted linearly by the central controller 193.

The max command, minimum command, target position, cylinder position and max difference between target position and a cylinder position are leveraged to calculate new/subsequent commands by the central controller 193 to each cylinder as appropriate. In this way, the given deck 101, 103, 105 or deck tandem may be kept substantially level as each actuator/actuator set stroke length is adjusted relative to the stroke length of the other actuators/actuator sets associated with the deck or deck tandem.

The subroutine continues to decision block 1167 where it is determined by the central controller 193 whether any one or more of the actuator cylinders 109 are out of sync with the others. If "no," the subroutine returns to block 1161 and the subroutine continues looping through blocks 1161-1165 as previously described until the given deck 101, 103, 105 or deck tandem reaches a desired position. If at decision block 1167 it is determined that a cylinder is out of sync with other cylinders, the subroutine follows the "yes" branch to block 1169 and the cylinder movement is halted by the central controller 193.

Figure 58:
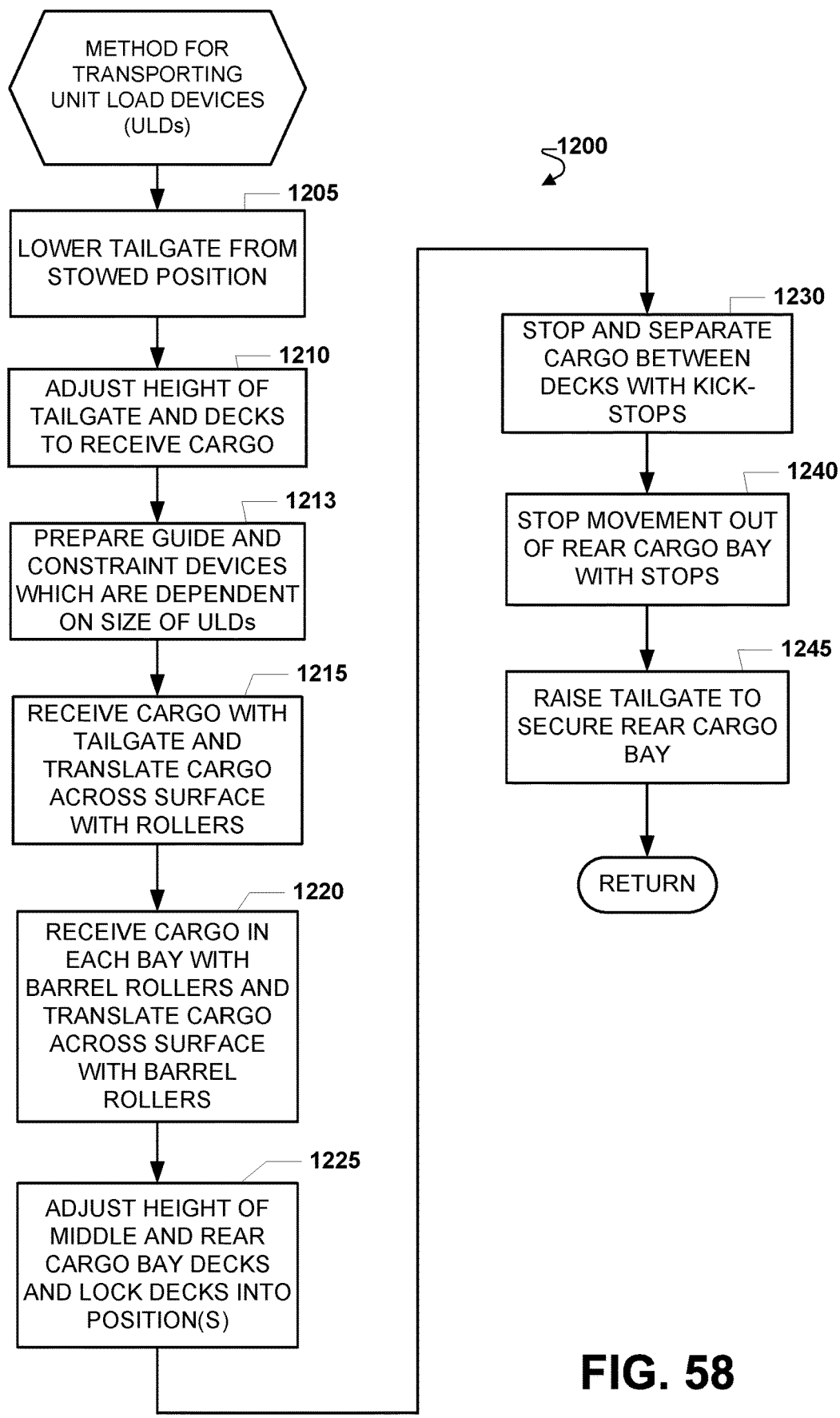
FIG. 58 illustrates a logic flow chart of a method for transporting ULDs.

Referring now to FIG. 58, this figure illustrates a logic flow chart of a method 1200 for transporting ULDs. Step 1205 is the first step of the method 1200 in which the tailgate 107 may be lowered from stowed position to a loading position as illustrated in FIGS. 2-3 described above. As noted previously, the tailgate 107 may support cargo and it may elevate cargo, such as ULDs.

Next, in step 1210, the height of the tailgate 107 and various movable decks 101, 103, and 105 may be adjusted to receive cargo, such as illustrated in FIGS. 24-32. Depending upon which cargo bay 113, 114, 115 needs to be loaded first, the decks 101, 103, 105 may be adjusted up or down with actuators 109.

Subsequently, in step 1213, guide and constraint systems 500 may be prepared for receiving the ULDs. As noted previously, pairs of flanges 510, 512 can be adjusted to receive different sized ULDs.

In step 1215, cargo such as one or more ULDs may be received with the tailgate 107 and then translated across the surface of the tailgate 107 with its spherical or ball rollers 144. Next, in step 1220, cargo may be received in each bay 113, 114, or 115 with barrel rollers 149. The barrel rollers 149 may translate the cargo across a deck surface.

Next, in step 1225, the height of the middle decks 101, 103 and rear cargo deck 105 may be adjusted and then locked into position by the pin actuators 420. Subsequently, in step 1230, cargo between decks may be stopped and separated with kick-stop devices 700.

Next, in step 1240 movement out of the rear cargo bay 115 may be stopped or prevented with kick-stop devices 700. And lastly, in step 1245, the liftgate 107 may be raised and closed to secure the rear cargo bay 115. The method 1200 may then return.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Although a few embodiments have been described in detail above, those skilled in the art will readily appreciate that many modifications are possible in the embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures.

Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, sixth paragraph for any limitations of any of the claims herein, except for those in which the claim expressly uses the words 'means for' together with an associated function.

Therefore, although selected aspects have been illustrated and described in detail, it will be understood that various substitutions and alterations may be made therein without departing from the spirit and scope of the present invention, as defined by the following claims.

What is claimed is:

1. A trailer system comprising:
   a first movable deck, the first movable deck being moved by a first actuator;
   a second movable deck, the second movable deck being moved by a second and a third actuator which operate together in unison for moving the second movable deck, the first actuator being coupled to the second movable deck such that movement of the second movable deck causes the first actuator to move; and wherein the second and third actuators have a conduit extending from an external portion of a cylinder of the second actuator and which is directly connected to an external portion of a cylinder of the third actuator to provide a fluid coupling such that the second and third actuator share a flow of fluid through the conduit during operation.

2. The trailer system of claim 1, wherein the actuators are part of a hydraulic system, or an electro-mechanical system, or a combination thereof.

3. The trailer system of claim 1, wherein each actuator comprises a hydraulic cylinder that receives hydraulic fluid.

4. The trailer system of claim 1, wherein the first movable deck and second movable deck each comprise a plurality of rollers for engaging and translating cargo.

5. The trailer system of claim 1, further comprising: a movable tailgate closing a cargo area when the movable tailgate is in a first position, the movable tailgate further comprising a plurality of second rollers for engaging and translating cargo when the movable tailgate is in a second position.

6. The trailer system of claim 1, further comprising pin actuators for locking each movable deck into a position for transport of cargo.

7. The trailer system of claim 1, further comprising a stop device positioned on a deck, the stop device having a first position which allows cargo to move over the stop device, the stop device having a second position which prevents cargo from moving past an end of a deck.

8. The trailer system of claim 1, further comprising a central controller, the central controller being coupled to the first, second, and third actuators for issuing commands to each actuator and coordinating movement thereof.

9. A trailer system comprising:
a first movable deck, first means for moving the first movable deck between a first position and a second position;
a second movable deck, second and a third means for moving the second movable deck between a first and second position, the second and third means for moving operating together in unison for moving the second movable deck, the first means for moving being coupled to the second movable deck such that translation of the second movable deck through space cause the first means for moving to translate through space; and
wherein the second means for moving comprises a hydraulic cylinder and the third means for moving comprises a hydraulic cylinder, the system further comprises a conduit extending from an external portion of the hydraulic cylinder of the second means for moving and which is directly connected to an external portion of the hydraulic cylinder of the third means for moving to provide a fluid coupling between the hydraulic cylinders such that the hydraulic cylinders share a flow of hydraulic fluid through the conduit during operation.

10. The trailer system of claim 9, wherein the second means for moving and the third means for moving are coupled to a central controller.

11. The trailer system of claim 9, wherein the first and second movable decks each comprise a plurality of rollers for engaging and translating cargo.

12. The trailer system of claim 9, further comprising a central controller, the central controller being coupled to the first, second, and third means for moving for issuing commands to each means for moving and coordinating movement thereof.

13. The trailer system of claim 9, further comprising pin actuators for locking each movable deck into a position for transport of cargo.

14. The trailer system of claim 9, further comprising a stop device positioned on a deck, the stop device having a first position which allows cargo to move over the stop device, the stop device having a second position which prevents cargo from moving past an end of a deck.

15. A trailer system comprising:
a first movable deck, the first movable deck being moved by a first lifting machine;
a second movable deck, the second movable deck being moved by a second and third lifting machines which operate together in unison for moving the second movable deck, the first lifting machine being coupled to the second movable deck such that movement of the second movable deck causes the first lifting machine to move; and
wherein each lifting machine comprises a hydraulic cylinder, the second and third lifting machines further have a conduit extending from an external portion of a hydraulic cylinder of the second lifting machine and which is directly connected to an external portion of a hydraulic cylinder of the third lifting machine to provide a fluid coupling between the two lifting machines such that the second and third machines share a flow of hydraulic fluid through the conduit during operation.

16. The trailer system of claim 15, wherein the first movable deck and second movable deck each comprise a plurality of rollers for engaging and translating cargo.

17. The trailer system of claim 15, further comprising pin actuators for locking each movable deck into a position for transport of cargo.

18. The trailer system of claim 15, further comprising a stop device positioned on a deck, the stop device having a first position which allows cargo to move over the stop device, the stop device having a second position which prevents cargo from moving past an end of a deck.

19. The trailer system of claim 15, further comprising a central controller, the central controller being coupled to the first, second, and third lifting machines for issuing commands to each lifting machine and coordinating movement thereof.

20. The trailer system of claim 15, further comprising: a movable tailgate closing a cargo area when the movable tailgate is in a first position, the movable tailgate further comprising a plurality of second rollers for engaging and translating cargo when the movable tailgate is in a second position.

* * * * *